(12) United States Patent
Resch et al.

(10) Patent No.: US 10,360,097 B2
(45) Date of Patent: *Jul. 23, 2019

(54) SECURING DATA IN A DISPERSED STORAGE NETWORK

(71) Applicant: International Business Machines Corporation, Armonk, NY (US)

(72) Inventors: Jason K. Resch, Chicago, IL (US); Greg Dhuse, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/249,905

(22) Filed: Aug. 29, 2016

(65) Prior Publication Data
US 2016/0371143 A1    Dec. 22, 2016

Related U.S. Application Data

(63) Continuation of application No. 14/256,472, filed on Apr. 18, 2014, now Pat. No. 9,432,341.
(Continued)

(51) Int. Cl.
*G06F 11/10* (2006.01)
*H04L 29/06* (2006.01)
(Continued)

(52) U.S. Cl.
CPC ...... *G06F 11/1004* (2013.01); *G06F 11/1076* (2013.01); *G06F 11/1092* (2013.01);
(Continued)

(58) Field of Classification Search
CPC ............. G06F 11/1004; G06F 11/1076; G06F 11/1092
See application file for complete search history.

(56) References Cited

U.S. PATENT DOCUMENTS 4,092,732 A    5/1978   Ouchi
5,454,101 A    9/1995   Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Carl G Colin
*Assistant Examiner* — Vance M Little
(74) *Attorney, Agent, or Firm* — Garlick & Markison; Timothy W. Markison; Timothy D. Taylor

(57) ABSTRACT

A method includes receiving a retrieval request regarding an encoded key stream slice of a set of encoded key stream slices and an encoded and encrypted data slice of a set of encoded and encrypted data slices. The method further includes partially dispersed storage error decoding the encoded key stream slice to produce a partially decoded key stream vector. The method further includes partially dispersed storage error decoding the encoded and encrypted data slice to produce a partially decoded and encrypted data vector. The method further includes partially decrypting the partially decoded and encrypted data vector in accordance with the encryption function and based on the partially decoded key stream vector to produce a partially decrypted and decoded data vector. The method further includes sending the partially decrypted and encoded data vector to the requesting computing device.

10 Claims, 67 Drawing Sheets

Related U.S. Application Data

(60) Provisional application No. 61/828,905, filed on May 30, 2013.

(51) Int. Cl.
  *H04L 29/08* (2006.01)
  *G06F 21/60* (2013.01)
  *G06F 21/80* (2013.01)
  *H04L 1/00* (2006.01)
  *G06F 11/20* (2006.01)

(52) U.S. Cl.
  CPC ........ *G06F 11/1096* (2013.01); *G06F 21/602* (2013.01); *G06F 21/80* (2013.01); *H04L 63/0457* (2013.01); *H04L 63/061* (2013.01); *H04L 63/062* (2013.01); *H04L 67/1097* (2013.01); *H04L 69/14* (2013.01); *G06F 11/2094* (2013.01); *G06F 2211/1028* (2013.01); *G06F 2221/2107* (2013.01); *H04L 1/0042* (2013.01); *H04L 1/0047* (2013.01)

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 9,049,011 B1 | 6/2015 | Agrawal |
| 2002/0062422 A1 | 5/2002 | Butterworth et al. |
| 2002/0166079 A1 | 11/2002 | Ulrich et al. |
| 2003/0005285 A1* | 1/2003 | Graunke ............. H04L 9/0838 713/153 |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0216901 A1* | 9/2011 | Kiyomoto ............. H04L 9/0668 380/46 |
| 2011/0225362 A1* | 9/2011 | Leggette ............. G06F 12/1425 711/114 |
| 2012/0166813 A1* | 6/2012 | Grube ..................... G06F 21/62 713/189 |
| 2014/0040417 A1* | 2/2014 | Gladwin ............. G06F 11/2053 709/214 |
| 2014/0115346 A1* | 4/2014 | Ekberg ..................... G06F 21/10 713/193 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): String Representation of Search Filters; IETF Network Working Group; RFC 4515; Jun. 2006; pp. 1-12.

Smith; Lightweight Directory Access Protocol (LDAP): Uniform Resource Locator, IETF Network Working Group; RFC 4516; Jun. 2006; pp. 1-15.

(56) References Cited

OTHER PUBLICATIONS

Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium on High Performance Distributed Computing; Jun. 2004; pp. 172-181.
Zeilenga; Lightweight Directory Access Protocol (LDAP): Technical Specification Road Map; IETF Network Working Group; RFC 4510; Jun. 2006; pp. 1-8.
Zeilenga; Lightweight Directory Access Protocol (LDAP): Directory Information Models; IETF Network Working Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner

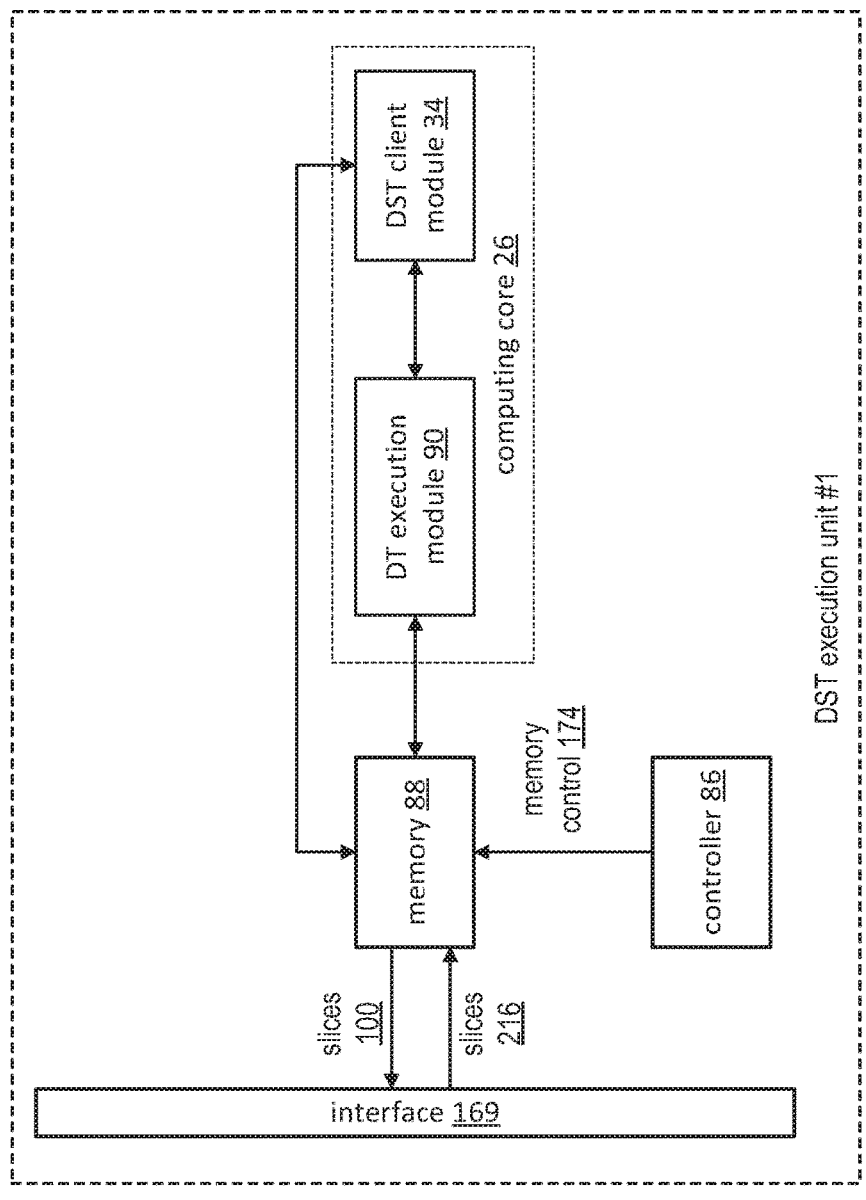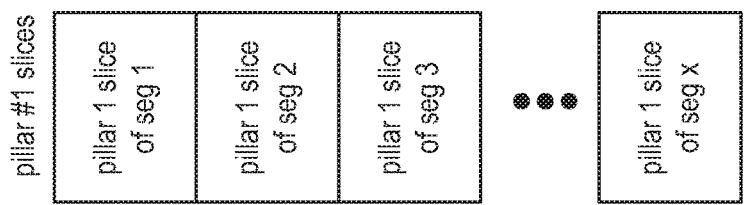
FIG. 24

DST allocation info 242 data partition info 320: data ID; No. of partitions; Addr. info for each partition; format conversion indication intermediate result info 324 task execution info 322

| task 326 | task ordering 328 | data partition 330 | set of DT EX mods 332 | Name 334 | interm. result processing 336 | scratch pad storage 338 | intermediate result storage 340 |
|---|---|---|---|---|---|---|---|
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4<br>2_5 - 2_z | 1_1, 2_1, 3_1, 4_1, & 5_1<br>1_2, 2_2, 3_2, 4_2, & 5_2 | R1-3 | DST unit 2 | DST unit 2 | DST units 2-6 |
| 1_4 | after 1_3 | R1-3_1 - R1-3_4<br>R1-3_5 - R1-3_z | 1_1, 2_1, 3_1, 4_1, & 5_1<br>1_2, 2_2, 6_1, 7_1, & 7_2 | R1_4 | DST unit 3 | DST unit 3 | DST units 3-7 |
| 1_5 | after 1_4 | R1-4_1 - R1-4_z &<br>2_1 - 2_z | 1_1, 2_1, 3_1, 4_1, & 5_1 | R1-5 | DST unit 1 | DST unit 1 | DST units 1-5 |
| 1_6 | after 1_1 &<br>1_5 | R1-1_1 - R1-1_z &<br>R1-5_1 - R1-5_z | 1_1, 2_1, 3_1, 4_1, & 5_1 | R1-6 | DST unit 2 | DST unit 2 | DST units 2-6 |
| 1_7 | after 1_2 &<br>1_5 | R1-2_1 - R1-2_z &<br>R1-5_1 - R1-5_z | 1_2, 2_2, 2_3, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 2_3, 3_2, 4_2, & 5_2 | R3-2 | DST unit 5 | DST unit 5 | DST units 5,6, 1-3 |

FIG. 32

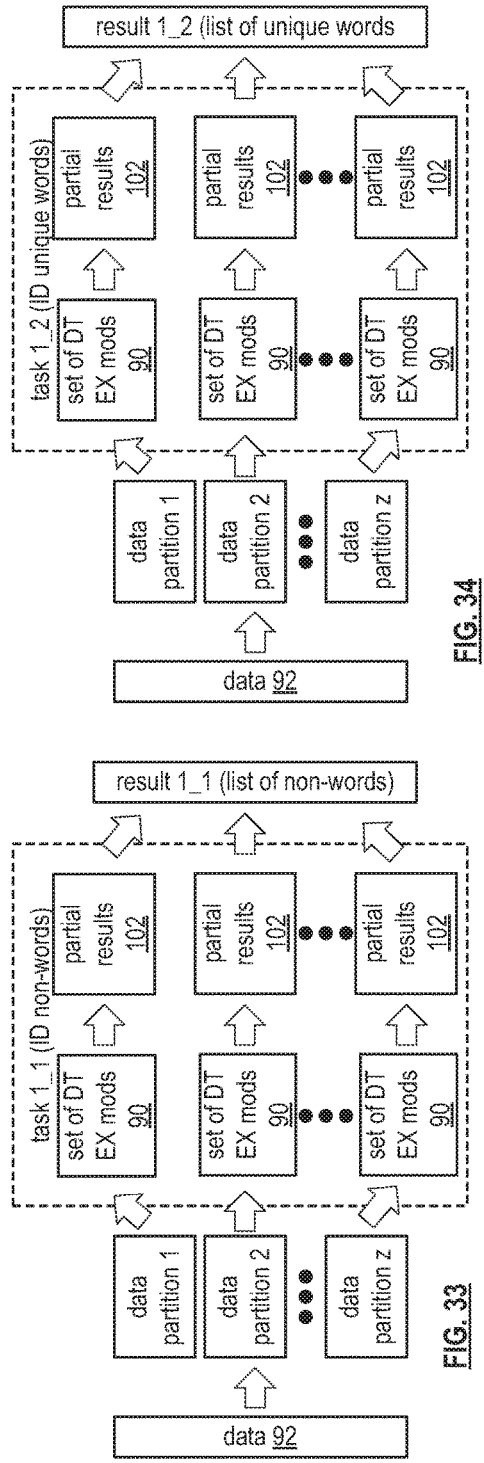
FIG. 33
FIG. 34
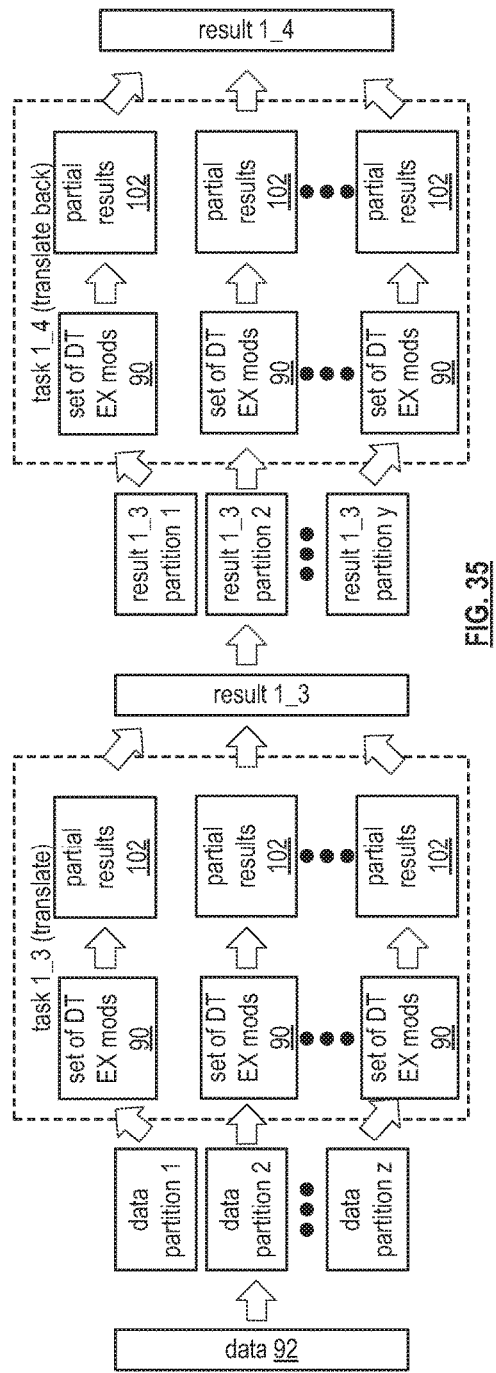
FIG. 35

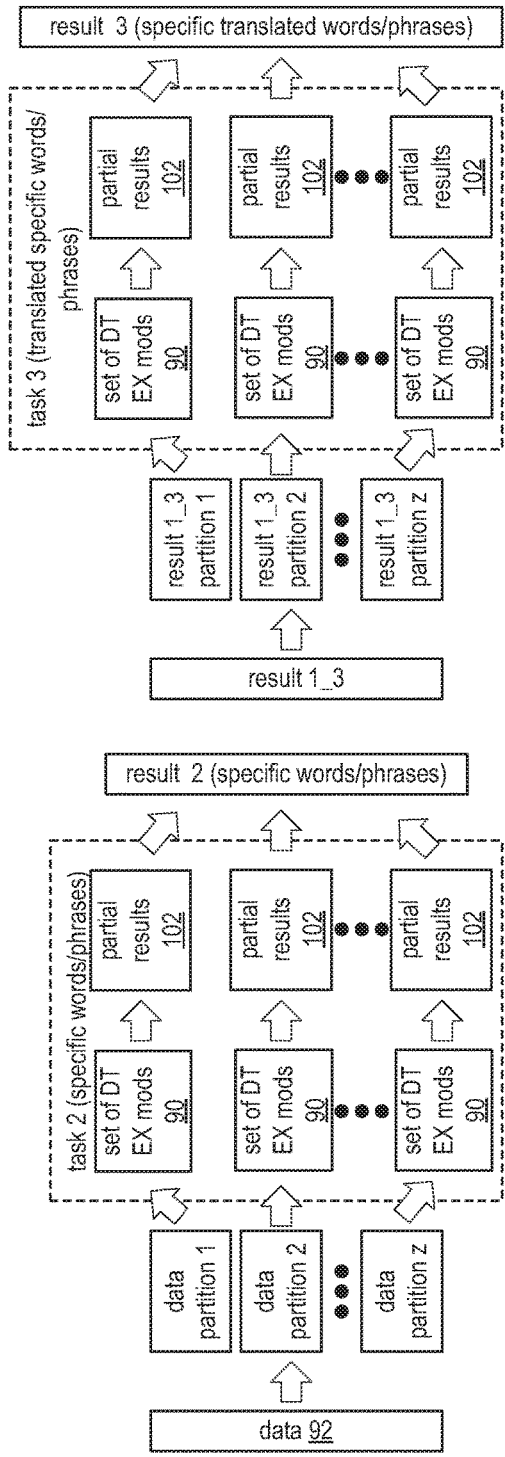
FIG. 38
FIG. 37
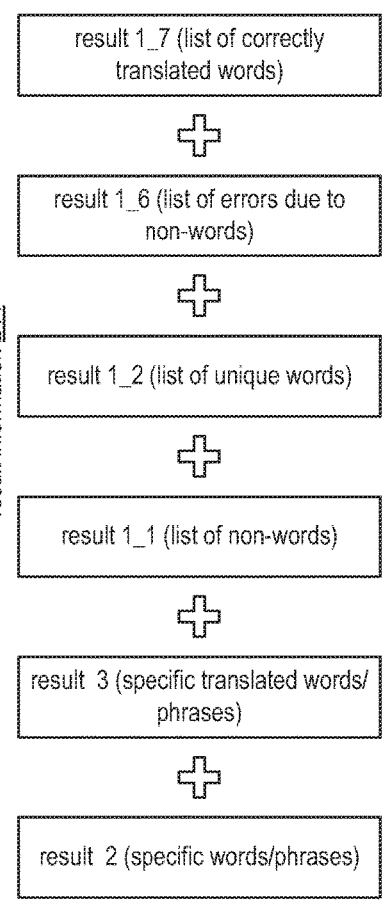
FIG. 39

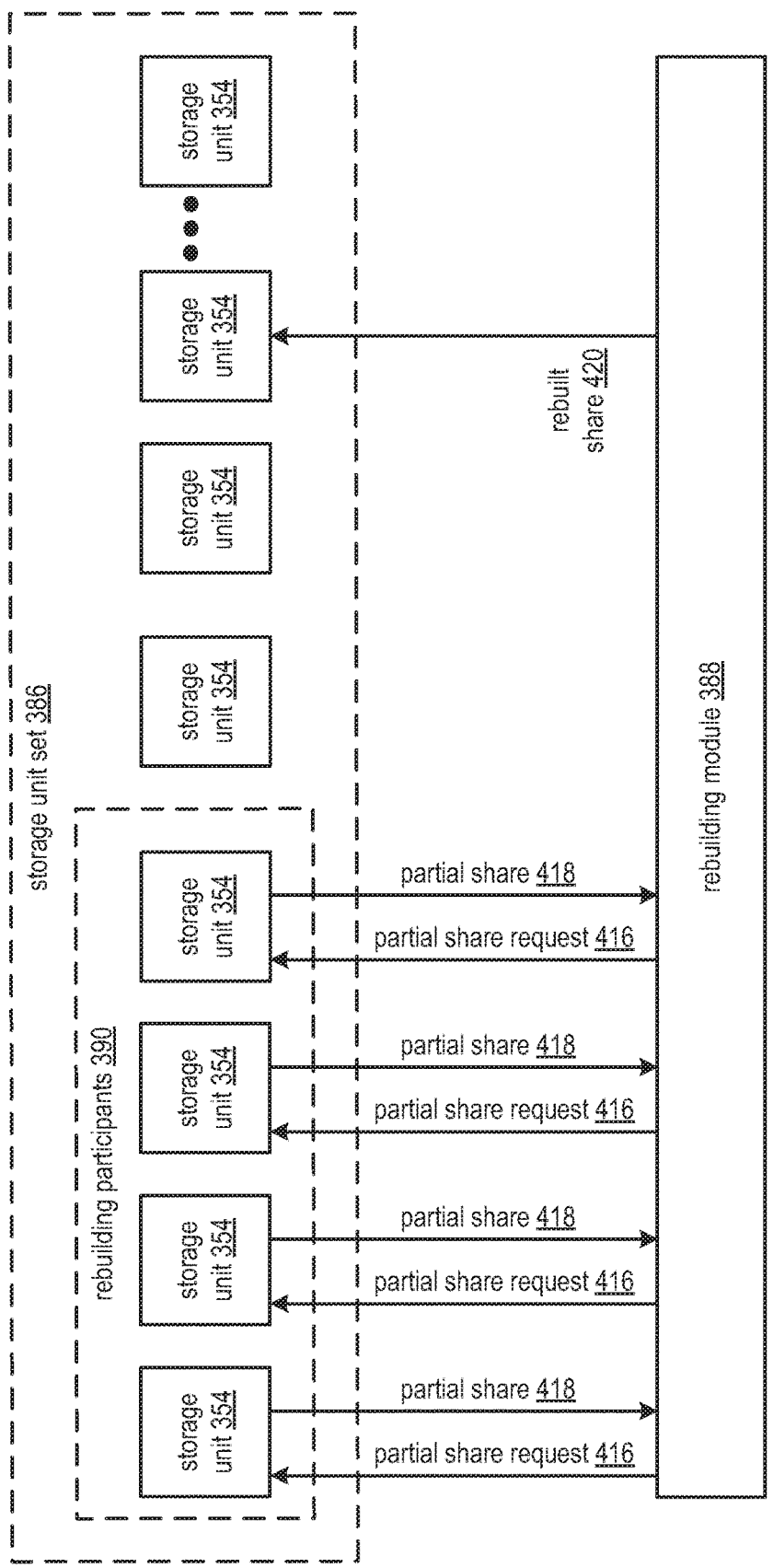

Shamir secret sharing scheme 421

Blakley secret sharing scheme 429

Rabin IDA secret sharing scheme 437

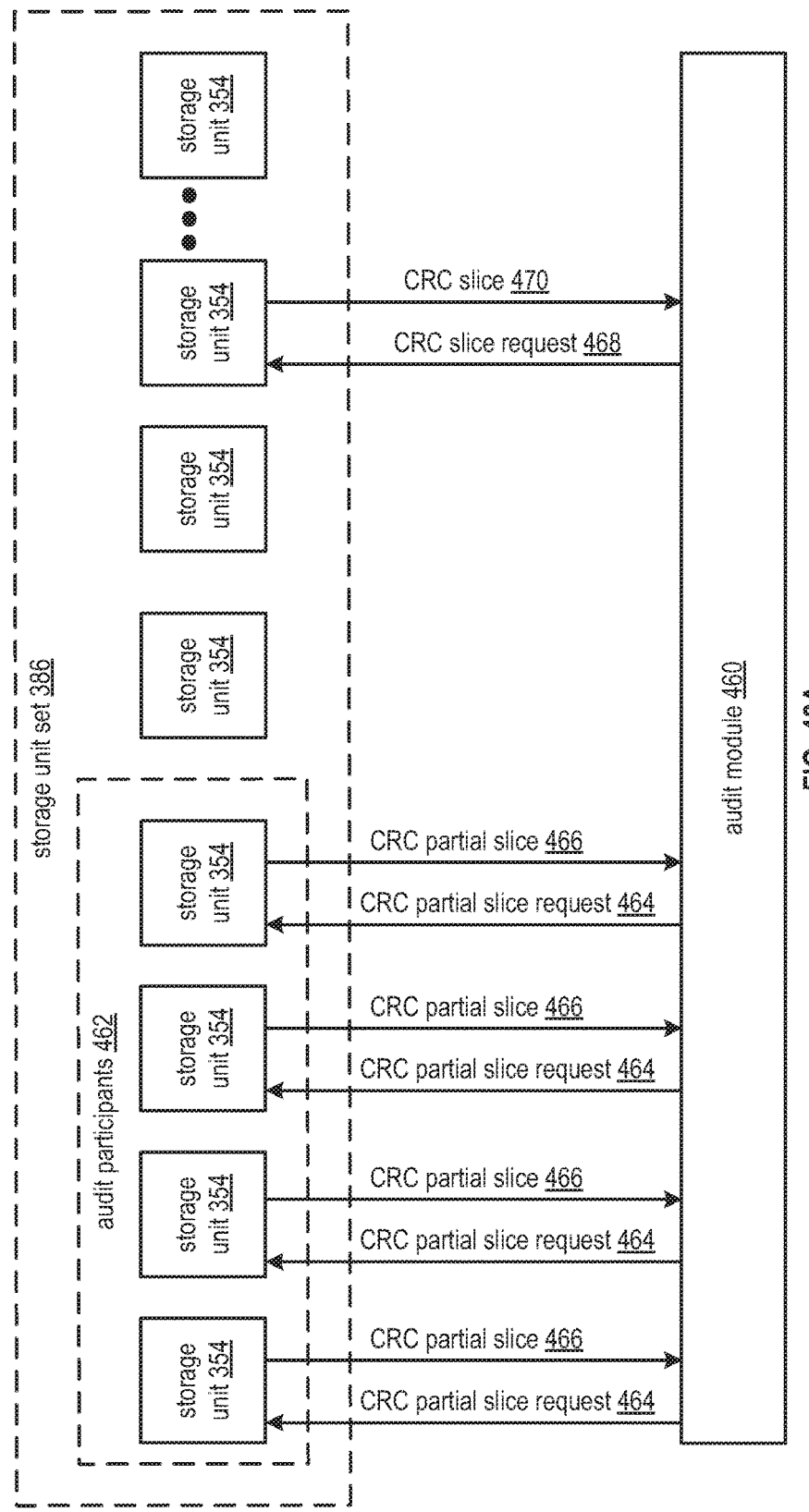

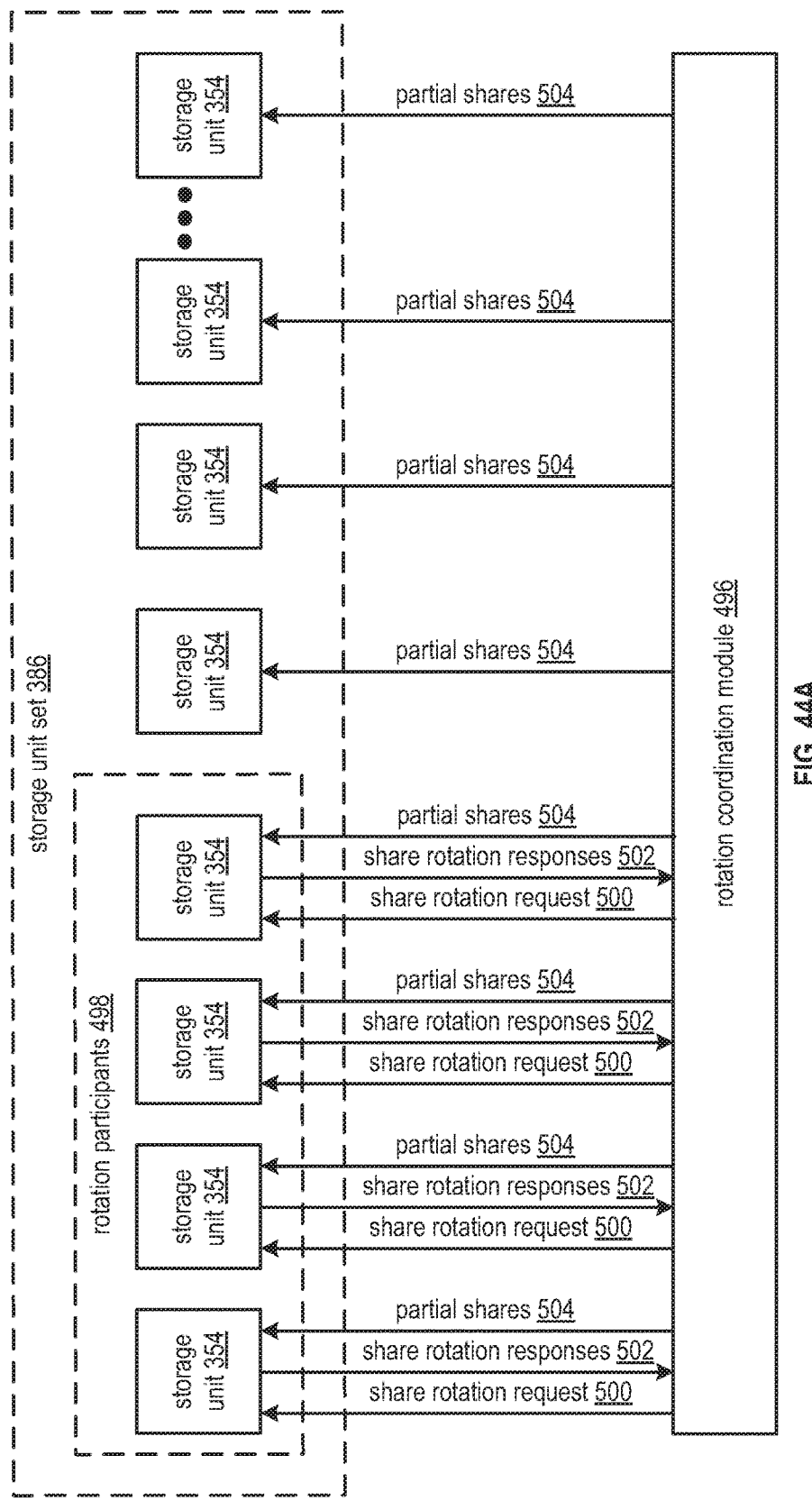

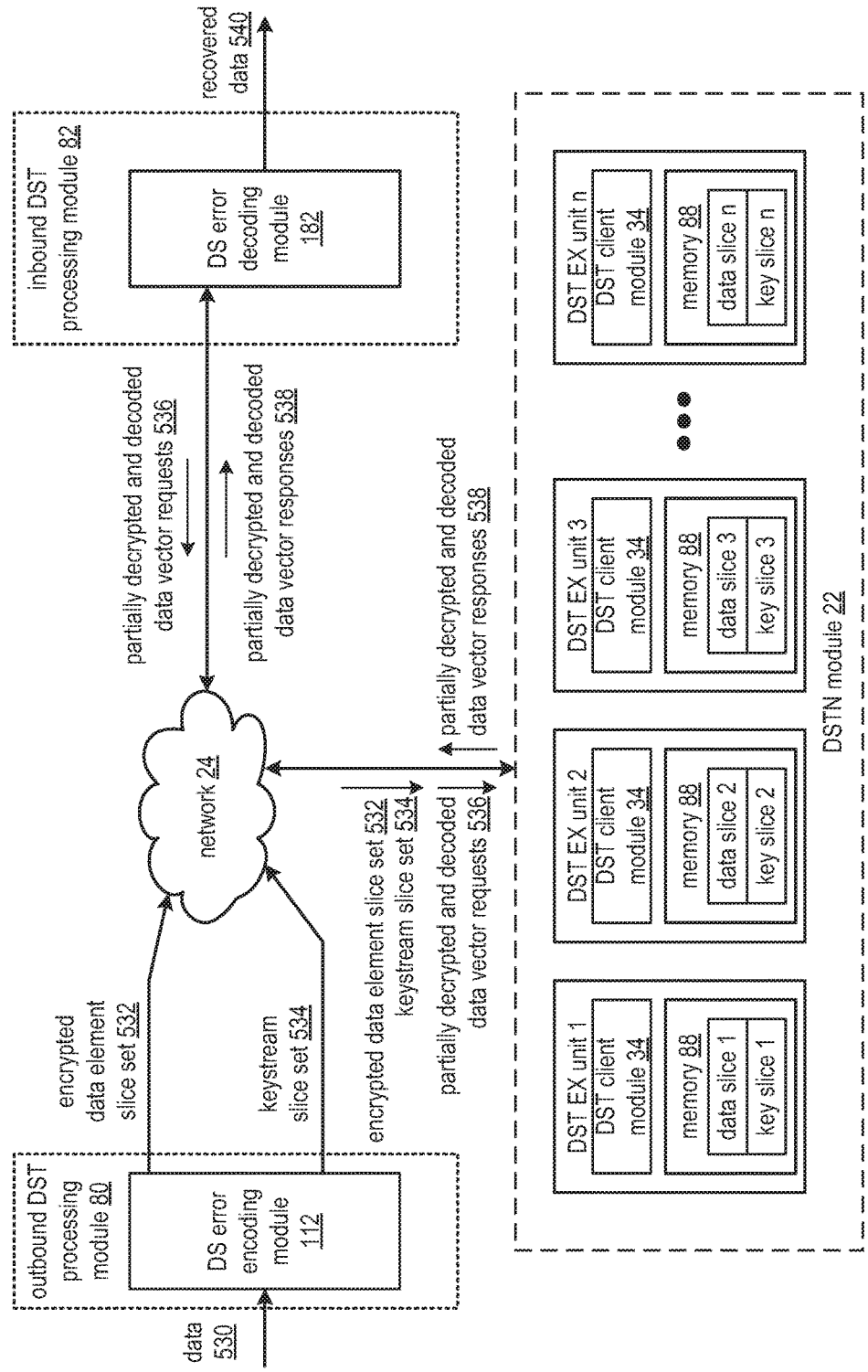

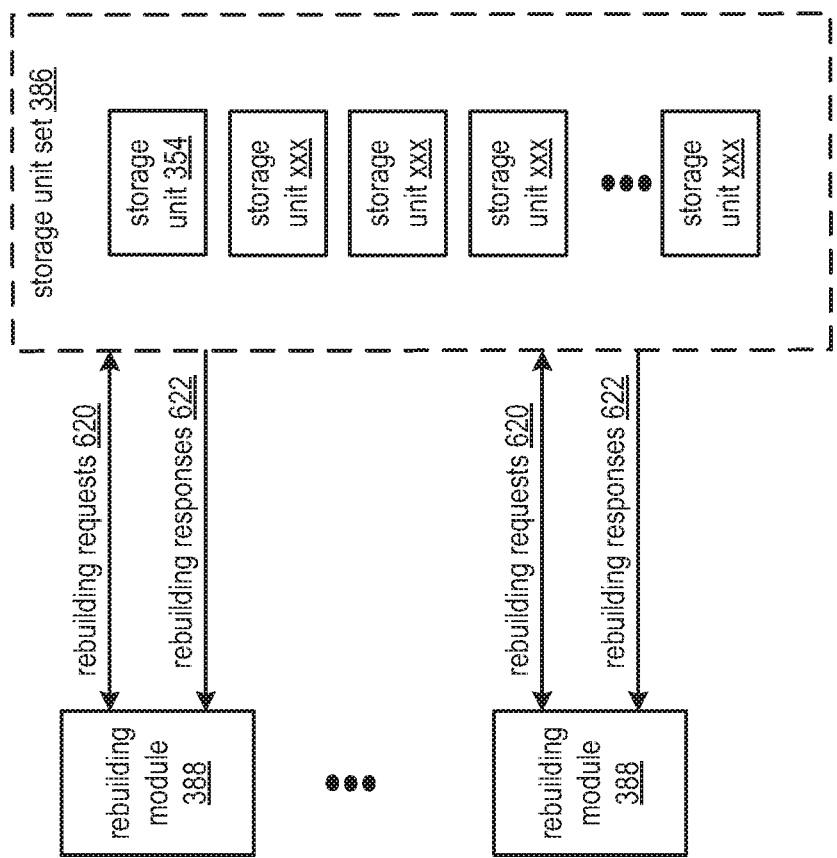

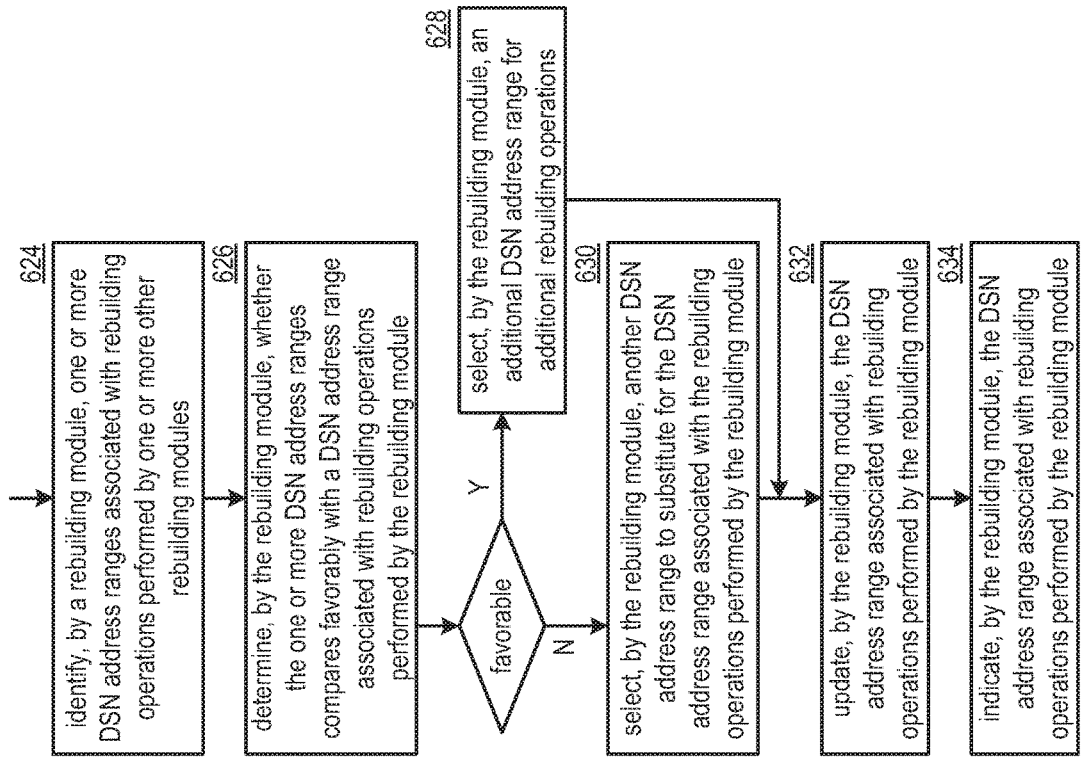

SECURING DATA IN A DISPERSED STORAGE NETWORK

CROSS REFERENCE TO RELATED PATENTS

The present U.S. Utility Patent Application claims priority pursuant to 35 U.S.C. § 120 as a continuation of U.S. Utility application Ser. No. 14/256,472, entitled "SECURING DATA IN A DISPERSED STORAGE NETWORK", filed Apr. 18, 2014, issuing as U.S. Pat. No. 9,432,341 on Aug. 30, 2016, which claims priority pursuant to 35 U.S.C. § 119(e) to U.S. Provisional Application No. 61/828,905 entitled "ENCRYPTED ZERO INFORMATION GAIN DATA REBUILDING", filed May 30, 2013, all of which are hereby incorporated herein by reference in their entirety and made part of the present U.S. Utility Patent Application for all purposes.

STATEMENT REGARDING FEDERALLY SPONSORED RESEARCH OR DEVELOPMENT

NOT APPLICABLE

INCORPORATION-BY-REFERENCE OF MATERIAL SUBMITTED ON A COMPACT DISC

NOT APPLICABLE

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

FIG. 42A is a schematic block diagram of another embodiment of a dispersed storage network (DSN) system in accordance with the present invention;

FIG. 43A is a schematic block diagram of another embodiment of a dispersed storage network (DSN) system in accordance with the present invention;

FIG. 44A is a schematic block diagram of another embodiment of a dispersed storage network (DSN) system in accordance with the present invention;

FIG. 45A is a schematic block diagram of another embodiment of a dispersed storage network (DSN) system in accordance with the present invention;

FIG. 46A is a schematic block diagram of another embodiment of a dispersed storage network (DSN) system in accordance with the present invention;

FIG. 46B is a flowchart illustrating an example of managing rebuilding performance in accordance with the present invention;

DETAILED DESCRIPTION OF THE INVENTION

Figure 1:
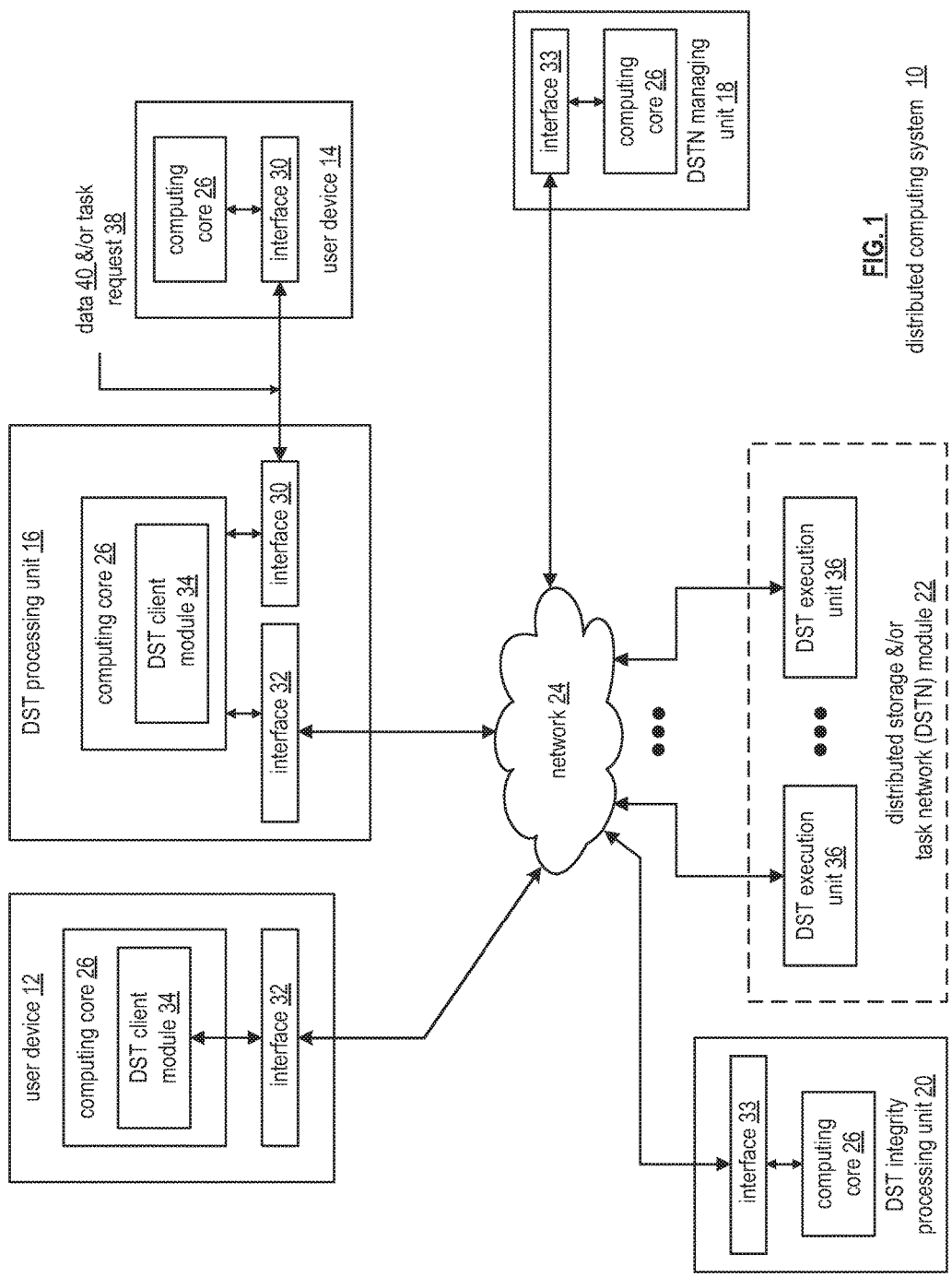
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations include authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
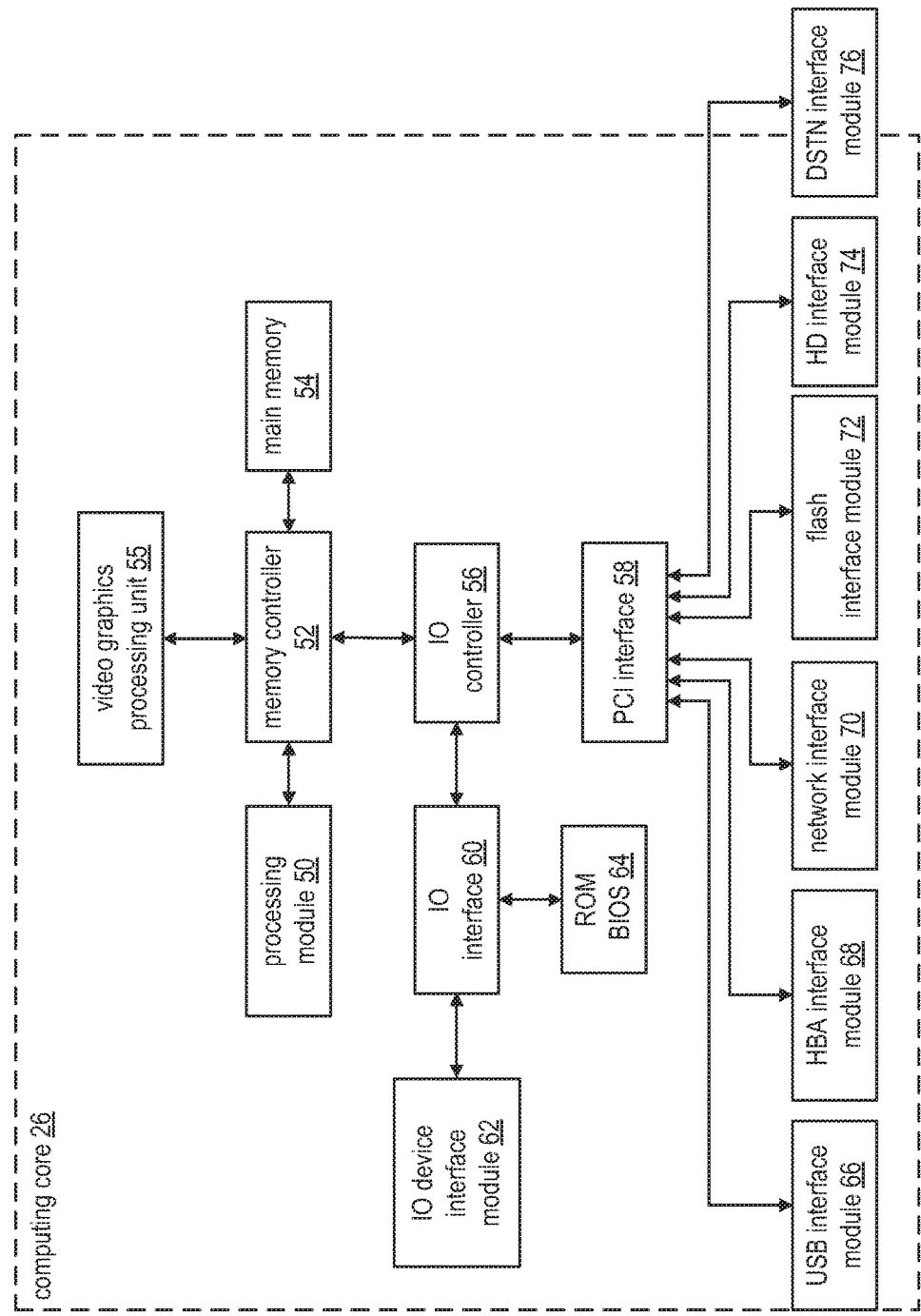
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
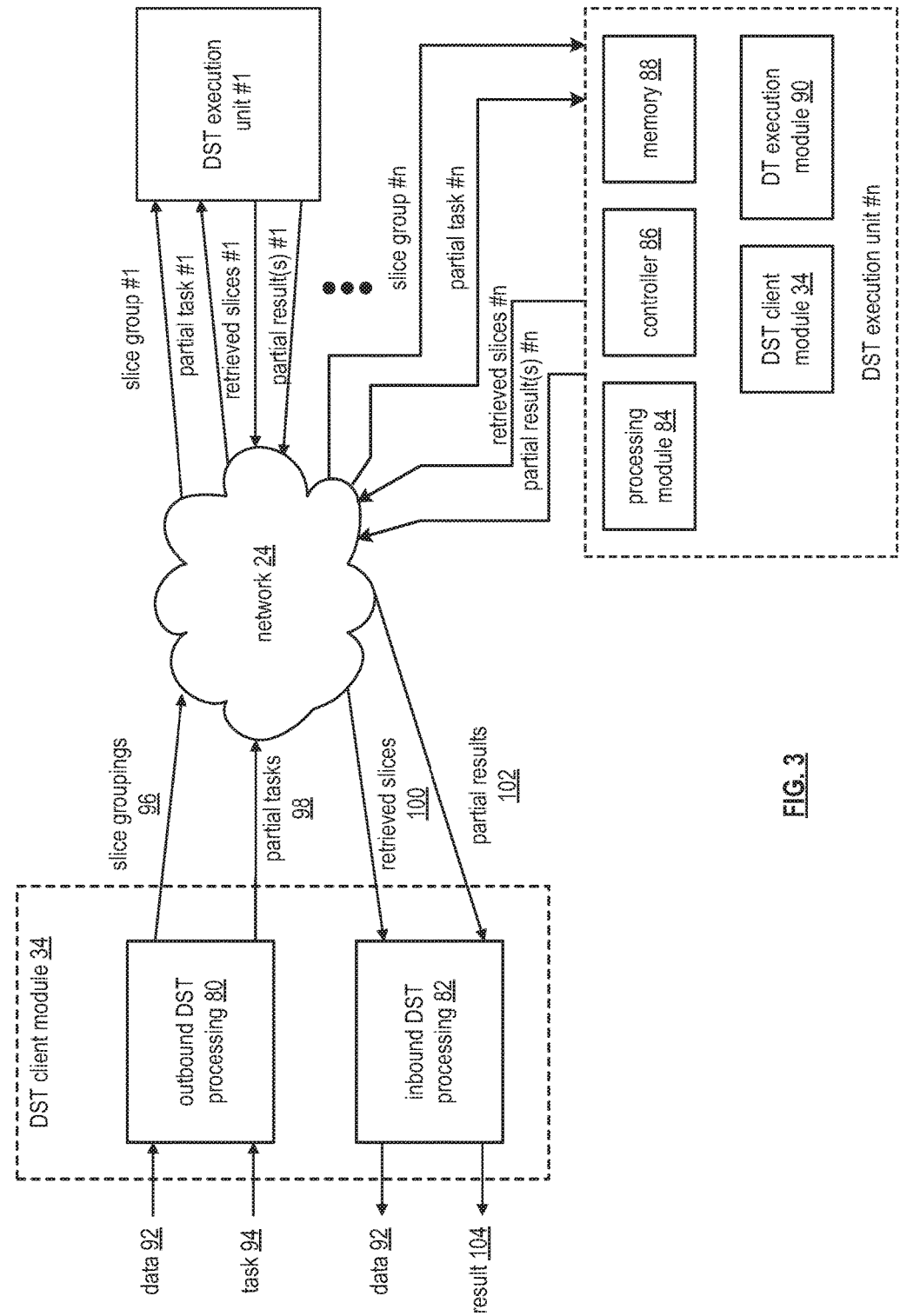
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
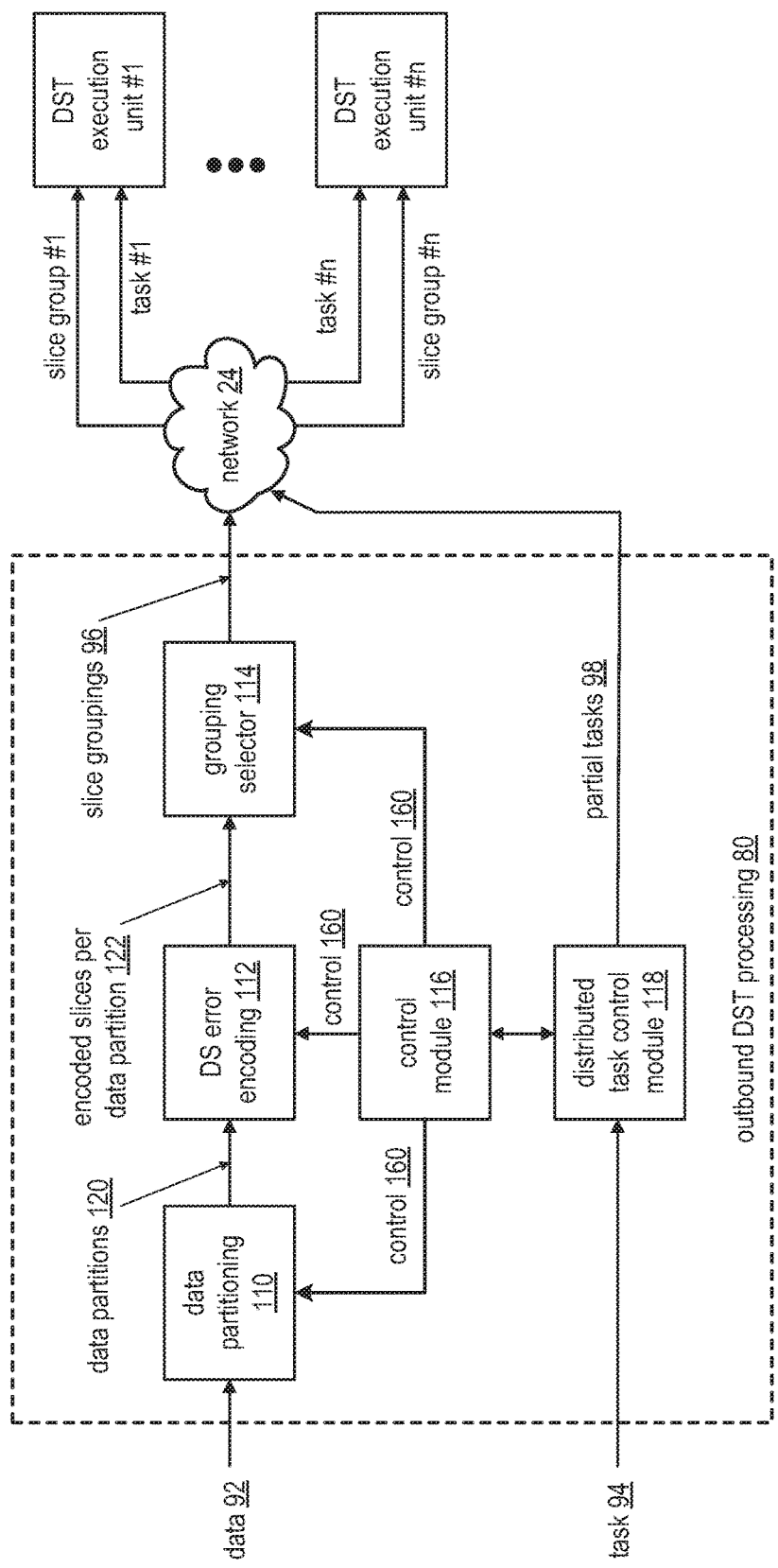
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
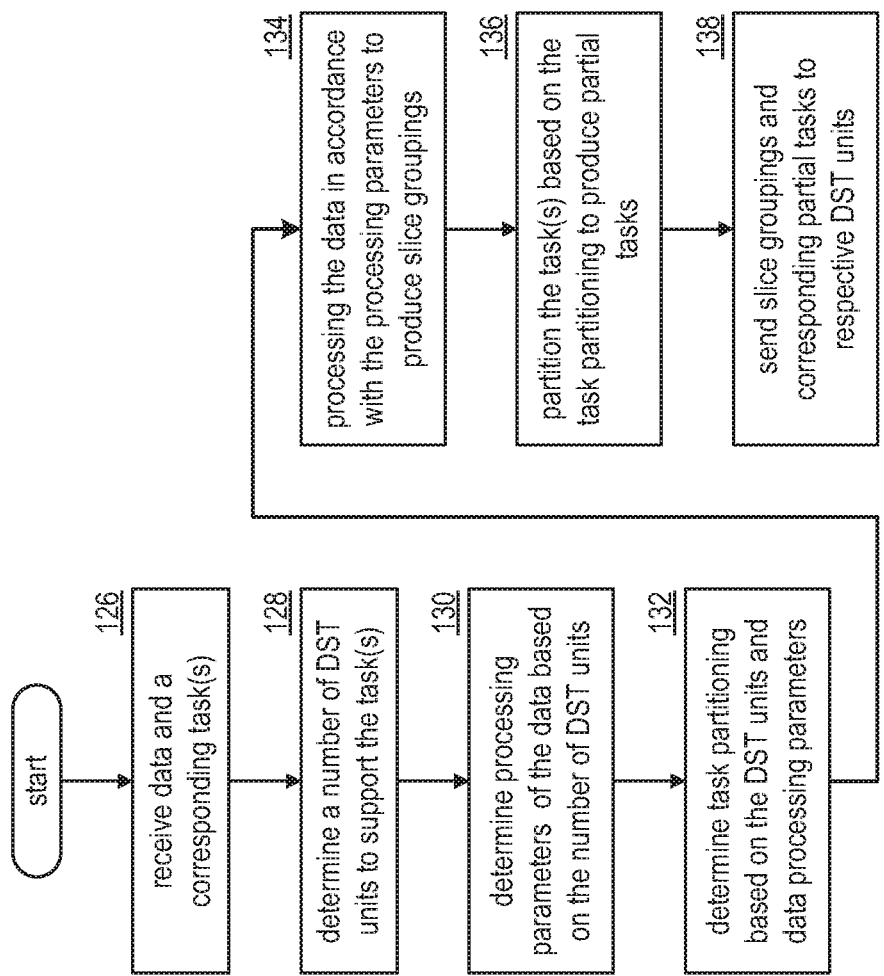
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
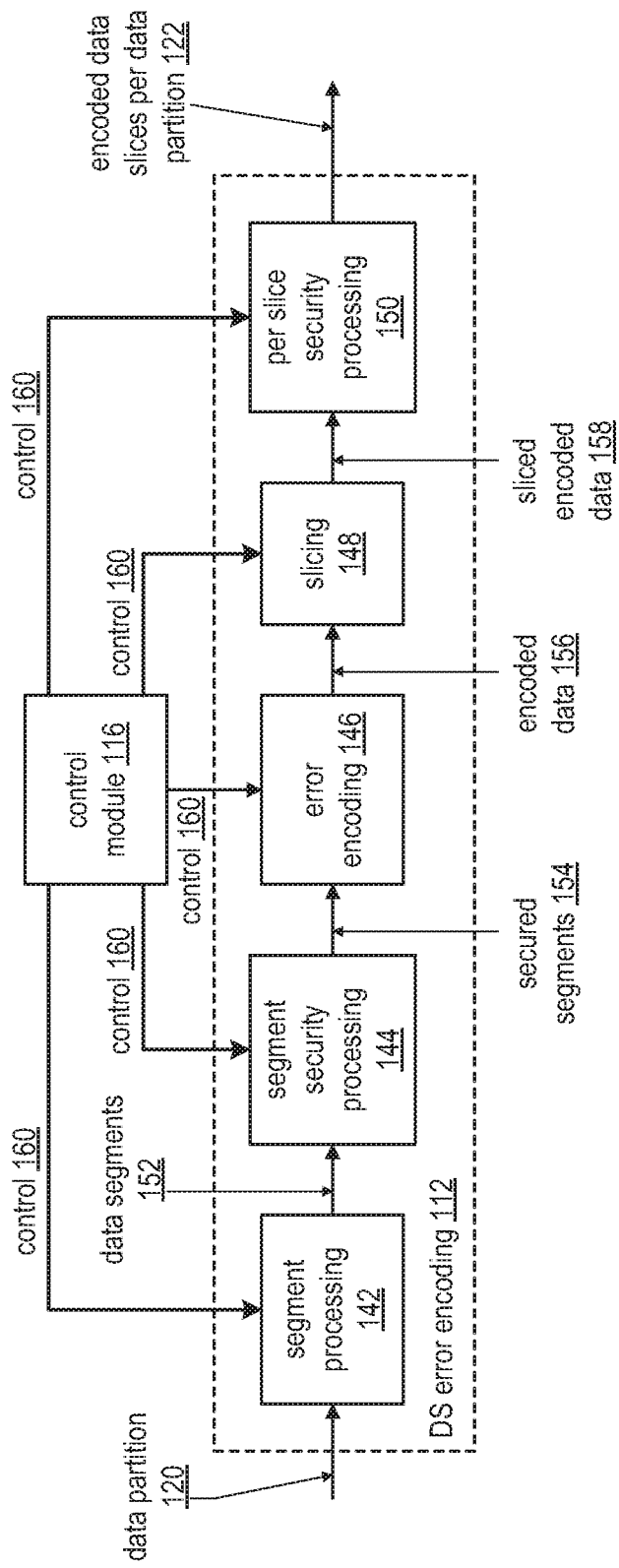
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
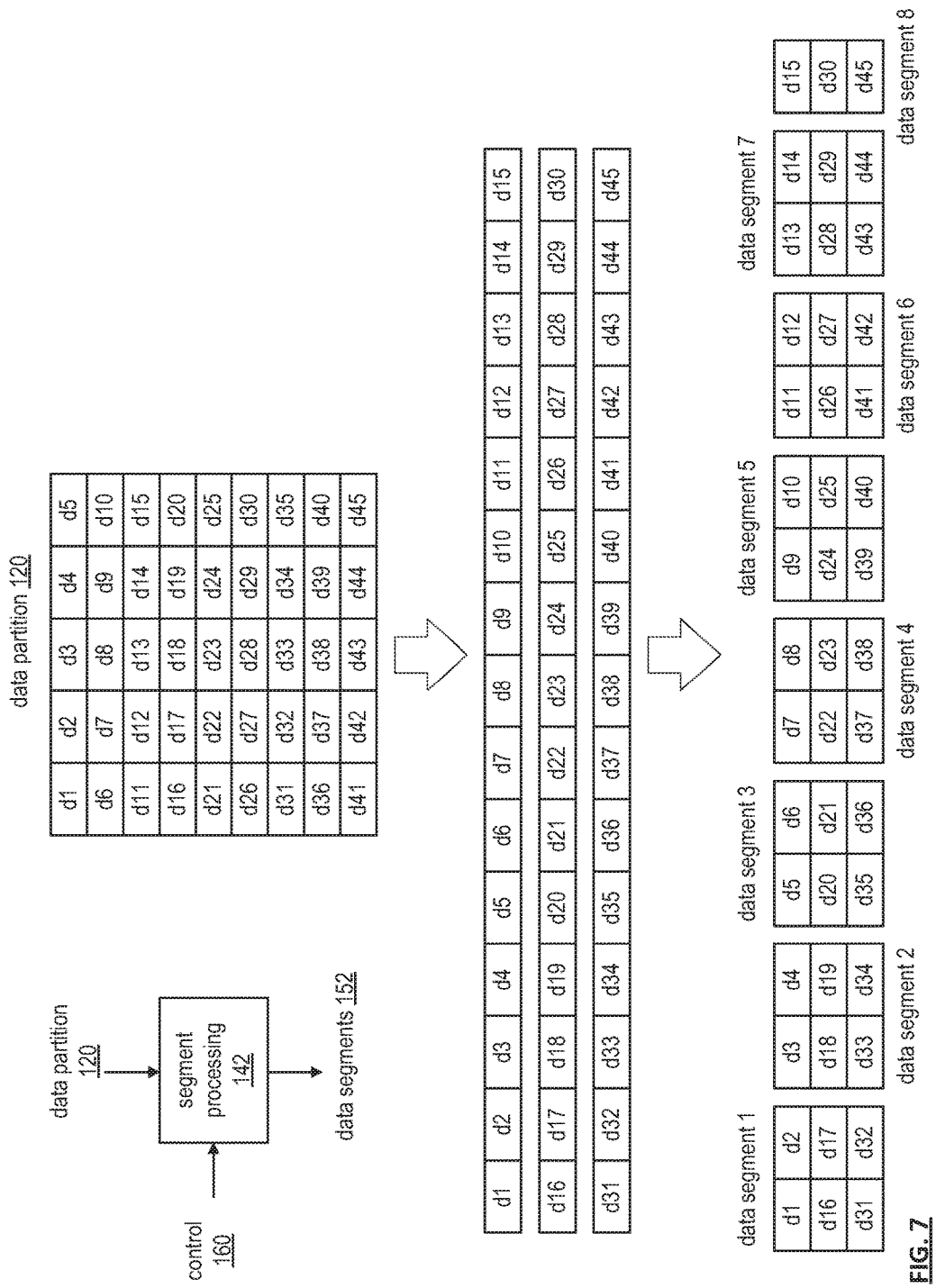
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
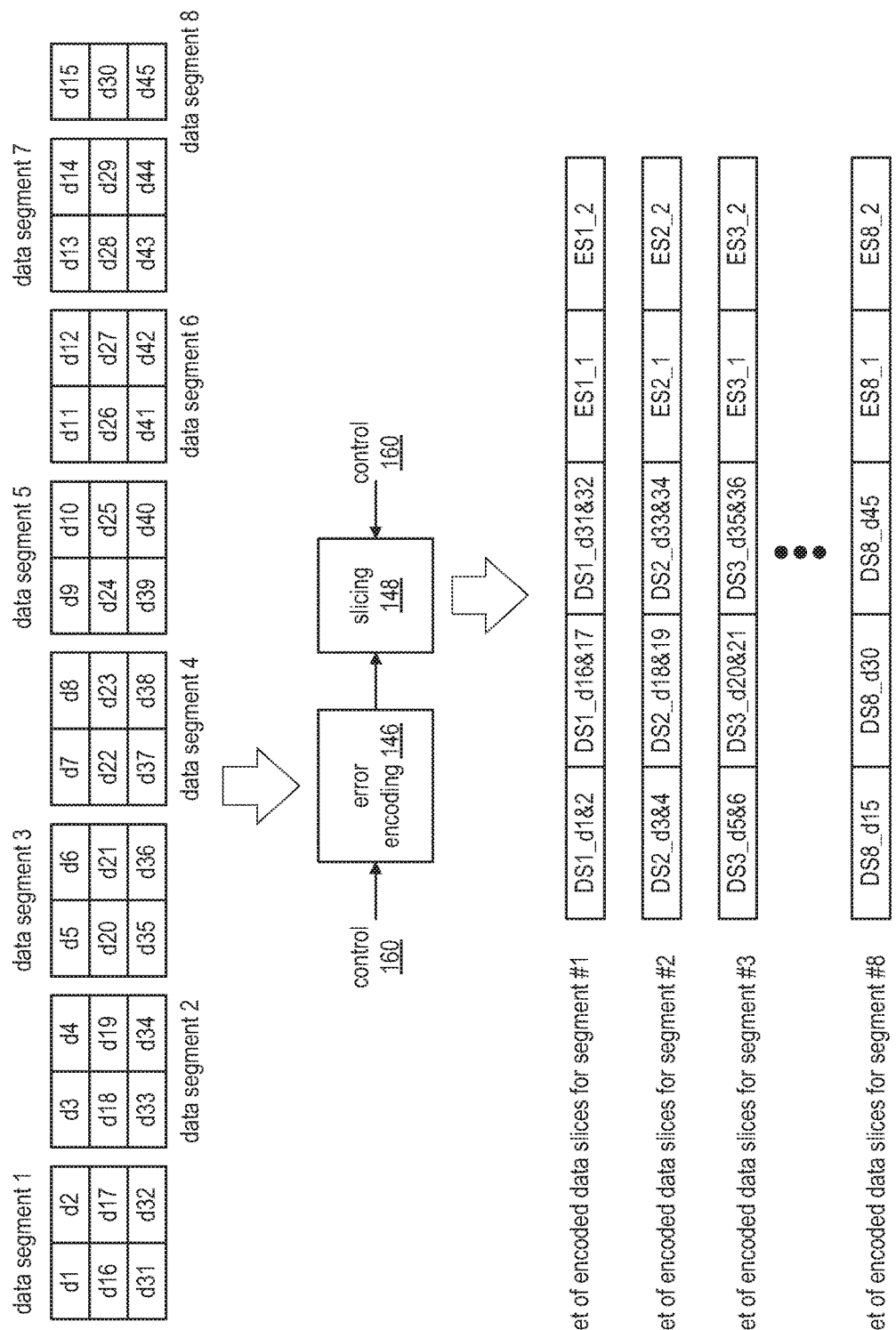
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1&2) of the first set of encoded data slices (e.g., corresponding to data segment 1) is substantially similar to content of the first word (e.g., d1 & d2); the content of the second encoded data slice (DS1_d16&17) of the first set of encoded data slices is substantially similar to content of the second word (e.g., d16 & d17); and the content of the third encoded data slice (DS1_d31&32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18&19) of the second set of encoded data slices is substantially similar to content of the second word (e.g., d18 & d19); and the content of the third encoded data slice (DS2_d33&34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
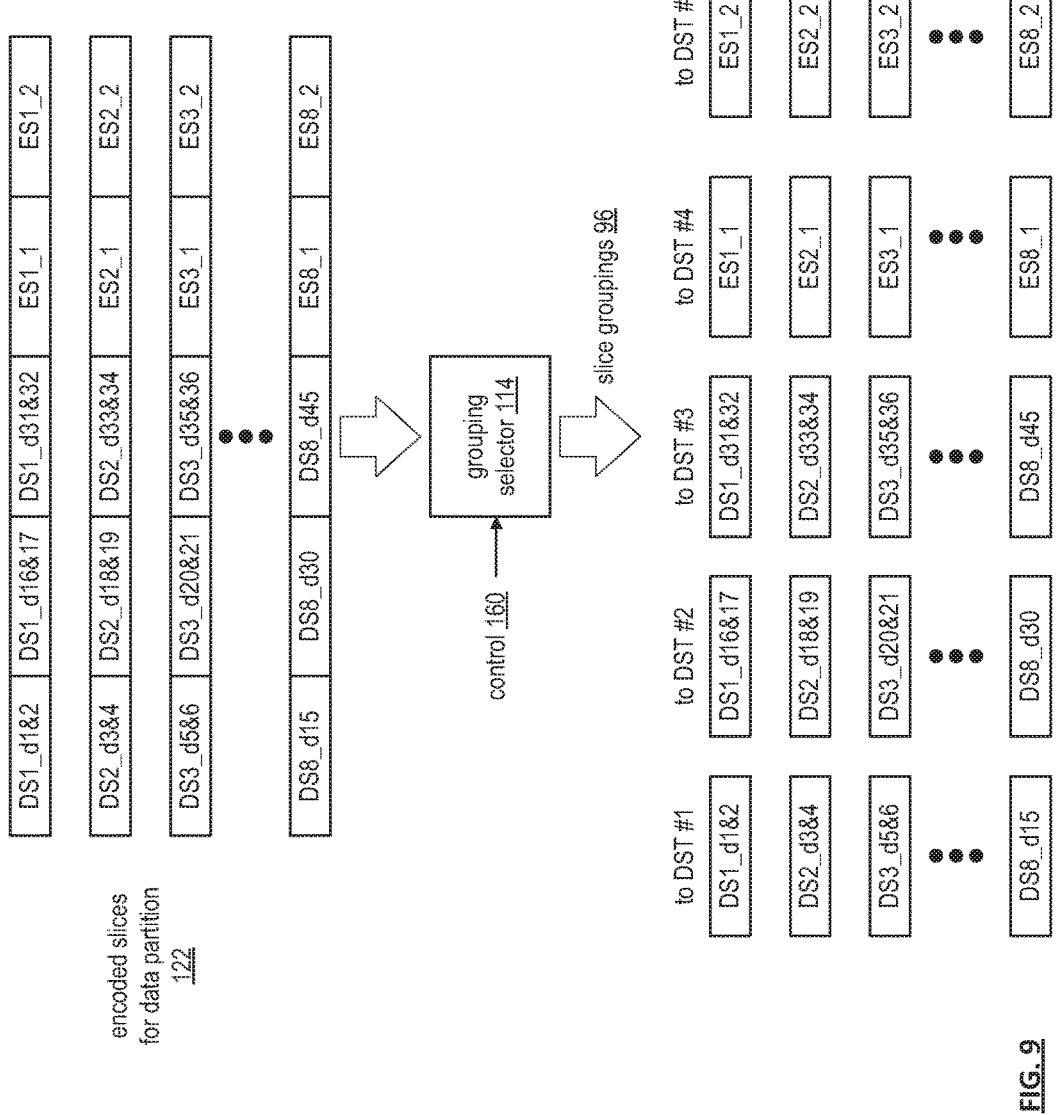
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with group selection information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
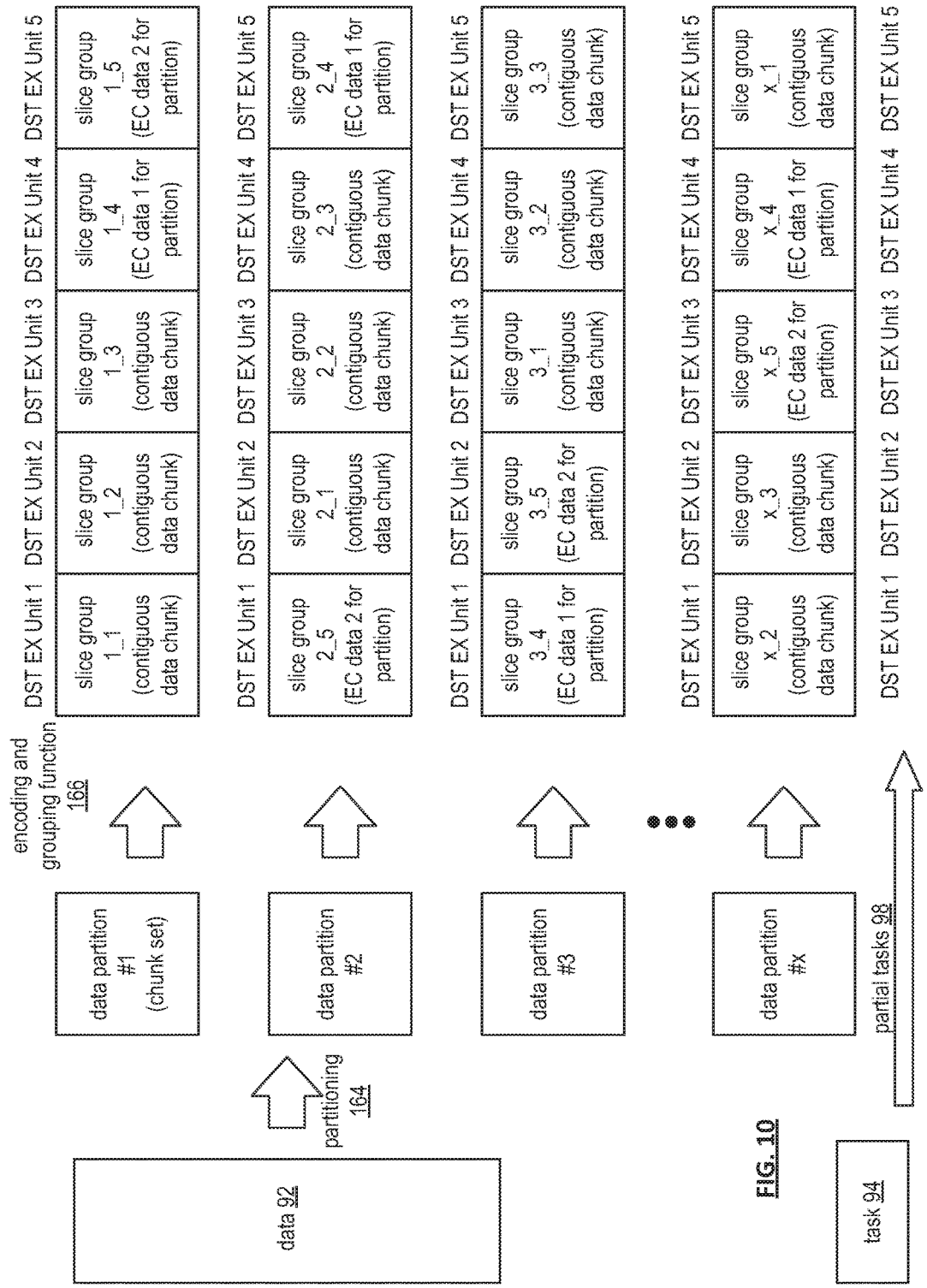
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
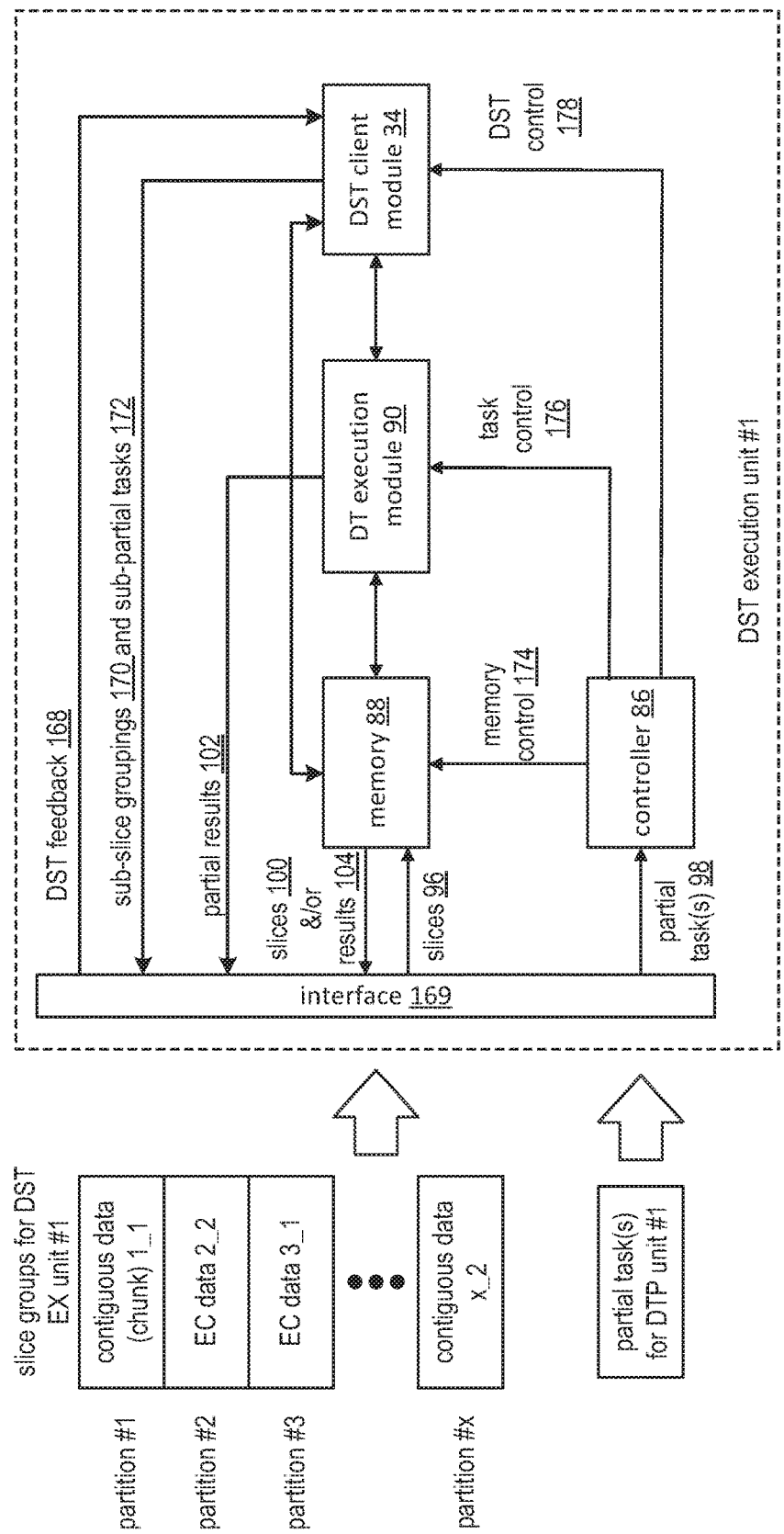
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
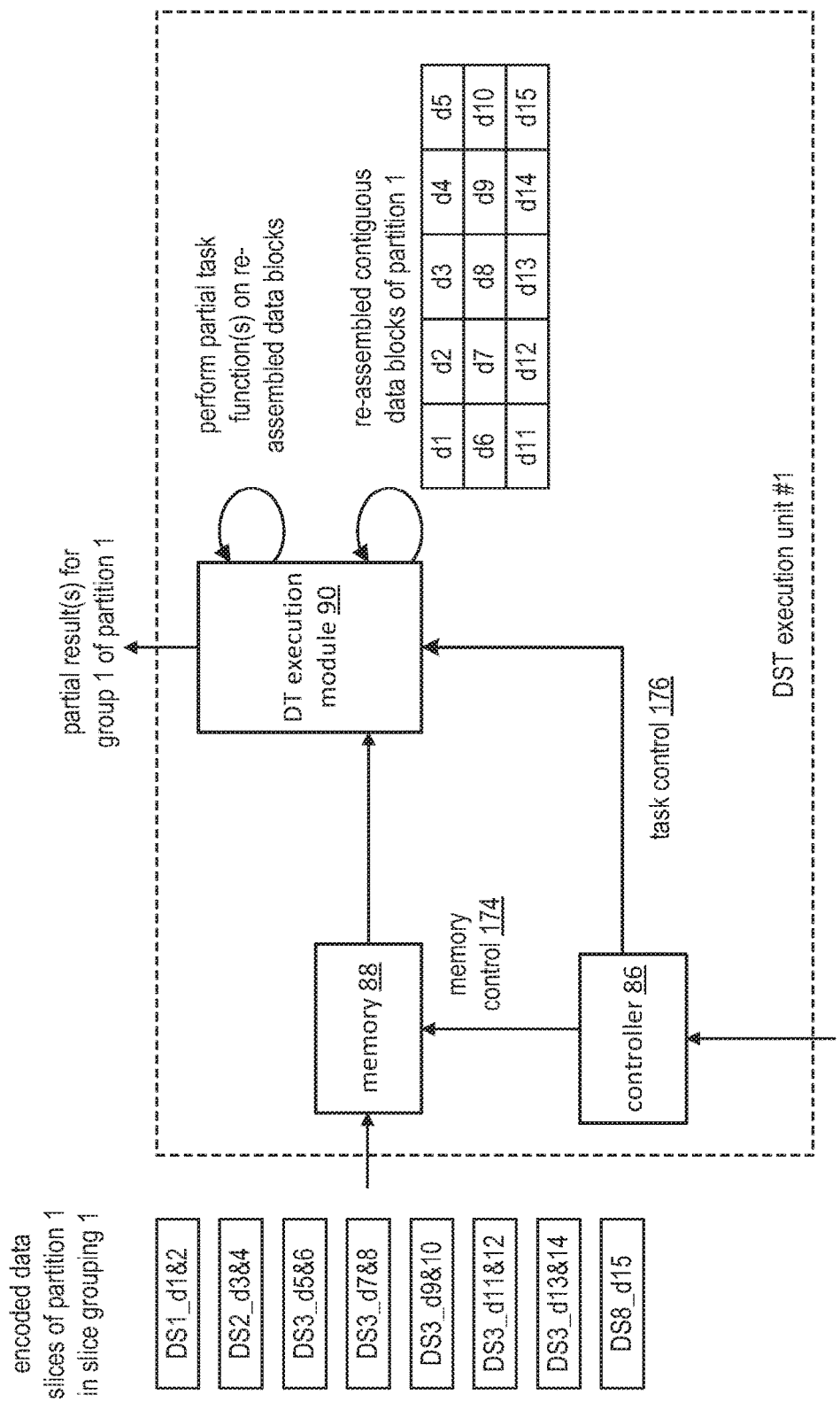
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first of step executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
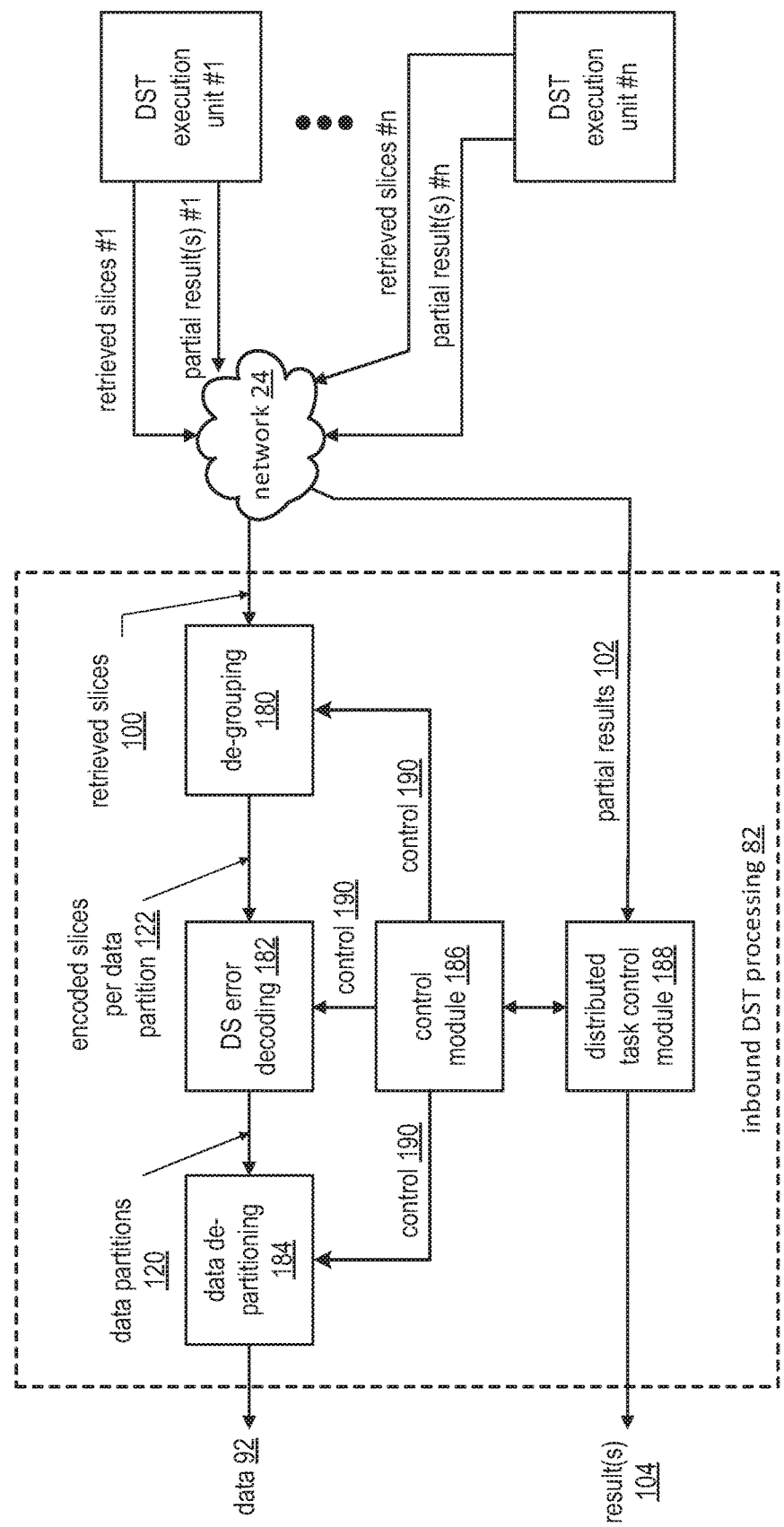
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
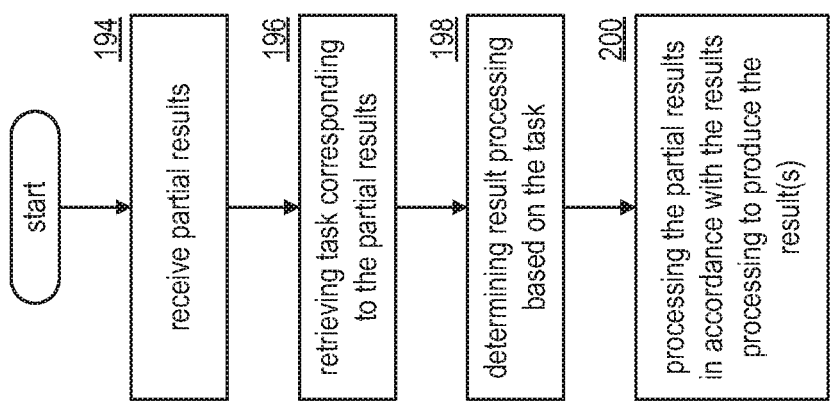
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
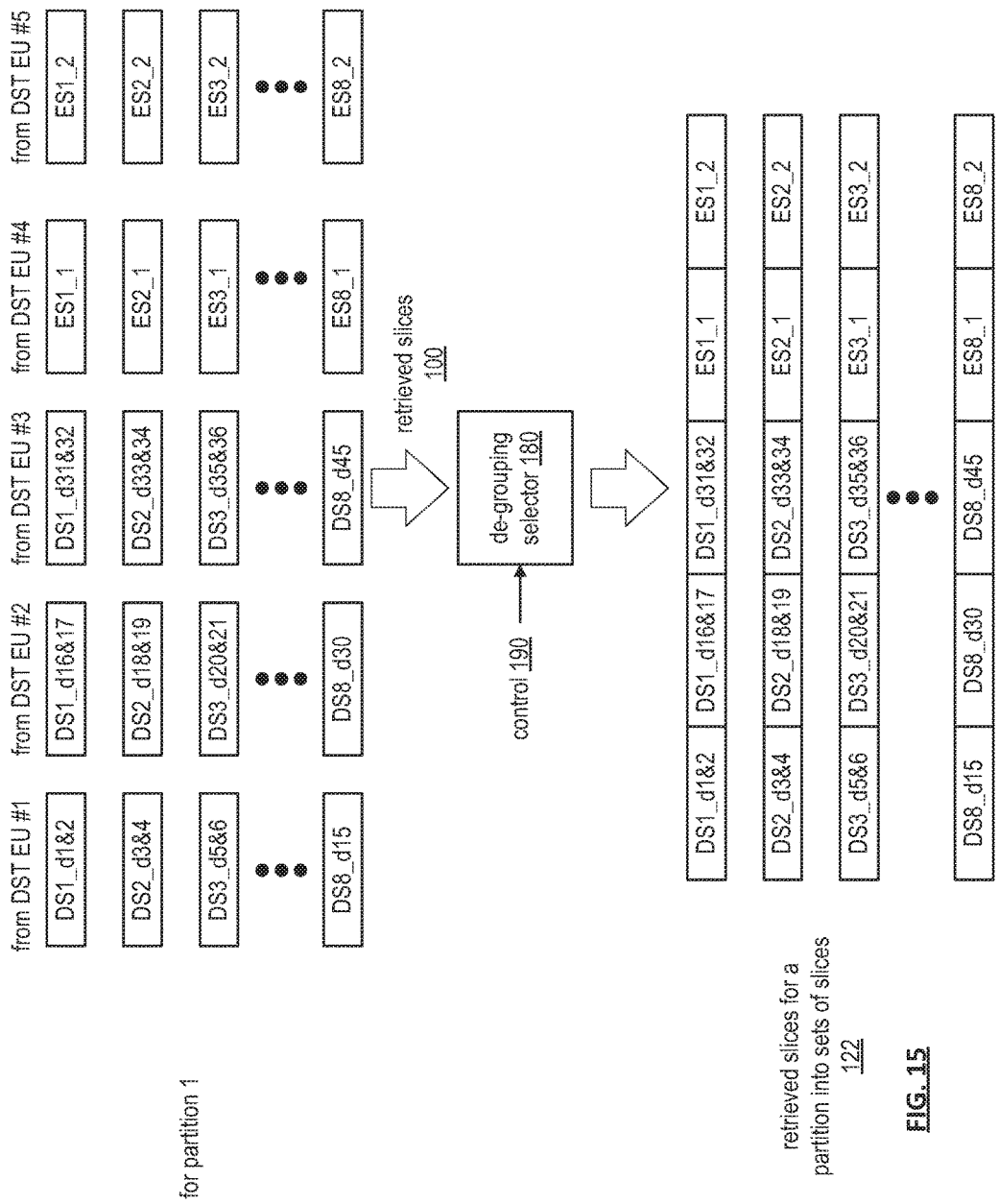
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
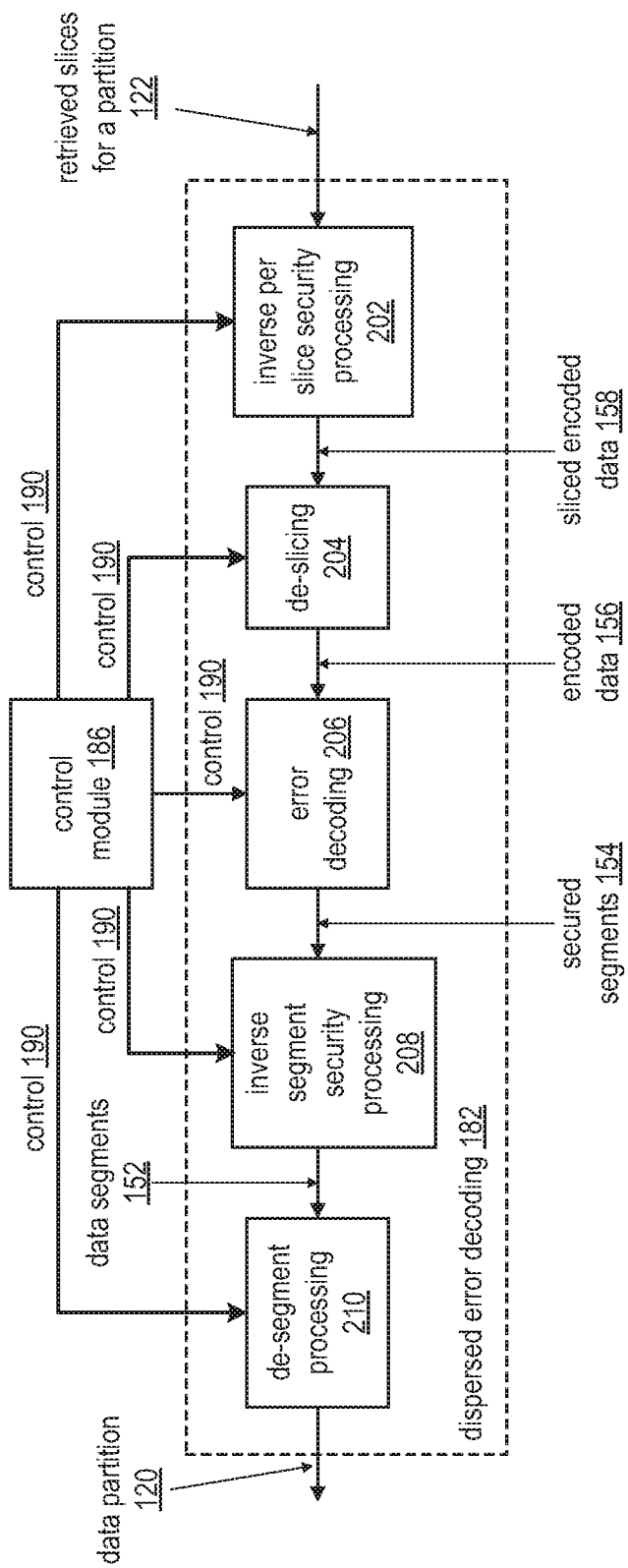
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce slice encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
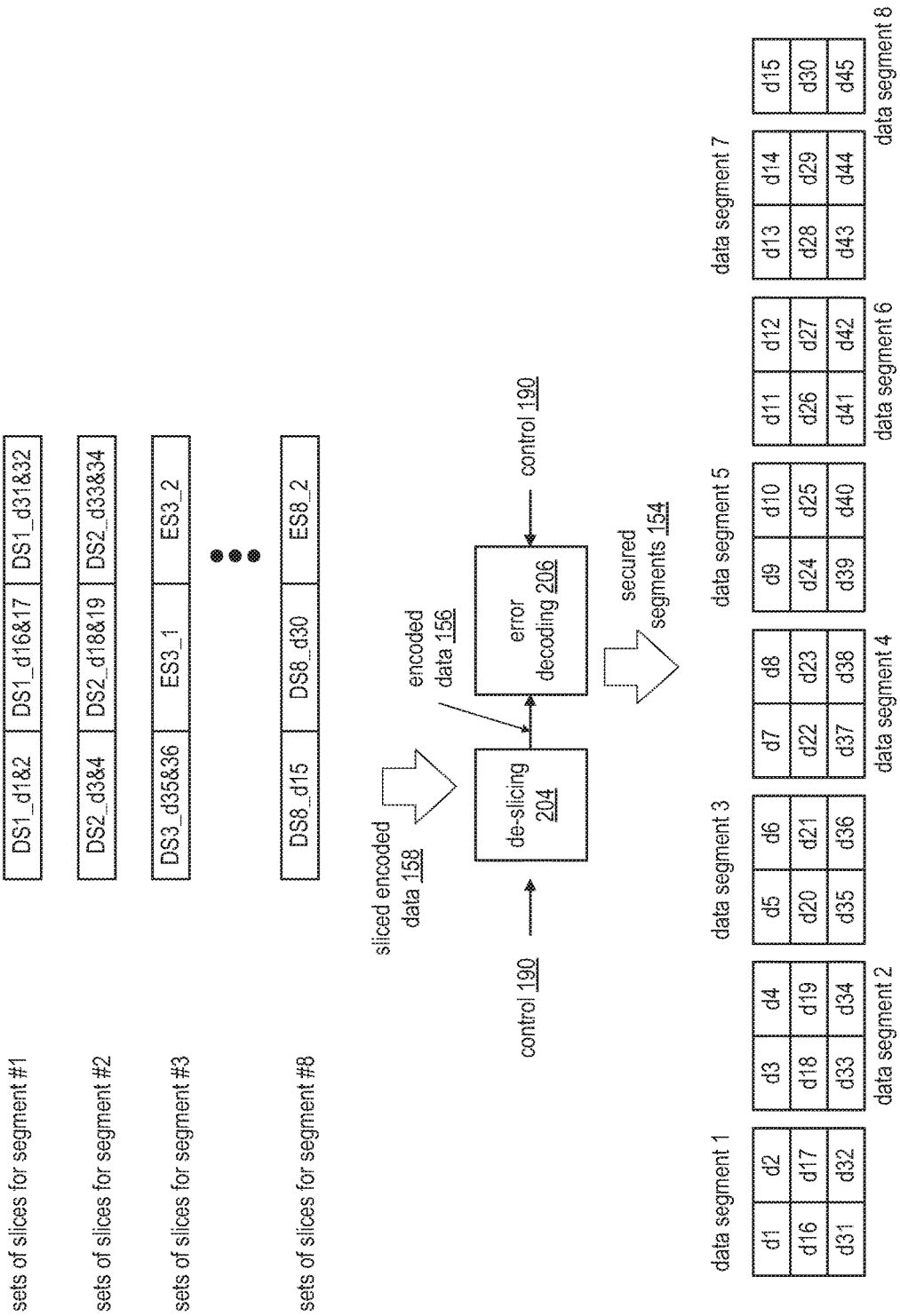
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1&d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
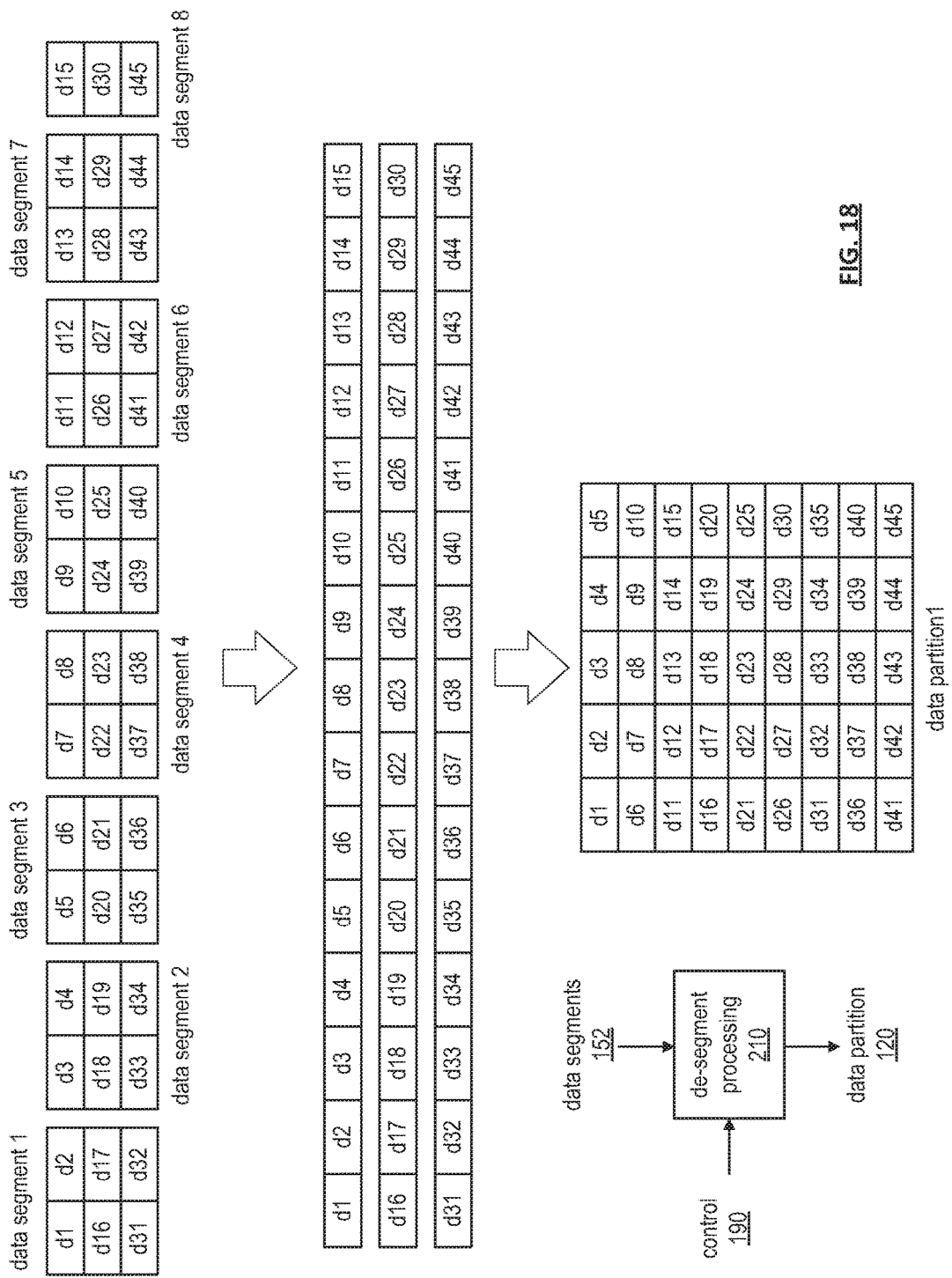
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
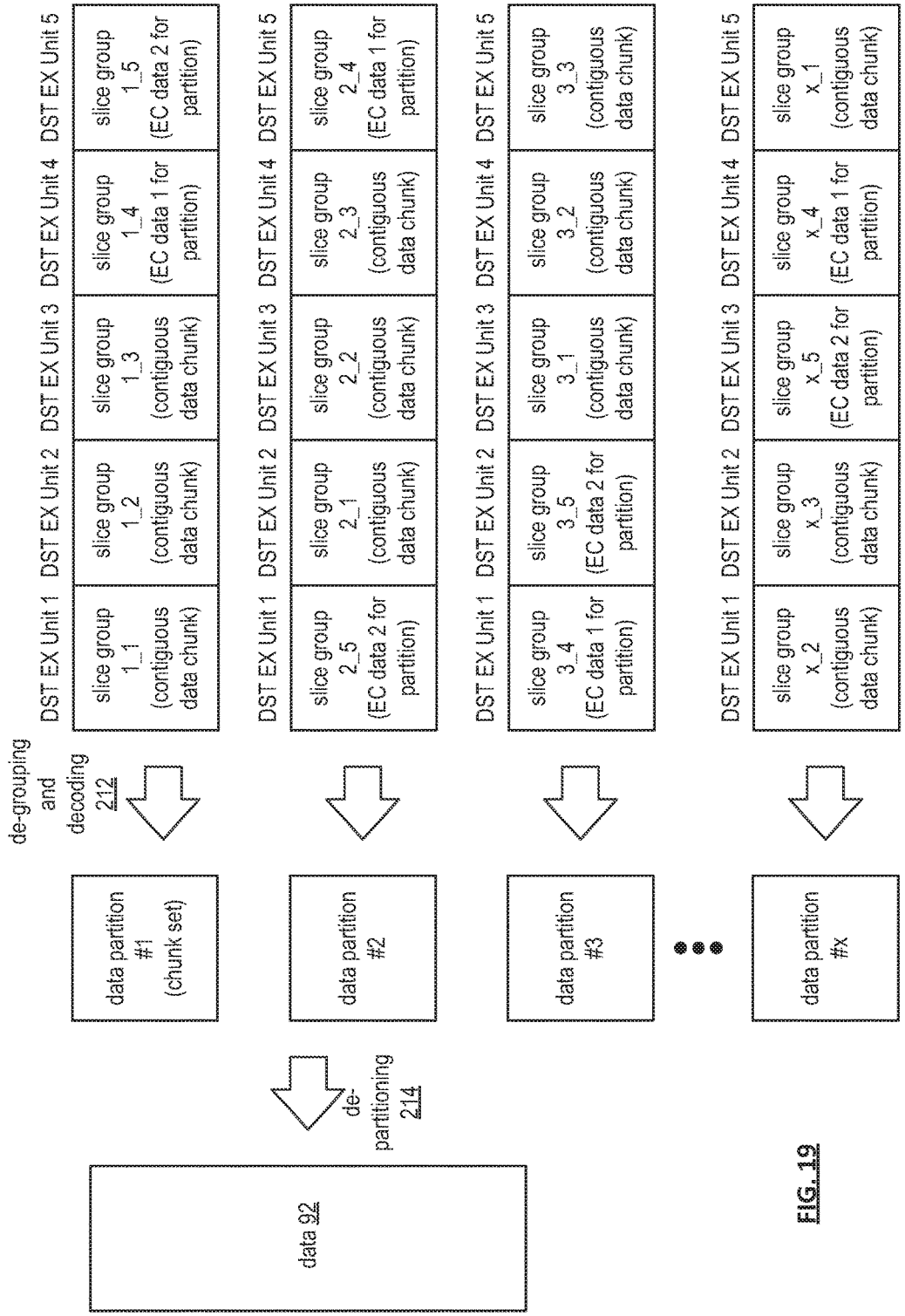
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1–x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
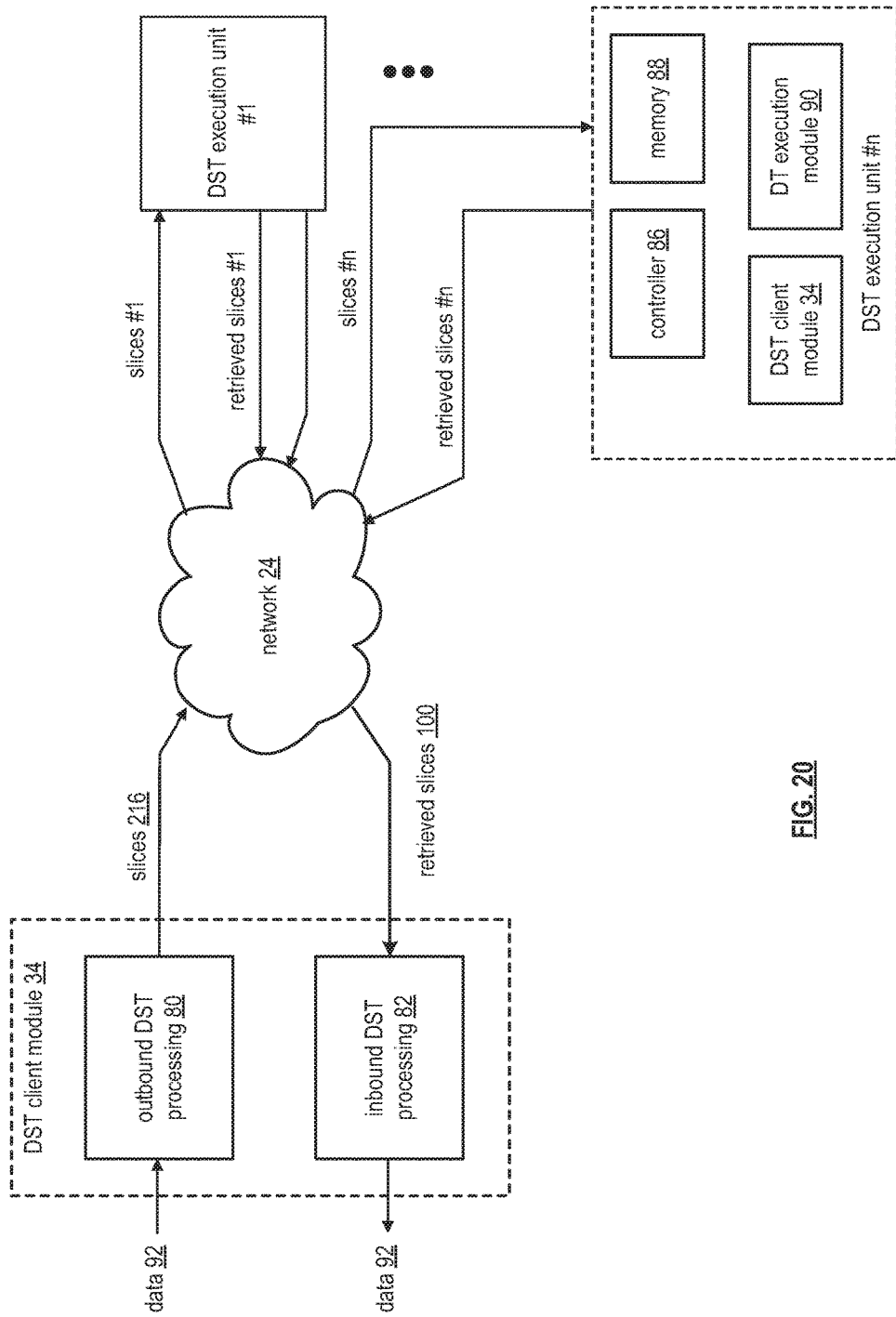
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
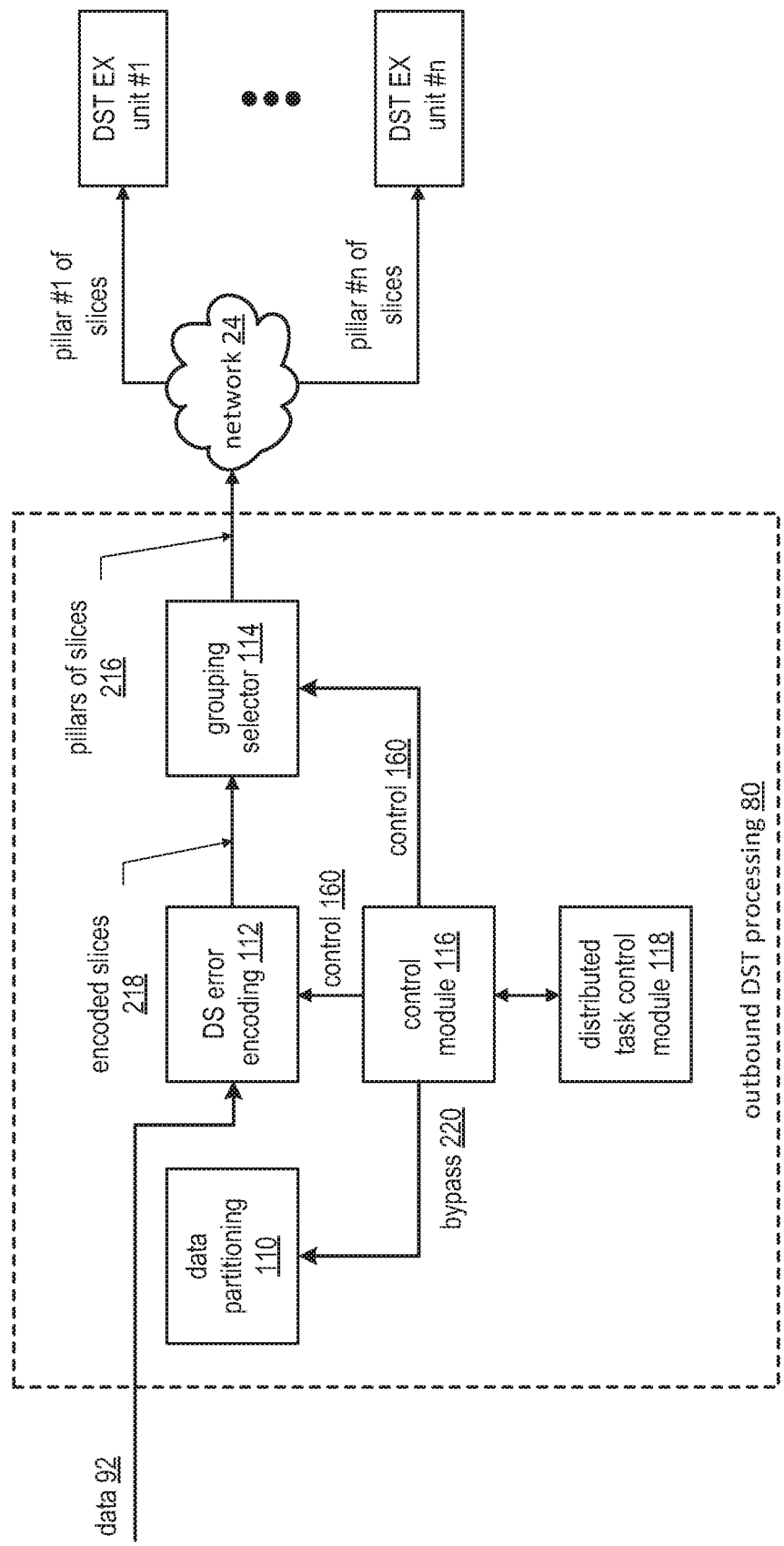
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
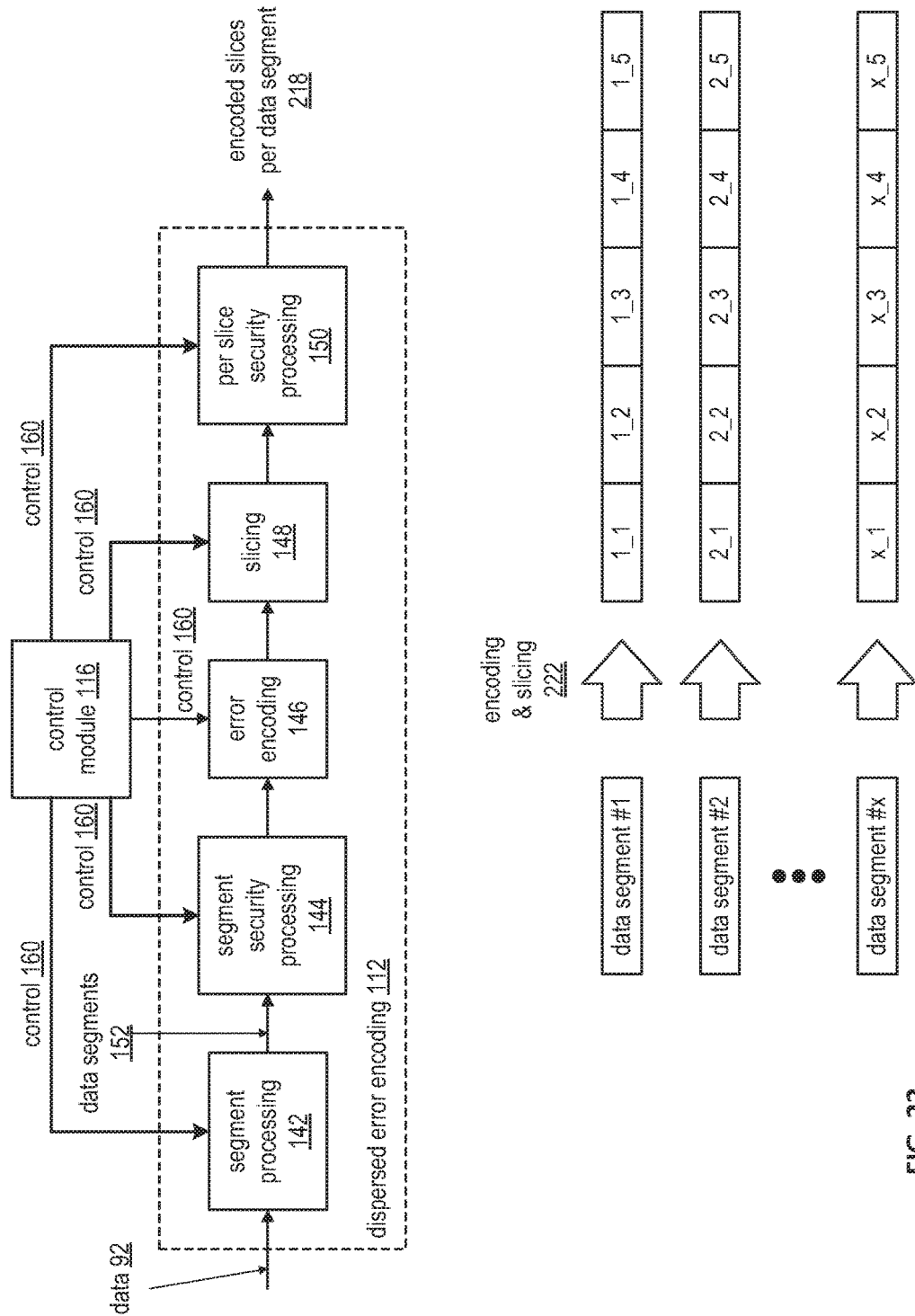
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
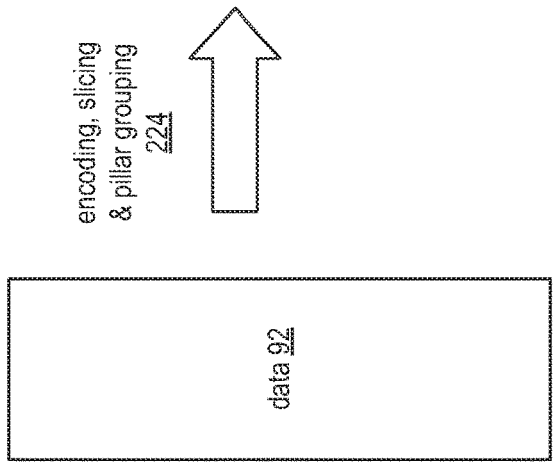
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices)

and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
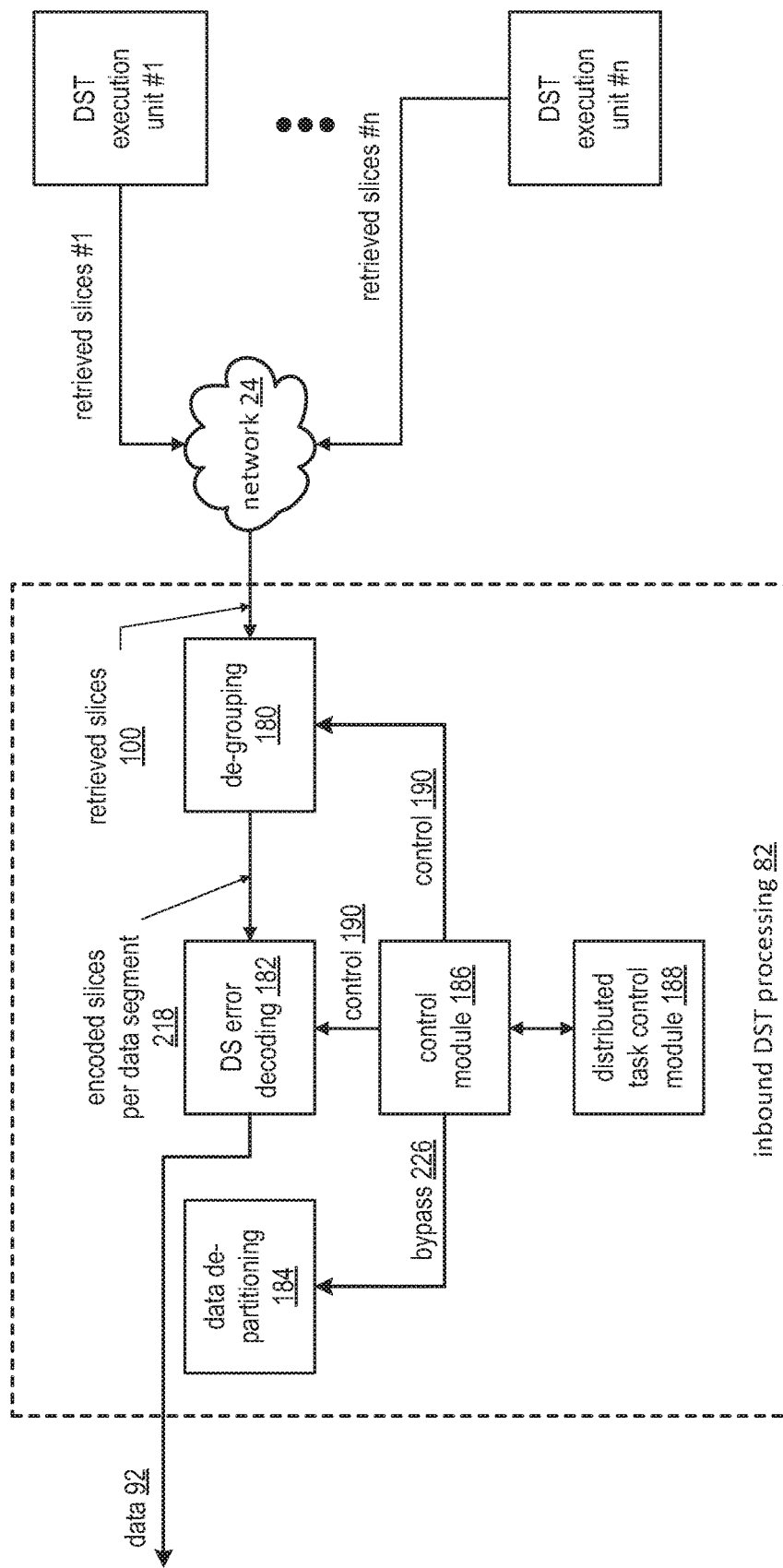
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
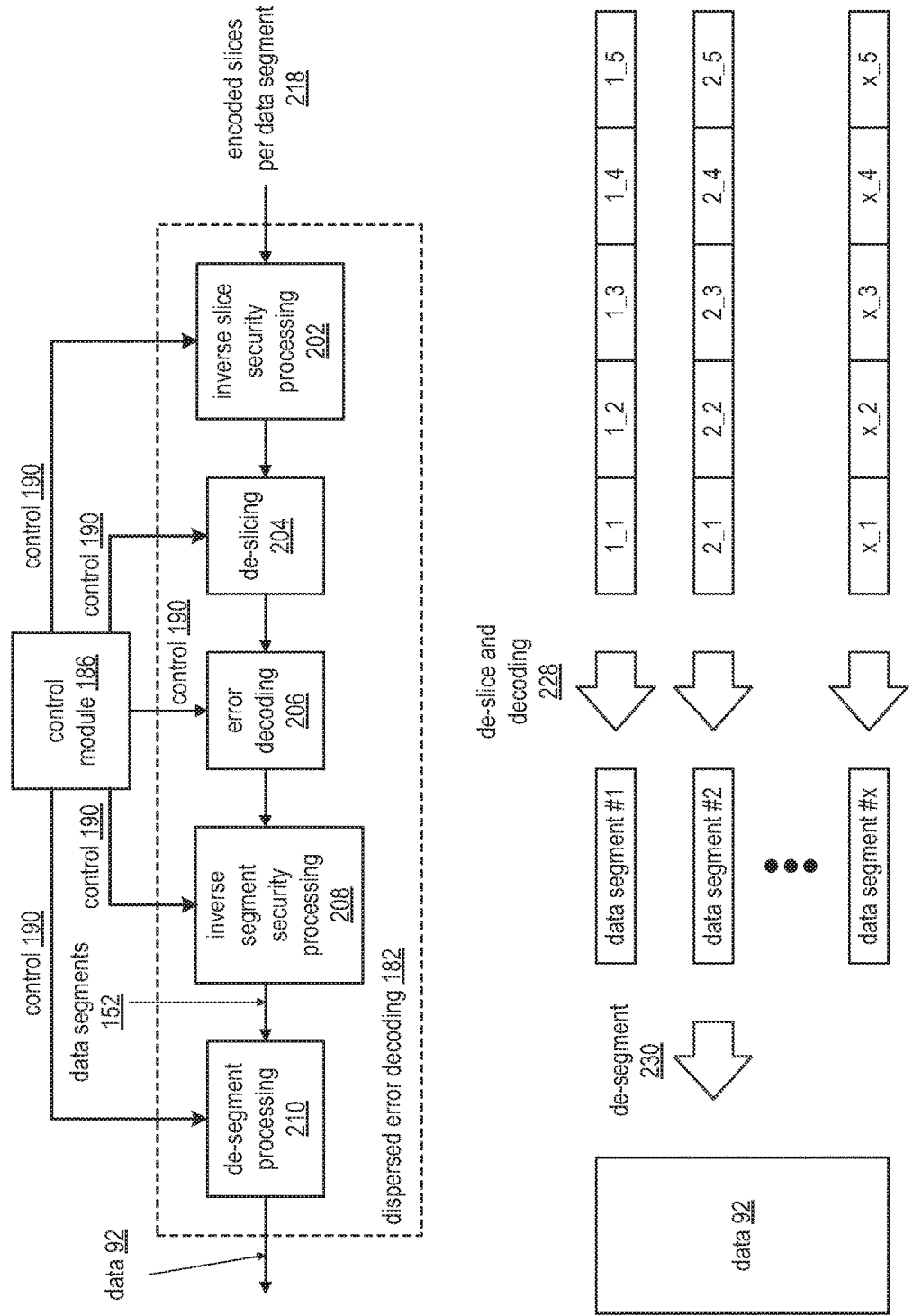
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
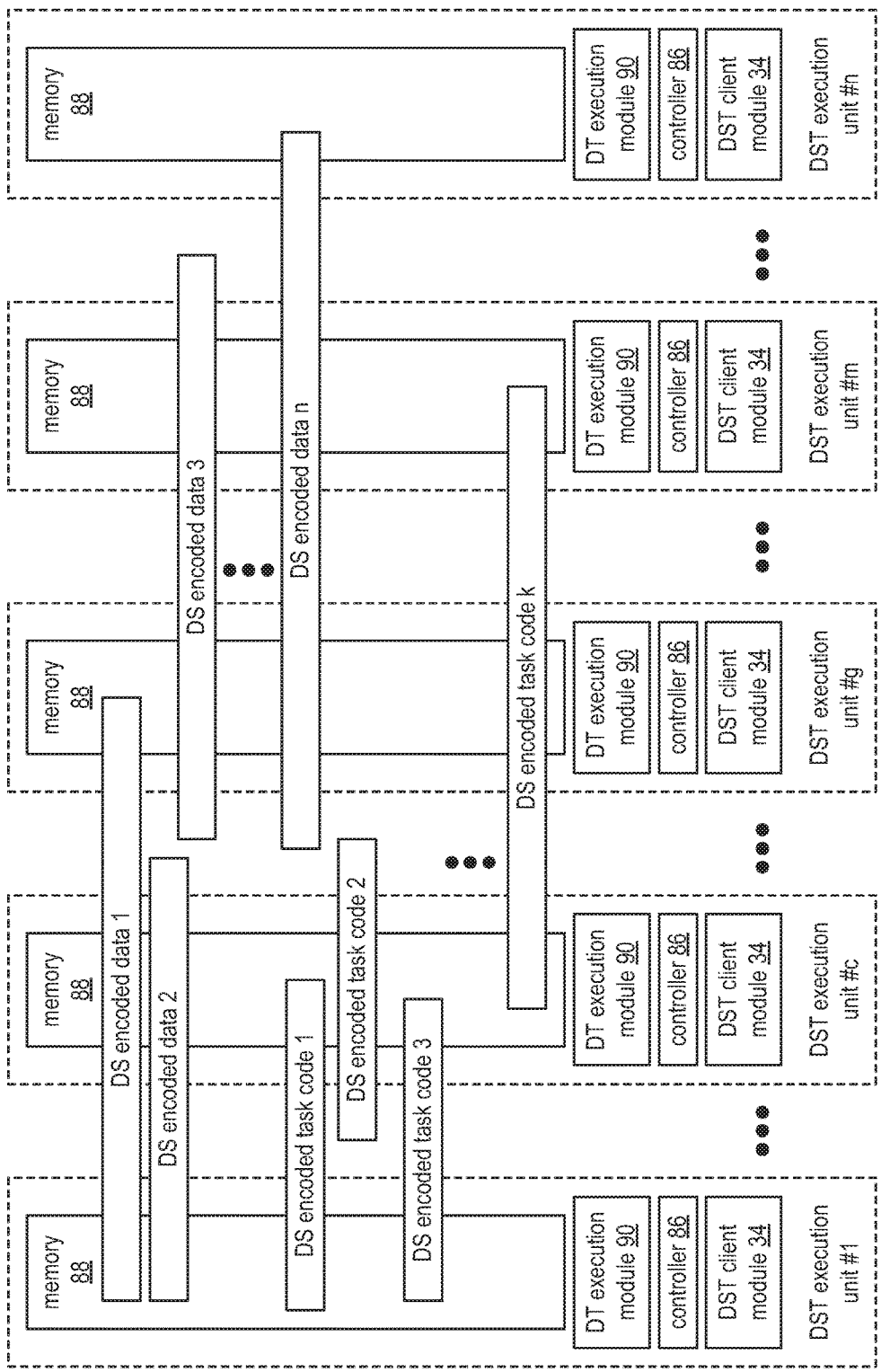
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terabytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
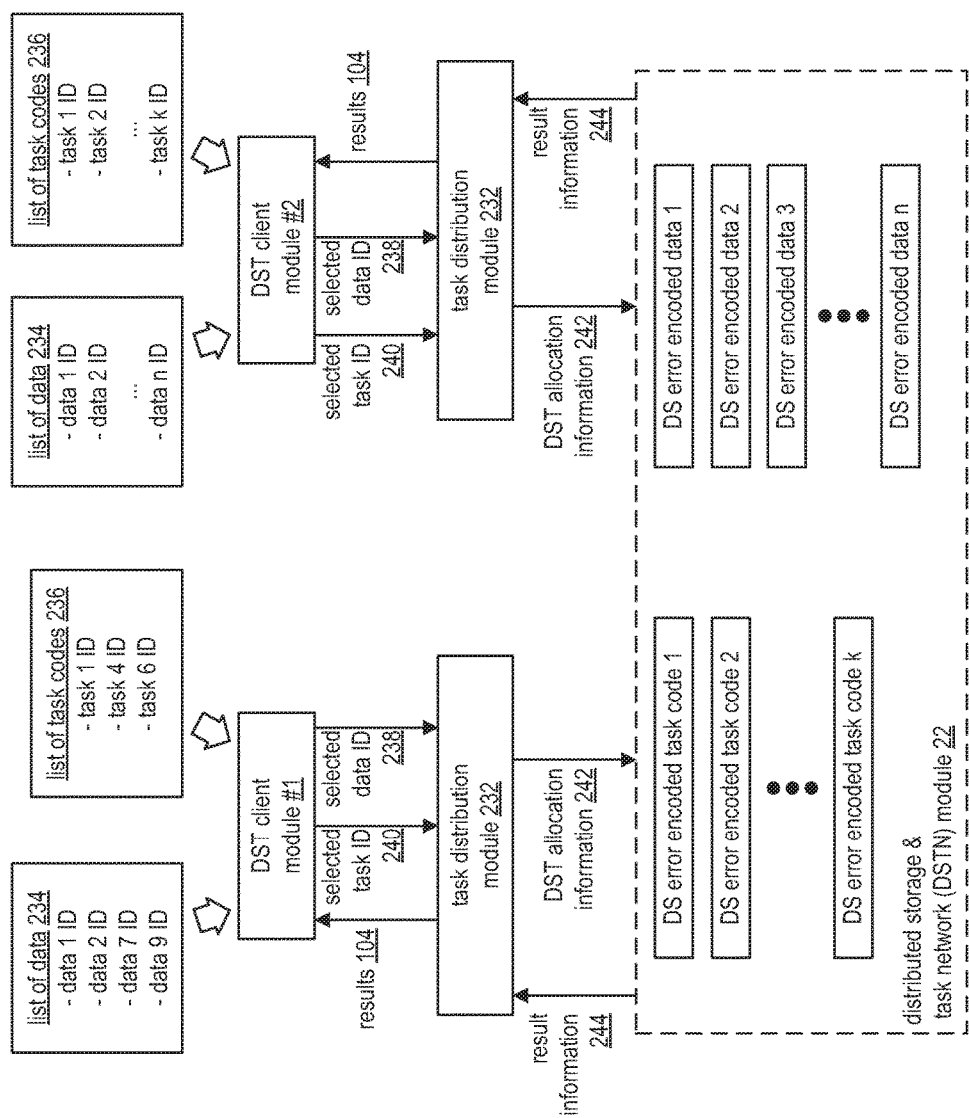
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
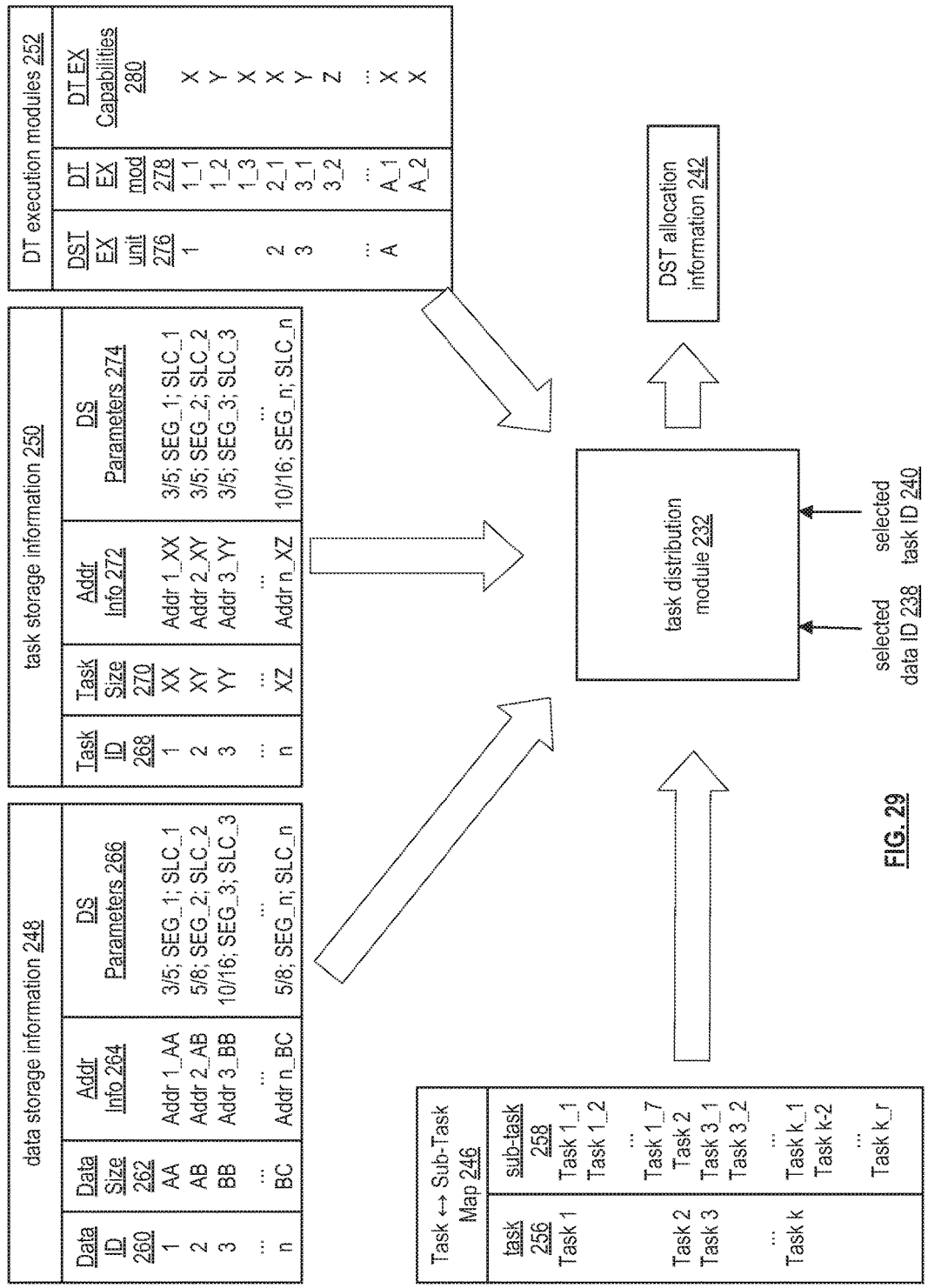
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terabytes or more), addressing information of Addr_1_AA, and DS parameters of 3/5 ; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
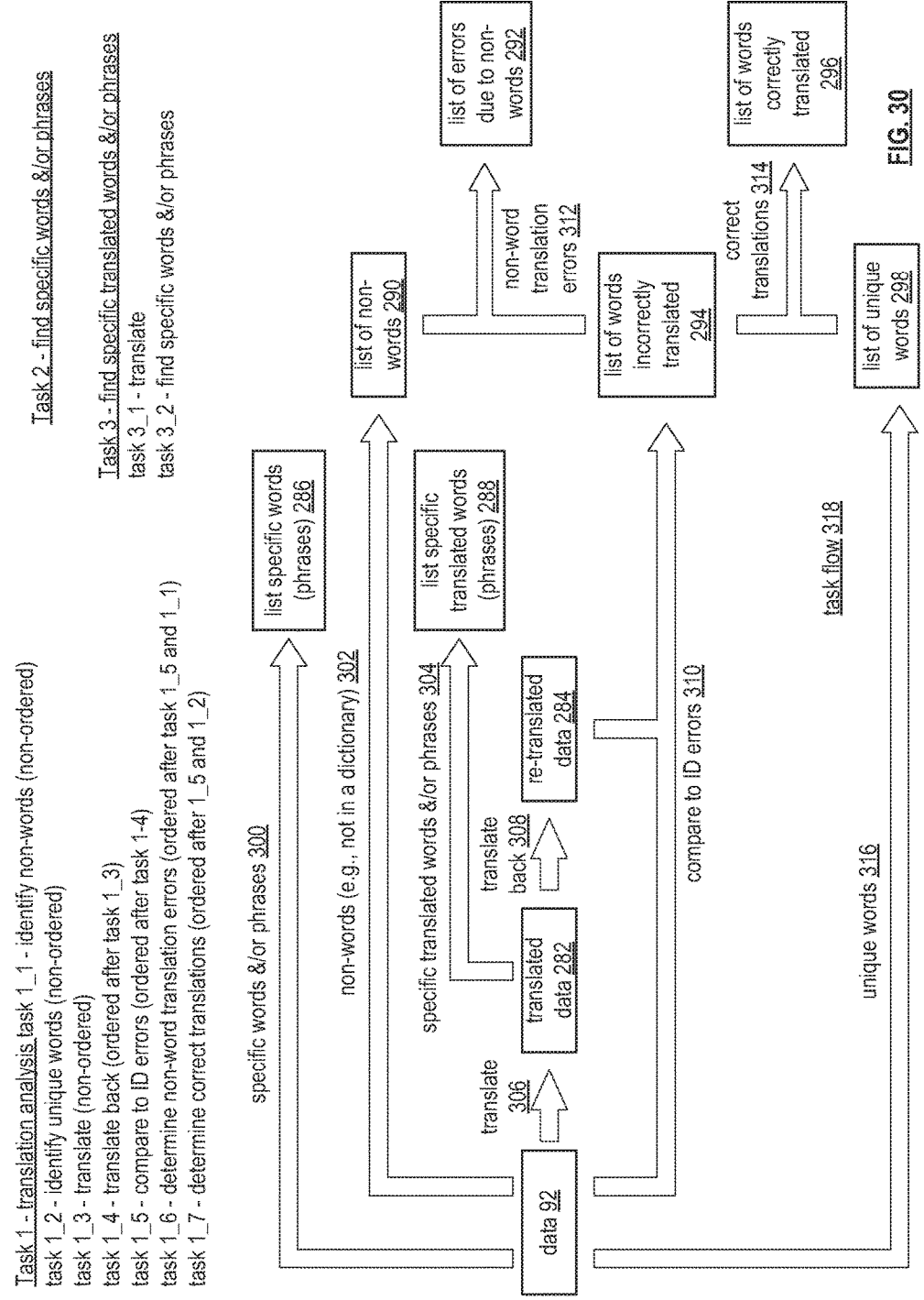
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1—identify non-words (non-ordered); task 1_2—identify unique words (non-ordered); task 1_3—translate (non-ordered); task 1_4—translate back (ordered after task 1_3); task 1_5—compare to ID errors (ordered after task 1-4); task 1_6—determine non-word translation errors (ordered after task 1_5 and 1_1); and task 1_7—determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
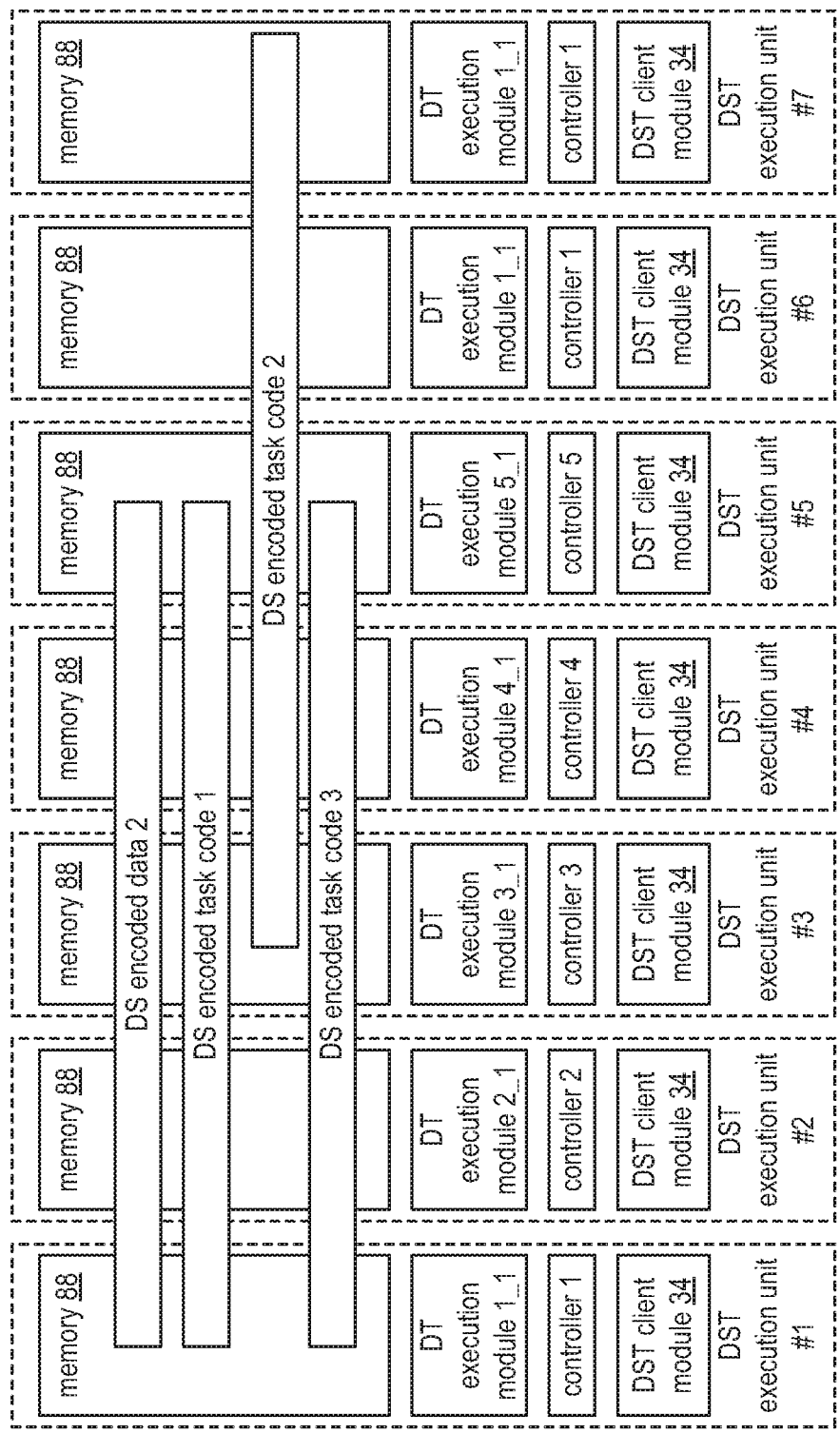
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition. The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1-2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1-3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terabyte). If yes, it partitions the first intermediate result (R1-1) into a plurality of partitions (e.g., R1-1_1 through R1-1_m). If the first intermediate result is not of sufficient size to partition, it is not partitioned. For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial result (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terabyte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same.

For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., $1^{st}$ through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
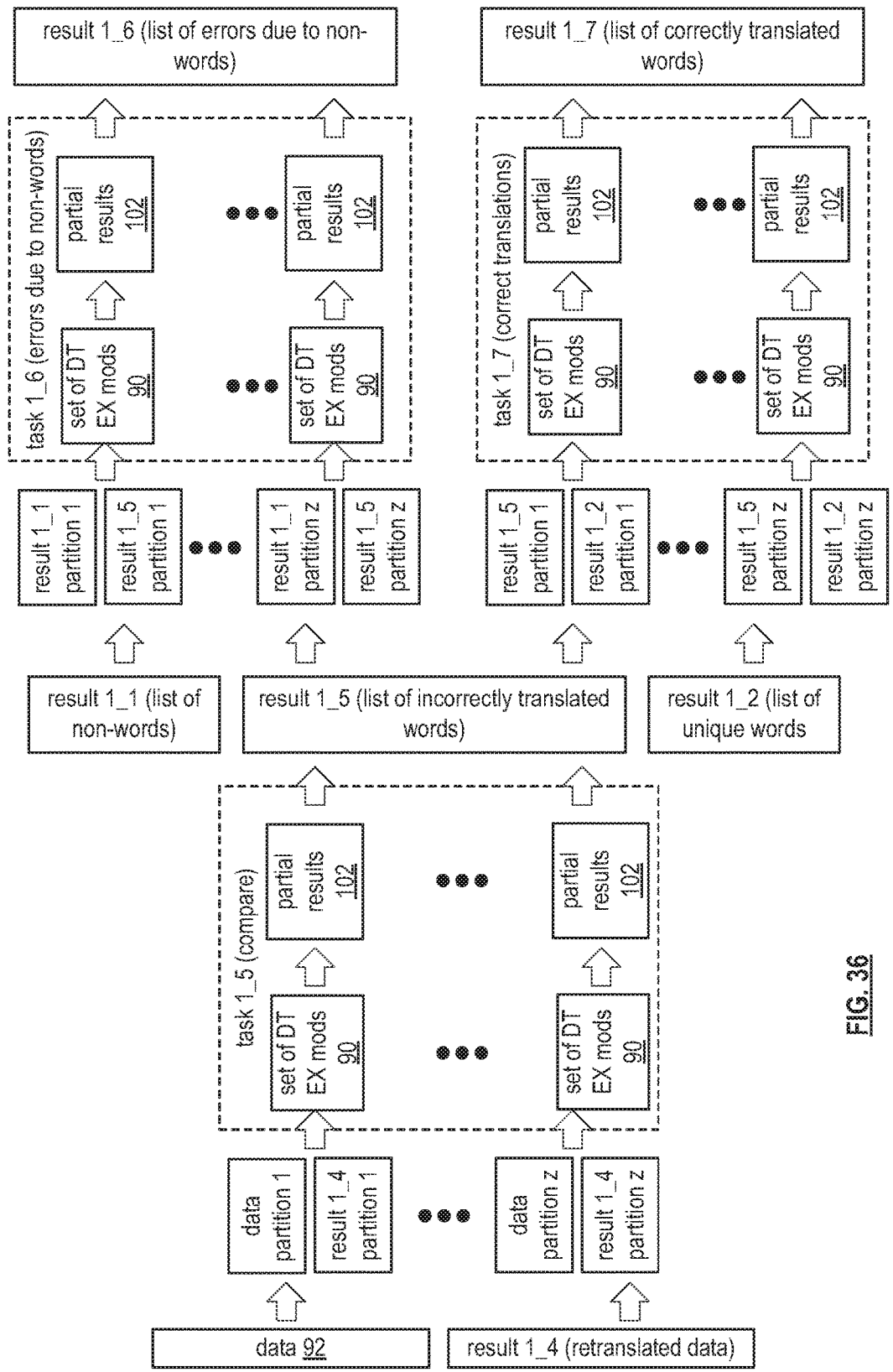

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1ˢᵗ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1ˢᵗ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1ˢᵗ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1ˢᵗ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terabyte). If yes, it partitions the task 2 intermediate result (R2) into a plurality of partitions (e.g., R2_1 through R2_m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terabyte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
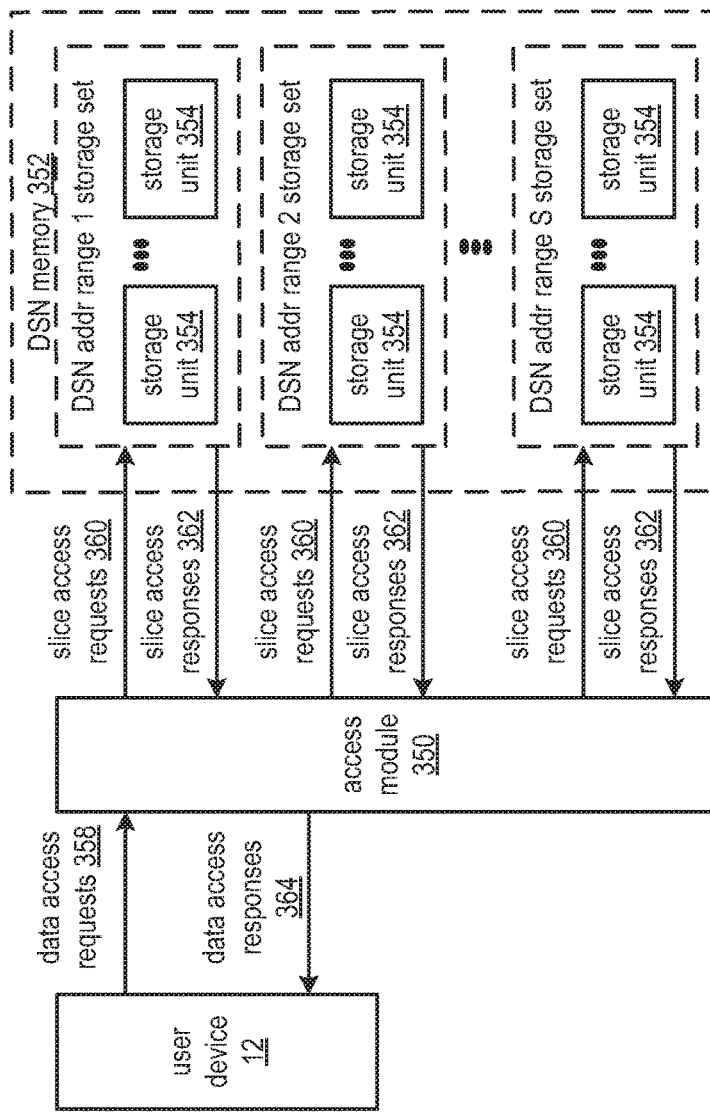
FIG. 40A is a schematic block diagram of an embodiment of a dispersed storage network (DSN) system in accordance with the present invention.

FIG. 40A is a schematic block diagram of an embodiment of a dispersed storage network (DSN) system that includes the user device 12 of FIG. 1, an access module 350, and a dispersed storage network (DSN) memory 352. The access module 350 may be implemented using one or more of a computing device, a server, a user device, a dispersed storage (DS) processing unit, a DS processing module, a DS unit, a distributed storage and task (DST) processing module, the DST client module 34 of FIG. 1, the DST processing unit 16 of FIG. 1, the DST execution unit 36 of FIG. 1. The DSN memory 352 includes a plurality of S number of DSN address range 1-S storage sets, where each storage set includes a set of storage units 354 affiliated with a common DSN address range. A DSN address range includes a common DSN address associated with storage of sets of encoded data slices corresponding to sets of slice names that includes the common DSN address. Each storage unit 354 may be implemented using the DST execution unit 16 of FIG. 1.

Each storage set of the plurality of storage sets 1-S may be available (e.g., powered up, activated, ready to process access requests) in accordance with a storage set of availability table 356. The storage set availability table 356 includes a DSN address range field 366, a storage set field 368, and availability field 370. The storage set availability table 356 includes at least S table entries, where each table entry includes a DSN address range entry in the DSN address range field, a storage set entry in the storage set field, and an availability entry in the availability field 370. For example, as illustrated, DSN address range 1 is associated with a DSN address range entry of 2000-20FF of storage set 1 and is available between times of 0:00 and 6:00.

The availability of the set of storage units may be established in accordance with an availability approach. The availability approach may be based on one or more of a security requirement, a performance requirement, a cost of energy, a cost of network connectivity, a system performance goal, the system availability goal, and a system reliability goal. Alternatively, or in addition to, the storage set availability table 356 may indicate availability by access request type. For example, the storage set associated with a DSN address range 2 may be available for read access requests but not write access requests from 6:00-8:00.

The access module 350 accesses one or more of the storage sets in accordance with the storage set availability table 356, where a vault (e.g., a common vault, a unique vault) is associated with each DSN address range storage set 1-S. A vault includes a group of DSN resources and/or user devices with a common affiliation (e.g., a common group, affiliated with a common business, affiliated with an organization, affiliated with common data, etc.). For example, vault 1 is associated with the DSN address range 1 storage set and a vault 2 is associated with the DSN address range 2 storage set. As another example, vault 1 is associated with each of the S number of storage sets.

In an example of operation, the access module 350 receives a data access request 358 (e.g., a write request, a read request) from the user device 12, where the data access request 358 includes a request type. The access module 350 obtains a DSN address associated with the data access request 358. For example, when the data access request 358 includes a read request, the access module 350 accesses at least one of a directory and a dispersed hierarchical index using a data identifier of the read request to retrieve the DSN address. As another example, when the data access request 358 includes a write request, the access module 350 identifies a DSN address range that is currently available in accordance with the storage set availability table 356 and generates the DSN address within the DSN address range to enable execution of the write request. Next, the access module 350 facilitates storage of the DSN address and the data identifier in at least one of the directory and the dispersed hierarchical index.

The access module 350 identifies the storage set associated with the data access request 358 based on the DSN address (e.g., accessing the storage set availability table). The access module 350 determines whether the data access request 358 is allowable for the identified storage set based on the DSN address by accessing the storage set availability table 356 in accordance with the request type and current time.

When the data access request 358 is allowable now, the access module 350 further executes the data access request 358 by issuing one or more sets of slice access requests 360 to the identified storage set. The access module 350 receives one or more slice access responses 362 from the identified storage set. For example, when the data access request 358 is the read request, the one or more slice access responses 362 includes one or more encoded data slices. The access module 350 decodes the one or more encoded data slices to reproduce data associated with the data access request 358. As another example, when the data access request 358 is the write request, the one or more slice access responses 362 includes one or more write slice responses indicating write status. The access module 350 issues a data access response 364 to the user device 12 based on the slice access responses 362 (e.g., a write confirmation or the reproduce data).

Figure 40B:
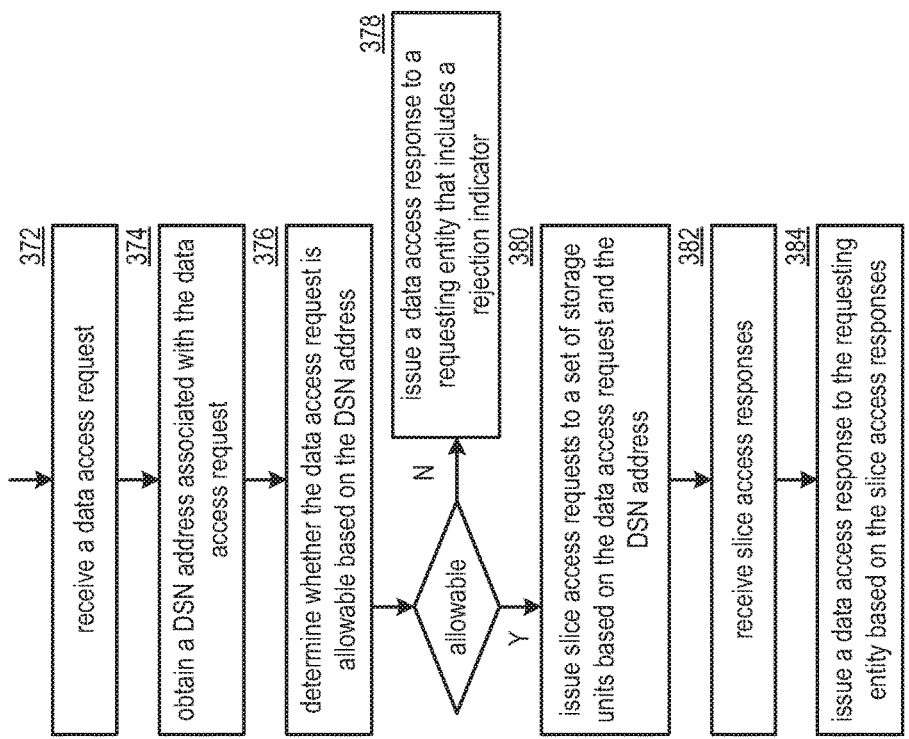
FIG. 40B is a flowchart illustrating an example of accessing data in accordance with the present invention.

FIG. 40B is a flowchart illustrating an example of accessing data. The method begins at step 372 where a processing module (e.g., of an access module) receives a data access request. The method continues at step 374 where the processing module obtains a DSN address associated with the data access request. The method continues at step 376 where the processing module determines whether the data access request is allowable based on the DSN address. The determining includes identifying a storage set based on the DSN address and obtaining availability information for the storage set based on a request type of the data access request and a current time. The method branches to step 380 when the processing module determines that the data access request is allowable based on the DSN address. The method continues to step 378 when the processing module determines that the data access request is not allowable. The method continues at step 378 where the processing module issues a data access response to a requesting entity that includes a rejection indicator. The issuing includes generating the data access response to include the rejection indicator and sending the data access response to the requesting entity.

The method continues at step 380 where the processing module issues slice access requests to a set of storage units based on the data access request and the DSN address when the processing module determines that the data access request is allowable. The issuing includes generating slice names based on the DSN address, generating slice access requests that includes the slice names, and sending the slice access requests to the set of storage units. The method continues at step 382 where the processing module receives slice access responses. When receiving read slice responses, the processing module receives at least a decode threshold number of read slice responses for each set of encoded data slices of a plurality of sets of encoded data slices that were generated for storage of data. When receiving write slice responses, the processing module receives at least a write threshold number of favorable write responses to indicate successful write confirmation.

The method continues at step 384 where the processing module issues a data access response to the requesting entity based on the slice access responses. When responding to a read data access request, the processing module decodes the decode threshold number of encoded data slices per set of encoded data slices received in the read slice responses to reproduce the data and generates the data access response to include the reproduce data. When responding to a write data access request, the processing module generates the data access response to include status of writing based on whether a successful write confirmation has occurred.

Figure 41A:
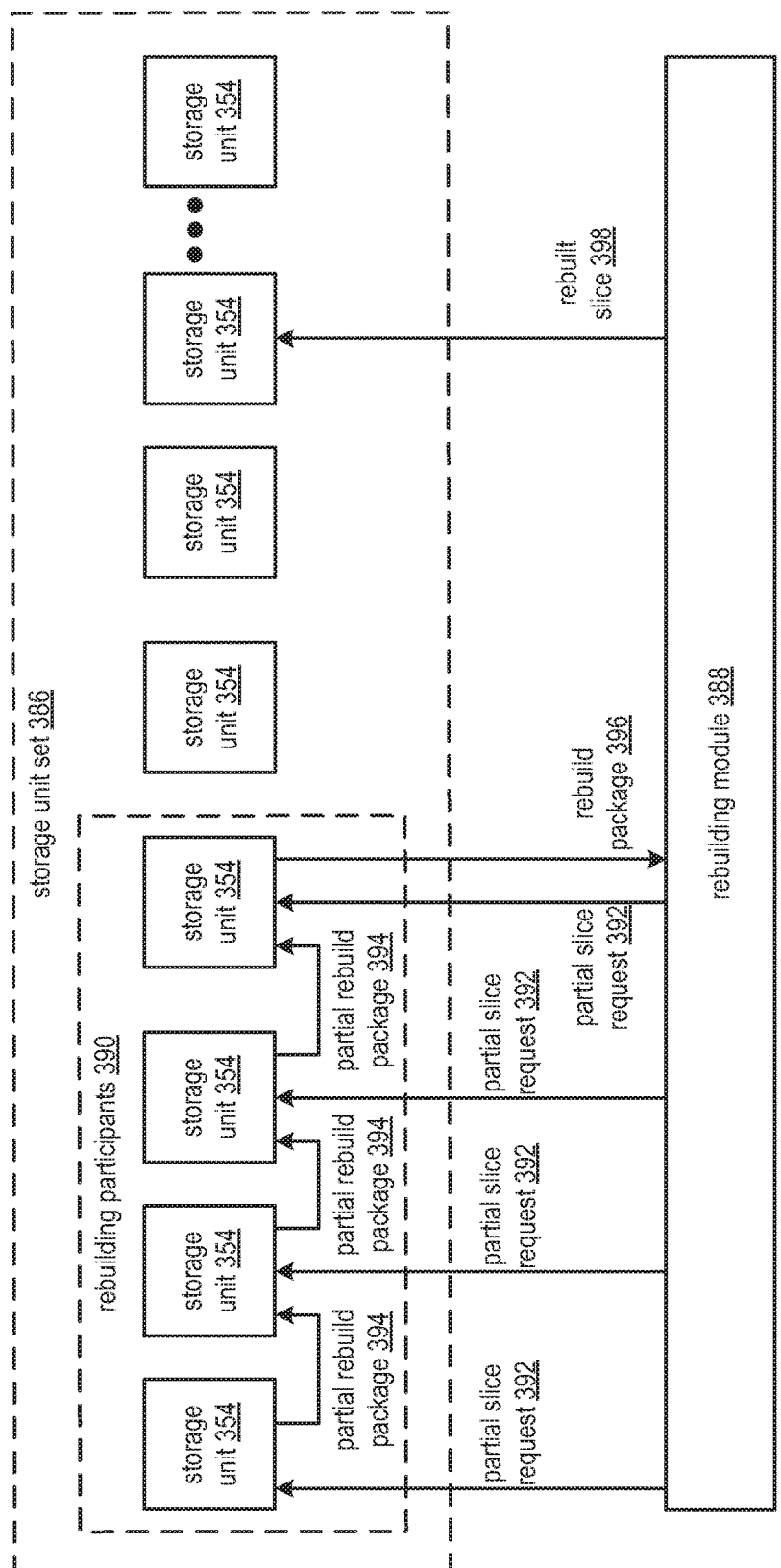
FIG. 41A is a schematic block diagram of another embodiment of a dispersed storage network (DSN) system in accordance with the present invention.

FIG. 41A is a schematic block diagram of another embodiment of a dispersed storage network (DSN) system that includes a storage unit set 386 and a rebuilding module 388. The rebuilding module 388 may be implemented using one or more of a computing device, a server, a user device, the storage integrity unit 20 FIG. 1, a storage integrity module, a dispersed storage (DS) processing unit, a DS processing module, a DS unit, a distributed storage and task (DST) processing module, the DST client module 34 of FIG. 1, the DST processing unit 16 of FIG. 1, and the DST execution unit 16 of FIG. 1. The storage unit set 386 includes a set of storage units 354 of FIG. 40A and are utilized to store one or more sets of encoded data slices, where a data segment is encoded using a dispersed storage error coding function to produce the one or more sets of encoded data slices.

The system functions to remedy a storage error (e.g., missing encoded data slice, corrupted encoded data slice) associated with an encoded data slice stored within a storage unit 354 of the set of storage units. The rebuilding module 388 detects the storage error of the encoded data slice of a corresponding set of encoded data slices associated with the storage unit of the set of storage units. The detecting includes at least one of a scanning for storage errors, receiving an error message, and receiving a rebuilding request. The rebuilding module 388 selects a decode threshold number of storage units as rebuilding participants 390. The selecting includes identifying available storage units 354 of the set of storage units and selecting from the available storage units those storage units associated with other encoded data slices of the set of encoded data slices, where the other encoded data slices are not associated with storage errors.

The rebuilding module 388 issues partial slice requests 392 to each storage unit of the rebuilding participants 390, where each partial slice request 392 includes one or more of an identifier of the encoded data slice associated with the storage error, identifiers of the rebuilding participants, a rebuilding matrix, an encoding matrix, a public key of a public/private key pair of the rebuilding module, and a partial rebuild package routing ordering (e.g., including a destination for sending a partial rebuild package).

A rebuilding participant (e.g., hereafter interchangeably referred to as a storage unit 354), of the rebuilding participants 390, generates a zero information gain partial slice. The generating the zero information gain partial slice includes obtaining an encoding matrix utilized to generate the encoded data slice (e.g., extract from a received partial slice request, retrieve from a memory), reducing the encoding matrix to produce a square matrix that exclusively includes rows identified in the partial slice request (e.g., include a decode threshold number of rows associated with the rebuilding participants), inverting the square matrix to produce an inverted matrix (e.g., alternatively, may extract the rebuilding matrix from the partial slice request as the inverted matrix), matrix multiplying the inverted matrix by an associated encoded data slice held by the rebuilding participant (e.g., of the other encoded data slices of the set of encoded data slices) to produce a vector, and matrix multiplying the vector by a row of the encoding matrix corresponding to the encoded data slice to be rebuilt (e.g., alternatively, may extract the row from the partial slice request), to produce the zero information gain partial slice.

The rebuilding participant encrypts the zero information gain partial slice using the public key of the rebuilding module and a homomorphic encryption algorithm to produce an encrypted zero information gain partial slice. Homomorphic encryption enables operations to be performed on ciphertexts, which remain intact upon decryption. For example, if A and B are two plaintext numbers, an "additively" homomorphic encryption system is one in which Decryption(Encryption(A)+Encryption(B))=A+B. Examples include the Paillier cryptosystem and the Goldwasser-Micali cryptosystem. Thus two encrypted ciphertexts can be added and when decrypted with the appropriate key, the result is the same as if plaintexts A and B had been added.

The rebuilding participants and/or the rebuilding module combines a corresponding encrypted zero information gain partial slice from each of the rebuilding participants to produce a partial rebuild package 394. The combining includes one or more of combining a received partial rebuild package 394 from another rebuilding participant with the encrypted zero information gain partial slice to produce another partial rebuild package and sending the other partial rebuild package 394 to yet another rebuilding participant in accordance with the partial rebuild package routing ordering. For example, a second storage unit of the rebuilding participants receives a partial rebuild package 394 from a first storage unit 354 of the rebuilding participants 390, combines the received partial rebuild package from the first storage unit with its own encrypted zero information gain partial slice to produce the other partial rebuild package 394 to send to a third storage unit 354 of the rebuilding participants 390.

The combining of the received partial rebuild package 394 from the other rebuilding participant with the encrypted zero information gain partial slice includes finding the sum of the partials in the field. For example, the received partial rebuild package is exclusiveOR'd with the encrypted zero information gain partial. Depending on the field, summing may be exclusiveOR (XOR) or it may be another form of addition (e.g., such as addition modulo a prime). For example, some implementations of Shamir secret sharing, for example, perform all addition and multiplication modulo some prime. In such a case, instead of using XOR the summing may be accomplished by combining the partials via modular addition (e.g., which is how addition is defined in that field of integers). Such an approach may require a minor change to how the encryption of the partials works. Instead of combining the partial with a keystream via XOR, one rebuilding participant would add the key stream (e.g., according to rules of addition in the field) such that the another rebuilding participant using a corresponding key would subtract the same keystream from a partial associated with the other rebuilding participant. In fields where XOR represents addition, it also represents subtraction, so all participants handle combining identically. In an alternate field of integers where addition was not identical to subtraction, then rebuilding participants must agree on a convention where a first rebuilding participant subtracts and a second rebuilding participant adds. For example, the convention may include a deterministic approach where whichever rebuilding participant has a lower index number for the encoded data slice/share they hold adds and another rebuilding participant associated with a higher index number subtracts.

A last storage unit 354 of the rebuilding participants 390 generates an outputs and associated partial rebuild package 394 as a rebuild package 396 to the rebuilding module 388, where the rebuild package 396 includes a combination of each of a decode threshold number of encrypted zero information gain partial slices from each of the rebuilding participants. The rebuilding module 388 decrypts the rebuild package 396 using a private key of the public/private key pair of the rebuilding module 388 to produce a rebuilt slice 398. The rebuilding module 388 facilitates storage of the rebuilt slice 398 in the storage unit 354 associated with the storage error. For example, the rebuilding module 388 sends the rebuilt slice 398 to a seventh storage unit 354 for storage.

Figure 41B:
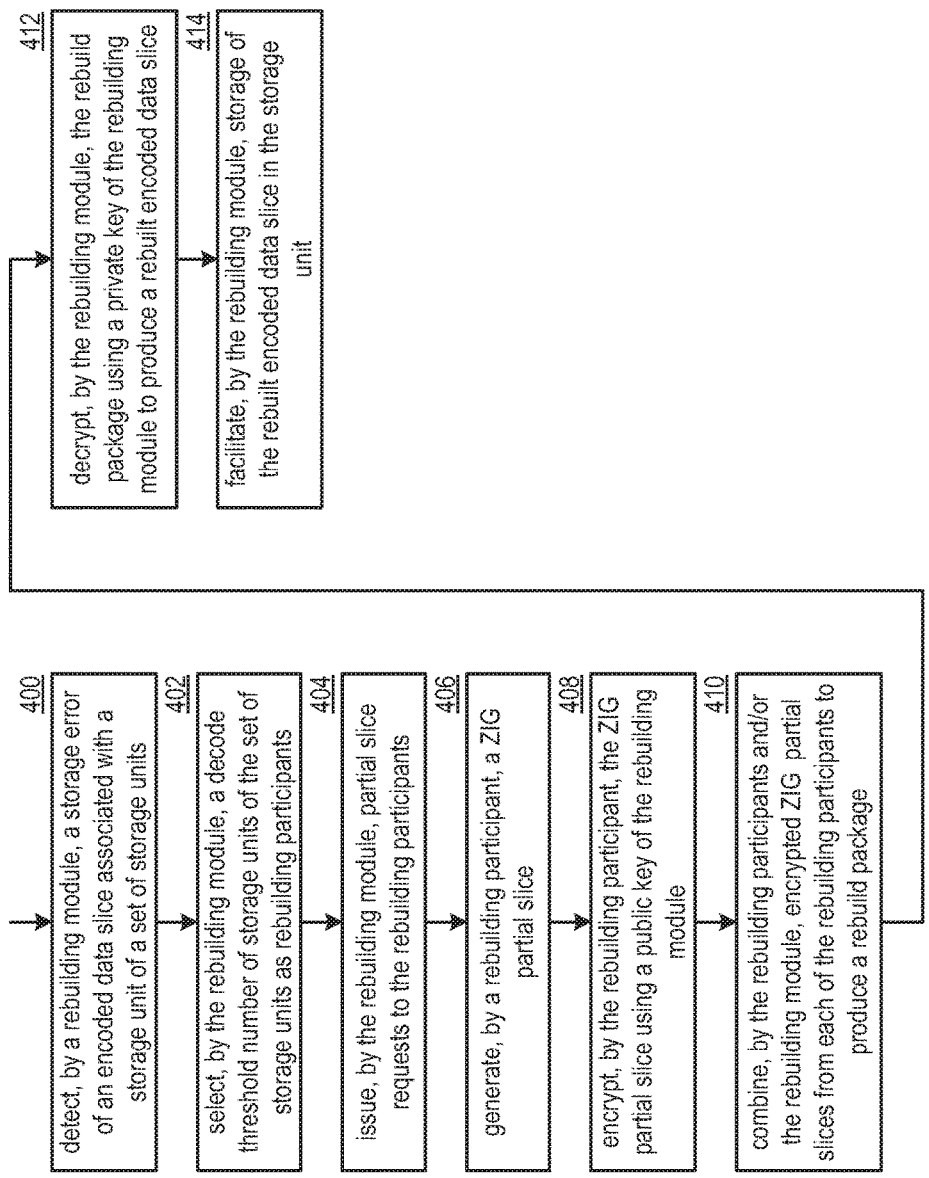
FIG. 41B is a flowchart illustrating an example of rebuilding an encoded data slice in accordance with the present invention.

FIG. 41B is a flowchart illustrating an example of rebuilding an encoded data slice. The method begins at step 400 where a rebuilding module detects a storage error of an encoded data slice associated with a storage unit of a set of storage units. The method continues at step 402 where the rebuilding module selects a decode threshold number of storage units of the set of storage units as rebuilding participants, where the rebuilding participants excludes the storage unit. The method continues at step 404 where the rebuilding module issues partial slice requests to the rebuilding participants. The method continues at step 406 where each rebuilding participant generates a zero information gain partial slice based on the partial slice request and a locally held encoded data slice/share associated with the rebuilding participant. The method continues at step 408 where the rebuilding participant encrypts, using a homomorphic encryption algorithm, the zero information gain partial slice using a public key of the rebuilding module to produce an encrypted zero information gain partial slice.

The method continues at step 410 where one or more of the rebuilding participants and the rebuilding module combines, to find a sum of the partials in the field, encrypted zero information gain partial slices from each of the rebuilding participants to produce a rebuilt package. For example, a decode threshold number of encrypted zero information gain partial slices are exclusiveOR'd (XOR) with each other to produce the rebuild package when XOR is compatible with the homomorphic encryption algorithm and dispersed storage error encoding approach utilized to produce the encoded data slice/share. The method continues at step 412 where the rebuilding module decrypts the rebuild package using a private key of the rebuilding module to produce a rebuilt encoded data slice/share. The method continues at step 414 where the rebuilding module facilitates storage of the rebuilt encoded data slice/share in the storage unit. The facilitating includes one or more of storing the rebuilt encoded data slice/share in a local memory and issuing a write slice request to the storage unit, where the write slice request includes the rebuilt encoded data slice/share.

FIG. 42A is a schematic block diagram of another embodiment of a dispersed storage network (DSN) system that includes the storage unit set 386 of FIG. 41A, and the rebuilding module 388 of FIG. 41A. The storage unit set 386 includes the set of storage units 354 of FIG. 41A and are utilized to store one or more sets of shares, where a data segment is encoded using a linear coding scheme to produce the one or more sets of shares. Examples of the linear coding scheme includes Blakley's Secret Sharing, Shamir Secret Sharing, Systematic Shamir, all or nothing transformation-Reed Solomon (AONT-RS), Reed-Solomon, RAID 5, RAID 6, Replication, Online codes and Rabin's Information Dispersal Algorithms.

The system functions to remedy a storage error (e.g., missing, corrupted) associated with a share stored within a storage unit 354 (e.g., a seventh storage unit 354) of the set of storage units in accordance with an encoding/rebuilding process that includes the linear coding scheme (e.g., secret sharing scheme). The encoding/rebuilding process includes a matrix multiplied by a vector in which all elements are over a field of integers. As such, encoding of shares, decoding of shares, generating of partials (e.g., partially decoded shares, partially encoded shares), and zero information gain encrypted partials are equivalent.

The rebuilding module 388 detects the storage error of the share of a corresponding set of shares associated with the storage unit 354 of the set of storage units. The detecting includes at least one of a scanning for storage errors, receiving an error message, and receiving a rebuilding request. The rebuilding module 388 selects a decode threshold number of storage units as rebuilding participants 390. The selecting includes identifying available storage units of the set of storage units and selecting from the available storage units those storage units associated with other encoded data slices of the set of shares, where the other shares are not associated with storage errors.

The rebuilding module 388 generates an equivalence encoding matrix based on the secret sharing scheme. Alternatively, each rebuilding participant generates the equivalence encoding matrix. Examples of such an equivalence encoding matrix based on the secret sharing scheme are discussed in greater detail with reference to FIG. 42B. The rebuilding module 388 issues partial share requests 416 to each of the rebuilding participants (e.g., the storage units 354 of the rebuilding participants 390), where each partial share request 416 includes one or more of the equivalence encoding matrix, an identifier of the share associated with the storage error, identifiers of the rebuilding participants, and an identifier of another share of the set of shares held by a corresponding rebuilding participants associated with the partial share request.

Having received the partial share request 416, each rebuilding participant generates a zero information gain partial share 418. The generating the zero information gain partial share 418 includes obtaining the equivalence encoding matrix, which may have been utilized to generate the share (e.g., extract from a received partial share request, retrieve from a memory), reducing the equivalence encoding matrix to produce a square matrix that exclusively includes rows identified in the partial share request (e.g., include a decode threshold number of rows associated with the rebuilding participants), inverting the square matrix to produce an inverted matrix (e.g., alternatively, may extract a rebuilding matrix from the partial share request as the inverted matrix), matrix multiplying the inverted matrix by the other share of the set of shares held by the rebuilding participant, to produce a vector, and matrix multiplying the vector by a row of the equivalence encoding matrix corresponding to the share to be rebuilt (e.g., alternatively, may extract the row from the partial share request), to produce the zero information gain partial share 418.

The rebuilding participant sends the zero information gain partial share 418 to the rebuilding module 388. The rebuilding module 388 combines zero information gain partial shares 418 from each of the rebuilding participants to produce a rebuilt share 420. The combining includes finding the sum of the partials in the field of integers. The rebuilding module 388 facilitates storage of the rebuilt share 420 in the storage unit 354 associated with the storage error. For example, the rebuilding module 388 sends the rebuilt share 420 to the seventh storage unit 354 for storage.

Figure 42B:
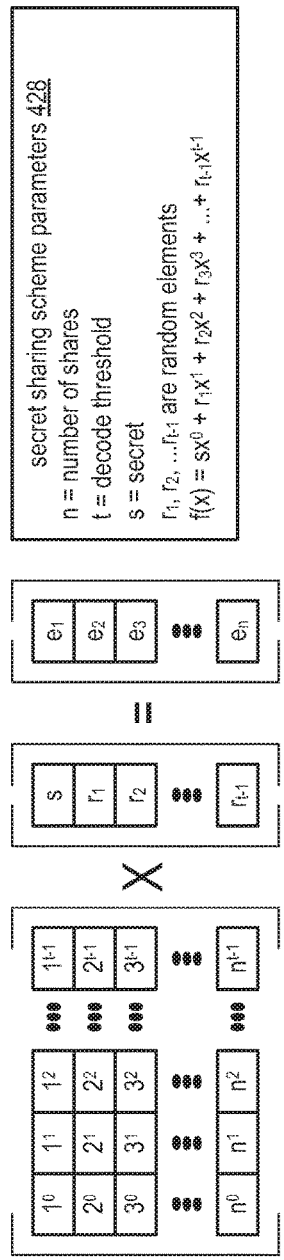
FIG. 42B is a diagram illustrating an example of a matrix representation of a Shamir secret sharing scheme in accordance with the present invention.
Figure 42C:
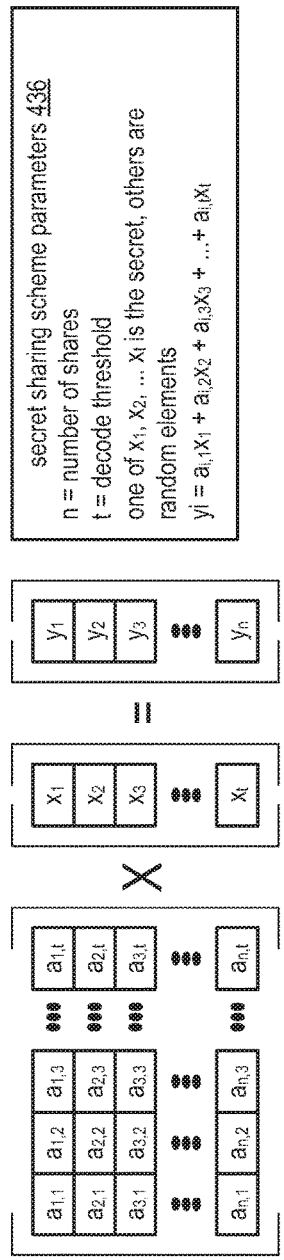
FIG. 42C is a diagram illustrating an example of a matrix representation of a Blakley secret sharing scheme in accordance with the present invention.
Figure 42D:
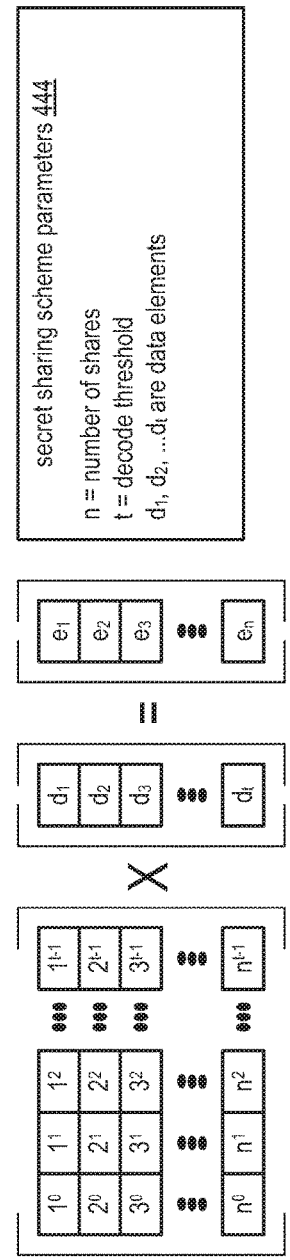
FIG. 42D is a diagram illustrating an example of a matrix representation of a Rabin information dispersal algorithm (IDA) secret sharing scheme in accordance with the present invention.

FIGS. 42B-D are diagrams illustrating examples of matrix representations of linear coding schemes 421, 429, 437 (e.g., of secret sharing schemes) in a form to expose matrix multiplication of an equivalence encoding matrix 422, 430, 438 by a data vector 424, 432, 440 to produce a set of shares 426, 434, 442. Still further linear coding schemes of still further secret sharing schemes may be expressed in a similar fashion. The diagrams further include secret sharing scheme parameters 428, 436, 444 associated with the secret sharing scheme (e.g., number of shares, a decode threshold, a secret, a closed form formula, etc.). FIG. 42B illustrates an example of the matrix multiplication for a Shamir secret sharing scheme 421. FIG. 42C illustrates an example of the matrix multiplication for a Blakley secret sharing scheme 429. FIG. 42D illustrates an example of the matrix multiplication for a Rabin information dispersal algorithm (IDA) secret sharing scheme 437. The expression of a secret sharing scheme in such a matrix multiple multiplication fashion exposes the equivalence encoding matrix 422, 430, 438 which may be utilized when performing a zero information gain rebuilding process to rebuild a share of the set of shares 426, 434, 442, where the share is associated with a storage error.

Figure 42E:
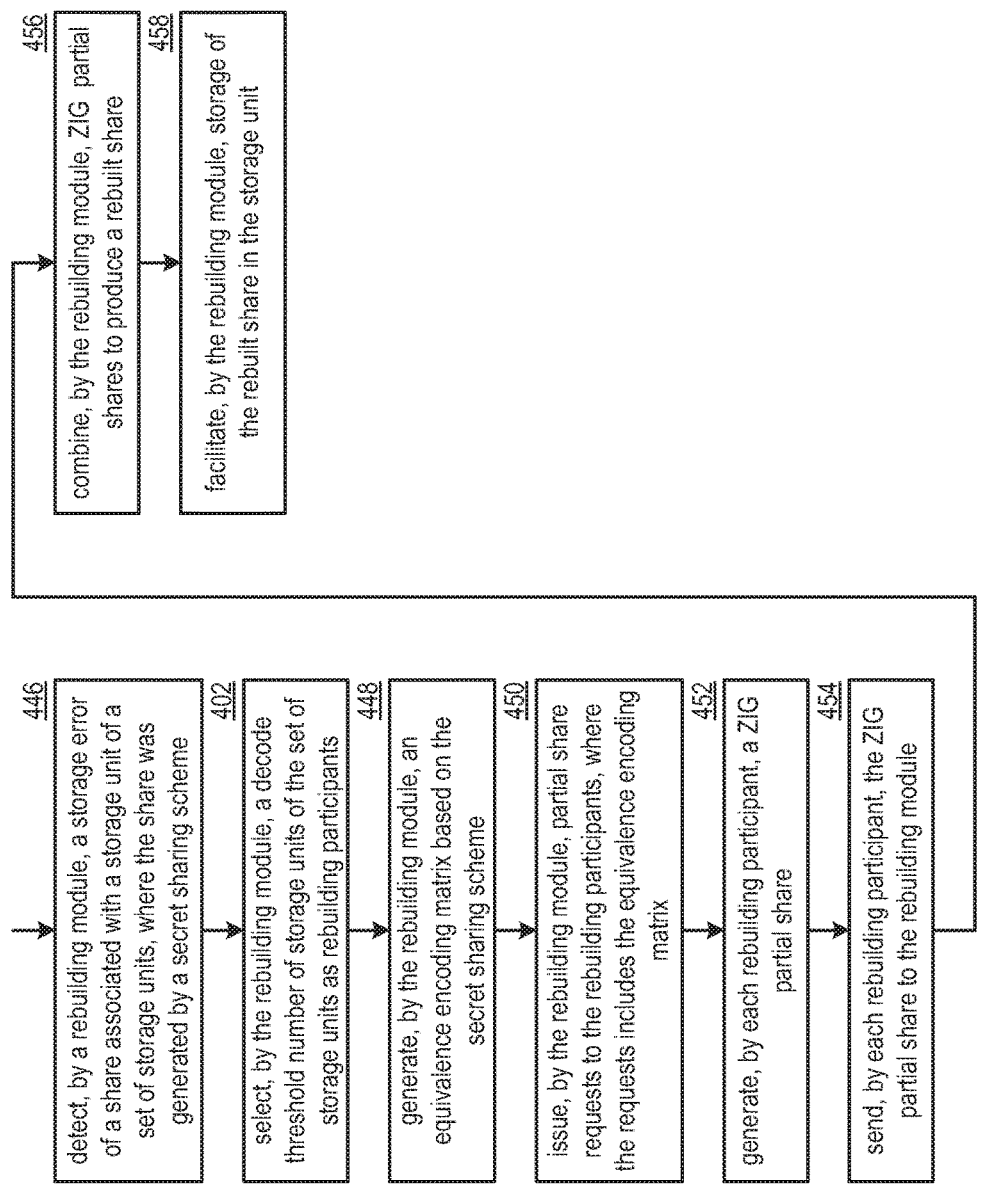
FIG. 42E is a flowchart illustrating an example of rebuilding a share in accordance with the present invention.

FIG. 42E is a flowchart illustrating an example of rebuilding a share, which includes similar steps to FIG. 41B. The method begins at step 446 where a rebuilding module detects a storage error of a share associated with a storage unit of a set of storage units, where the share was generated by a secret sharing scheme. The secret sharing scheme includes any one of a number of linear coding schemes which may be expressed in a matrix multiplication fashion to expose an equivalence encoding matrix. The method continues with step 402 of FIG. 41B where the rebuilding module selects a decode threshold number of storage units of the set of storage units as rebuilding participants. The method continues at step 448 where the rebuilding module generates the equivalence encoding matrix based on the secret sharing scheme. The generating includes one or more of identifying the secret sharing scheme, obtaining scheme information, performing a lookup, and converting to a matrix multiplication expression. Alternatively, one or more of the rebuilding participants performs the generating of the equivalence encoding matrix.

The method continues at step 450 where the rebuilding module issues partial share requests to the rebuilding participants, where the requests includes the equivalence encoding matrix. The method continues at step 452 where each rebuilding participant generates a zero information gain partial share. The method continues at step 454 where each rebuilding participant sends a corresponding zero information gain partial share to the rebuilding module. The method continues at step 456 where the rebuilding module combines a decode threshold number of zero information gain partial shares to produce a rebuilt share. The combining includes finding the sum of the partials in the field of integers.

The method continues at step 458 where the rebuilding module facilitates storage of the rebuilt share in the storage unit associated with the storage error. For example, the rebuilding module sends the rebuilt share to the storage unit for storage. As another example, the rebuilding module stores the rebuilt share in a local memory when the rebuilding module is implemented within the storage unit.

FIG. 43A is a schematic block diagram of another embodiment of a dispersed storage network (DSN) system that includes the storage unit set 386 of FIG. 41A and an audit module 460. The audit module 460 may be implemented using one or more of a computing device, a server, a user device, a rebuilding module, a storage integrity unit, a storage integrity module, a dispersed storage (DS) processing unit, a DS processing module, a DS unit, a distributed storage and task (DST) processing module, the DST client module 34 of FIG. 1, the DST processing unit 16 of FIG. 1, and the DST execution unit 36 of FIG. 1. The storage unit set 386 includes the set of storage units 354 of FIG. 41A and are utilized to store one or more sets of shares and/or slices, where a data segment is encoded using a linear coding scheme to produce the one or more sets of slices (e.g., or shares). Examples of the linear coding scheme includes Blakley's Secret Sharing, Shamir Secret Sharing, Systematic Shamir, all or nothing transformation-Reed Solomon (AONT-RS), Reed-Solomon, RAID 5, RAID 6, Replication, Online codes and Rabin's Information Dispersal Algorithms.

The system functions to audit integrity of the slice/share, where the slice/share is stored within a storage unit 354 of the storage unit set 386 in accordance with an encoding/rebuilding process that includes the linear coding scheme (e.g., linear secret sharing scheme). The encoding/rebuilding process includes a matrix multiplied by a vector in which all elements are over a field of integers. As such, encoding of shares, decoding of shares, generating of partials (e.g., partially decoded shares, partially encoded shares), and zero information gain encrypted partials is equivalent.

Auditing of the slice/share relies on use of any integrity check mechanism M, that has the property that $M(x)+M(y)=M(x+y)$, where M is the mechanism and + is addition in the same field as is used by the linear secret sharing scheme. For example, certain integrity check functions (e.g., such as a Cyclic Redundancy Check, CRC) have the property that the $CRC(x)+CRC(y)=CRC(x+y)$, where addition may be normal addition, modular addition, exclusiveOR (XOR), or addition in some field. As such, $CRC(partial1)+CRC(partial2)+ \ldots +CRC(partialT)=CRC(slice)$ since the slice/share is the sum (e.g., XOR) of all the partials.

The audit module 460 determines to audit integrity of the slice associated with the storage unit 354 of the set of storage units that store a set of slices that includes the slice. Hereafter, the use of slice and share may be used interchangeably. The determining may be based on one or more of interpreting an audit schedule, receiving an error message, and receiving an audit request. The audit module 460 selects a decode threshold number of storage units 354 as audit participants 462. The selecting includes identifying available storage units of the set of storage units and selecting from the available storage units those storage units associated with other slices of the set of slices, where the other slices are not associated with storage errors.

The audit module 460 issues CRC partial slice requests 464 to each of the rebuilding participants (e.g., each storage unit 354 of the audit participants 462), where each CRC partial slice request 464 includes one or more of an encoding matrix utilized to generate the slice, an identifier of the slice to be audited, identifiers of the audit participants, and an identifier of another slice of the set of slices held by a corresponding audit participant associated with the CRC partial slice request. Each audit participant generates a zero information gain partial slice. The generating the zero information gain partial slice includes obtaining the encoding matrix which may have been utilized to generate the slice (e.g., extract from a received CRC partial slice request, retrieve from a memory), reducing the encoding matrix to produce a square matrix that exclusively includes rows identified in the CRC partial slice request (e.g., include a decode threshold number of rows associated with the audit participants), inverting the square matrix to produce an inverted matrix (e.g., alternatively, may extract a rebuilding matrix from the CRC partial slice request as the inverted matrix), matrix multiplying the inverted matrix by the other slice of the set of slices held by the audit participant, to produce a vector, and matrix multiplying the vector by a row of the encoding matrix corresponding to the slice to be audited (e.g., alternatively, may extract the row from the CRC partial slice request), to produce the zero information gain partial slice.

The audit participant performs a CRC function on the zero information gain partial slice to produce a CRC partial slice 466. The performing includes at least one of performing the CRC function on an encrypted version of the zero information gain partial slice and performing the CRC function directly on the zero information gain partial slice. The audit participant may encrypt the zero information gain partial slice using an encryption key of a decode threshold number minus one number of encryption keys utilized in a pairwise fashion by at least pairs of audit participants. The audit participant encrypts by performing an XOR of the encryption key and the zero information gain partial slice to produce the encrypted version of the zero information gain partial slice. The audit participants send the CRC partial slice 466 to the audit module 460.

The audit module 460 combines a decode threshold number of CRC partial slices 466 from the audit participants 462 to produce a verified CRC slice. The combining includes finding the sum of the partials in the field of integers. For example, the audit module 460 performs an XOR function on the decode threshold number of CRC partial slices 466 to produce the verified CRC slice when XOR is compatible with addition to find the sum of the partials in the field.

Having produced the verified CRC slice, the audit module 460 issues a CRC slice request 468 to the storage unit 354 (e.g., the seventh storage unit 354) with regards to the slice to be audited. The CRC slice request 468 includes an identifier associated with the slice. The storage unit 354 retrieves the slice from a local memory of the storage unit 354 and performs the CRC function on the retrieved slice to produce a CRC slice 470. The storage unit 354 sends the CRC slice 470 to the audit module 460.

The audit module 460 compares the CRC slice 470 to the verified CRC slice. The audit module 460 indicates a verification status of the slice based on the comparison of the CRC slice 470 to the verified CRC slice. For example, the audit module 460 indicates a verification status of verified when the comparison indicates that the CRC slice 470 and the verified CRC slice are substantially the same. As another example, the audit module 460 indicates a verification status of a storage error when the comparison indicates that the CRC slice 470 and the verified CRC slice are not substantially the same.

Figure 43B:
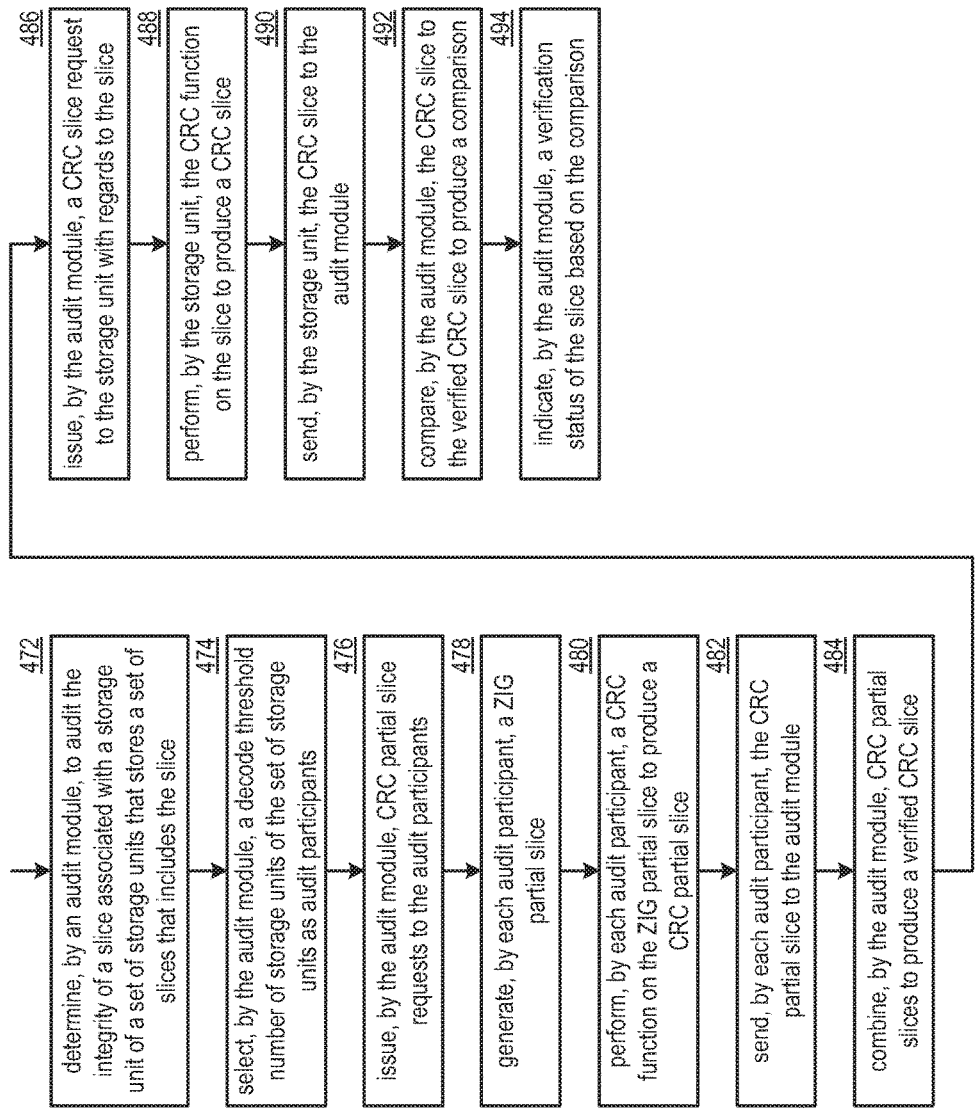
FIG. 43B is a flowchart illustrating an example of auditing integrity of an encoded data slice in accordance with the present invention.

FIG. 43B is a flowchart illustrating an example of auditing integrity of an encoded data slice. The method begins at step 472 where an audit module determines to audit the integrity of a slice associated with a storage unit of a set of storage units that stores a set of slices that includes the slice. A data segment is encoded using a linear secret sharing scheme to produce the set of slices. The method continues at step 474 where the audit module selects a decode threshold number of storage units of the set of storage units as audit participants. The selecting includes identifying available trusted storage units associated with other slices of the set of slices not associated with storage errors. The method continues at step 476 where the audit module issues a CRC partial slice request to each of the audit participants.

The method continues at step 478 where each audit participant generates a zero information gain partial slice. The method continues at step 480 where each audit participant performs a CRC function on the zero information gain partial slice to produce a CRC partial slice. The method continues at step 482 where each audit participants sends the CRC partial slice to the audit module. The method continues at step 484 where the audit module combines a decode threshold number of received CRC partial slices to produce a verified CRC slice. The combining includes finding the sum of the partials in the field of integers.

The method continues at step 486 where the audit module issues a CRC slice request to the storage unit with regards to the slice. The method continues at step 488 where the storage unit retrieves the slice from a local memory and performs the CRC function on the retrieved slice to produce a CRC slice. The method continues at step 490 where the storage unit sends the CRC slice to the audit module. The method continues at step 482 where the audit module compares the CRC slice to the verified CRC slice to produce a comparison. The method continues at step 494 where the audit module indicates a verification status of the slice based on the comparison. For example, the audit module indicates verified verification status when the comparison indicates that the CRC slice in the verified CRC slice are substantially the same. As another example, the audit module indicates storage error verification status when the comparison indicates that the CRC slice and the verified CRC slice are not substantially the same.

FIG. 44A is a schematic block diagram of another embodiment of a dispersed storage network (DSN) system that includes the storage unit set 386 of FIG. 41A and a rotation coordination module 496. The rotation coordination module 496 may be implemented using one or more of a computing device, a server, a user device, a rebuilding module, an audit module, a storage integrity unit, a storage integrity module, a dispersed storage (DS) processing unit, a DS processing module, a DS unit, a distributed storage and task (DST) processing module, the DST client module 34 of FIG. 1, the DST processing unit 16 of FIG. 1, and the DST execution unit 16 of FIG. 1. The storage unit set 386 includes the set of storage units 354 of FIG. 41A and are utilized to store one or more sets of shares and/or slices, where a data segment is encoded using an information-theoretic security function to produce a set of shares of the one or more sets of shares. Hereafter, share and slice may be used interchangeably. Examples of the information-theoretic security function includes Blakley's Secret Sharing, Shamir Secret Sharing, and exclusiveOR (XOR) based.

The system functions to rotate the one or more sets of shares, which may provide improved security of data access. Rotation of the slice/share relies on use of the information-theoretic security function. The rotation coordination module 496 determines to rotate shares of the set of shares of the one or more sets of shares stored in the set of storage units, where the data is encoded using the information-theoretic security function to produce the set of shares. The determining may be based on one or more of detecting compromise of a share of the set of shares (e.g., detect unauthorized access, detect a storage error, detect corruption), interpreting a rotation schedule, receiving an error message, and receiving a rotation request. The rotation coordination module 496 selects a decode threshold number of storage units three and 54 as rotation participants 498. The selecting includes identifying available storage units of the set of storage units and selecting from the available storage units those storage units associated with other shares of the set of shares, where the other shares are not associated with storage errors and a not associated with compromise.

The rotation coordination module 496 facilitates generation of a common key. The common key may be generated based on one or more of a random number, a lookup, retrieving a secret key from a local memory, and receiving the common key. The rotation coordination module 496 issues share rotation requests 500 to each of the rotation participants (e.g., the storage units 354 of the rotation participants 498), where each share rotation request 500 includes one or more of an equivalence encoding matrix utilized to generate the set of shares, the common key, a secret position indicator within a data vector used to generate the set of shares, identifiers of the rotation participants, and an identifier of a local share of the set of shares held by a corresponding rotation participant associated with share rotation request.

Each rotation participant partially decodes the local share using an inverted square matrix based on the equivalence encoding matrix and the identifiers of the rotation participants to produce a partially decoded vector that includes a decode threshold number of elements. The partially decoding includes selecting rows of the equivalence encoding matrix corresponding to the rotation participants to form a square matrix and inverting the square matrix to form the inverted square matrix. Next, the inverted square matrix is matrix multiplied by the local share to produce the partially decoded vector. Each rotation participant encrypts each element of the decode threshold number of elements of the partially decoded vector using the common key, except for an element corresponding to the secret position within the data vector, to produce a new data vector that includes a decode threshold number of elements.

For each storage unit 354 of the set of storage units, each rotation participant partially encodes the new data vector using a row of the equivalence encoding matrix corresponding to the storage unit to produce a partial share of a set of partial shares. The partially encoding includes extracting the row of the equivalence encoding matrix corresponding to the storage unit and matrix multiplying the new data vector by the extracted row of the equivalence encoding matrix to produce the partial share of the set of partial shares. The rotation participant sends a share rotation response 502 that includes the set of partial shares to the set of storage units such that each storage unit of the set of storage units receives a decode threshold number of partial shares 504 associated with the storage unit from the decode threshold number of rotation participants.

Each storage unit 354 of the set of storage units combines the received decode threshold number of partial shares 504 to produce a new share. The combining includes finding a sum of the received decode threshold number of partial shares in a field of integers associated with the information-theoretic security function. For example, each storage unit may perform an XOR of the received decode threshold number of partial shares to produce the new share. Each storage unit 354 replaces the local share with the new share. Alternatively, or in addition to, each storage unit 354 deletes the local share when confirmation is received from at least a decode threshold number of storage units of the set of storage units that each of the decode threshold number of storage units has successfully received a decode threshold number of partial shares 504 to produce a corresponding share.

Figure 44B:
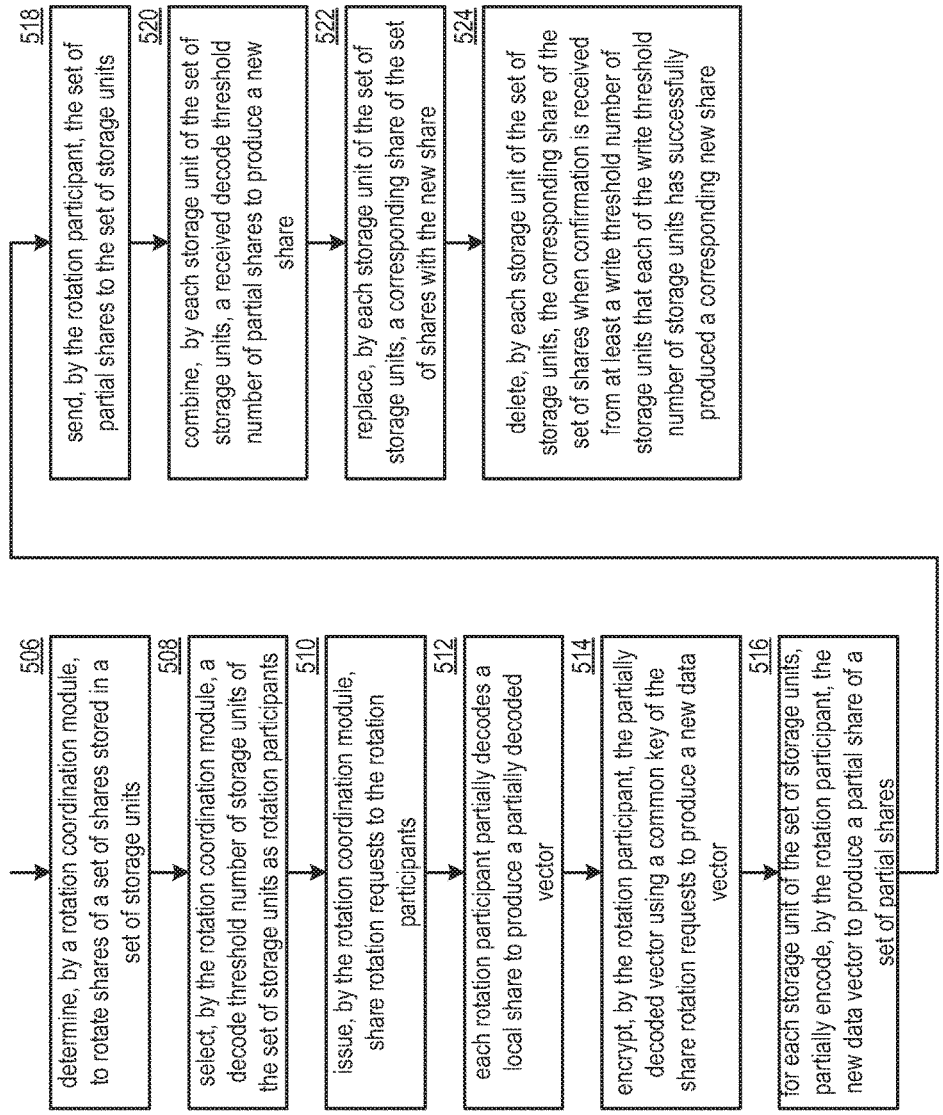
FIG. 44B is a flowchart illustrating an example of rotating encoded data slices in accordance with the present invention.

FIG. 44B is a flowchart illustrating an example of rotating encoded data slices. The method begins at step 506 where a rotation coordination module determines to rotate shares of a set of shares stored in a set of storage units, where a data segment is encoded using an information-theoretic security function to produce the set of shares. The method continues at step 508 where the rotation coronation module selects a decode threshold number of storage units of the set of storage units as rotation participants. The method continues at step 510 where the rotation coronation module issues share rotation requests to the rotation participants.

The method continues at step 512 where each rotation participant partially decodes a local share of the set of shares to produce a partially decoded vector that includes a decode threshold number of elements. The method continues at step 514 where each rotation participant encrypts each element of the decode threshold number of elements of the partially decoded vector using a common key of the share rotation requests, except for an element corresponding to the secret position within the data vector as indicated by the share rotation requests, to produce a new data vector that includes a decode threshold number of elements.

The method continues at step 516 where each rotation participant partially encodes, for each storage unit of the set of storage units, the new data vector using a row of an equivalence encoding matrix corresponding to the storage unit to produce a partial share of a set of partial shares. The method continues at step 518 where each rotation participant sends the set of partial shares to the set of storage units such that each storage unit of the set of storage units receives a decode threshold number of partial shares associated with the storage unit from the decode threshold number of rotation participants. The method continues at step 520 where each storage unit of the set of storage units combines the received decode threshold number of partial shares to produce a new share. The combining includes finding a sum of the received decode threshold number of partial shares in a field of integers associated with the information-theoretic security function.

The method continues at step 522 where each storage unit replaces the local share associated with the storage unit with the new share associated with the storage unit. The method continues at step 524 where each storage unit of set of storage units deletes the local share of the set of shares when confirmation is received from at least a write threshold number of storage units that each of the read threshold number of storage units has successfully produced a corresponding share (e.g., each as received the decode threshold number of partial shares to produce a corresponding new share).

FIG. 45A is a schematic block diagram of another embodiment of a dispersed storage network (DSN) system illustrating an example of securing data 530 in the DSN. The DSN includes an outbound distributed storage and task (DST) processing module 80 of FIG. 3, the distributed storage and task network (DSTN) module 22 of FIG. 1, the network 24 of FIG. 1, and the inbound DST processing module 82 of FIG. 3. The outbound DS processing module 80 includes the dispersed storage (DS) error encoding module 112 of FIG. 4. Hereafter, the outbound DS processing module 80 may be referred to interchangeably as a source processing module. The inbound DST processing module 82 includes the DS error decoding module 182 of FIG. 13. Hereafter, the inbound DS processing module 182 may be referred to interchangeably as a destination processing module. The DSTN module 22 includes a set of DST execution units 1-n. Each DST execution unit may be implemented utilizing the DST execution unit 36 of FIG. 1. Hereafter, the DST execution units 1-n may be referred to interchangeably as storage units 1-n. Each DST execution unit 36 includes the DST client module 34 of FIG. 3 and the memory 88 of FIG. 3. Hereafter, one or more of the DST client modules 34 may be referred to as an intermediator processing module.

A computer readable storage medium of the DSN includes one or more memory sections. Each memory section stores operational instructions. The DSN further includes one or more processing modules of one or more computing devices and/or computing units. The outbound DS processing module 80, the inbound DST processing module 82, and the DST client modules 34 of each of the DST execution units 1-n includes at least some of the one or more processing modules. The one or more processing modules execute the operational instructions stored by one or more memory sections. As a specific example, a first memory section stores operational instructions that are executed by the outbound DS processing module 80 (e.g., source processing module) to cause a first computing device and/or first computing unit of the one or more computing devices and/or computing units to perform functions of the outbound DS processing module 80. As another specific example, a second memory section stores operational instructions that are executed by the one or more of the DST client modules 34 (e.g., of the intermediator processing module) to cause one or more of the storage units (e.g., DST execution units 1-n) of the of the one or more computing devices and/or computing units to perform functions of the DST client module 34 and/or intermediator processing module. As yet another specific example, a third memory section stores operational instructions that are executed by the inbound DST processing module 82 (e.g., destination processing module) to cause a second computing device and/or second computing unit of the one or more computing devices and/or computing units to perform functions of the inbound DS processing module 82.

In an example of operation of the securing of the data 530 in the DSN, the outbound DS processing module 80 stores the data 530 as stored slices and/or storage shares in a highly secure fashion in the DSTN module 22 such that an authorized recovering entity (e.g., inbound DS processing module 82), of a plurality of recovering entities authorized to access the DST execution units, may produce recovered data 540 without learning ciphertext of plaintext, an encryption key, and the stored slices and/or the stored shares. As such, the DSN may provide a system enhancement where immediate change out of an encryption key of the storing in the highly secure fashion is not necessarily required when a previously authorized recovering entity is no longer authorized.

As a specific example of storing the data 530 and producing the recovered data 540, the outbound DS processing module 80 secures the data 530 based on a key stream and in accordance with at least one securing function to produce secured data. The key stream is derived from a unilateral encryption key (e.g., a random key, a pseudorandom key, a private key, a secret key, a retrieve key, etc.) accessible only to the source processing module (e.g., to the outbound DST processing module 80). For example, the outbound DS processing module 80 transforms the unilateral encryption key using an encryption algorithm to produce the key stream.

Having derived the key stream, the outbound DST processing module 80 performs an exclusive ORing function on the data 530 with the key stream to produce encrypted data. Having produced the encrypted data, the outbound DST processing module 80 dispersed storage error encodes the encrypted data to produce a set of encoded data slices as the secure data. For example, the outbound DST processing module 80 encodes the encrypted data using an encoding matrix associated with a linear coding scheme to produce an encrypted data element slice set 532 as the set of encoded data slices. Examples of the linear coding scheme includes Blakley's Secret Sharing, Shamir Secret Sharing, Systematic Shamir, all or nothing transformation-Reed Solomon (AONT-RS), Reed-Solomon, RAID 5, RAID 6, replication, online codes and Rabin's Information Dispersal Algorithms. Having produced the set of encoded data slices, the outbound DST processing module 80 dispersed storage error encodes the key stream to produce a key stream slice set 534.

Alternatively, or in addition to, the outbound DST processing module 80 encrypts one or both of the encrypted data element slice set 532 and the key stream slice set 534 in a pairwise fashion using a decode threshold minus one number of unique keys. For example, the outbound DST processing module 80 encrypts (e.g., XOR) a keystream slice 2 and a keystream slice 4 using a common key of the decode threshold minus one number of unique keys.

Having produced the encrypted data element slice set 532 and the key stream slice set 534 as the secure data, the outbound DST processing module 80 sends, via the network 24, the secure data to the intermediator processing module of the one or more processing modules. For example, the outbound DST processing module 80 sends, via the network 24, a write slice request to each DST execution unit, where each write slice request includes one encoded data slice of the set of encoded data slices and one key stream slice of the key stream slice set 534. Each DST execution unit stores a received encoded data slice and key stream slice in the memory 88. For instance, DST execution unit 3 stores an encoded data slice 3 and a key stream slice 3 in the memory 88 of the DST execution unit 3.

In an example of operation of the producing the recovered data 540, the inbound DST processing module 82 selects a decode threshold number of storage units of the set of storage units 1-n as recovery participants (e.g., based on storage unit availability and favorable integrity of stored shares). For instance, the inbound DST processing module 82 selects DST execution units 1, 4, and 5 when the decode threshold number is 3 and each of the selected DST execution units 1, 4, and 5 are associated with favorable storage unit availability. Having selected the decode threshold number of storage units as the recovery participants, the inbound DST processing module 82 issues, via the network 24, partially decrypted and decoded data vector requests 536 to the recovery participants. Each request includes one or more of an encoding matrix utilized to generate each of the encrypted data element slice set and the key stream slice set, identifiers of the recovery participants (e.g., DST EX unit 1, 4, 5), and identifiers of a local keystream slice and a local encrypted data element slice held by a corresponding recovery participant (e.g., the local encrypted data element slice).

The producing the recovered data 540 further includes desecuring the secured data. Desecuring the secured data is divided into two partial desecuring stages. Having received a partially decrypted and decoded data vector request 536, a DST client module 34 of a corresponding recovery participant, partially desecures the secure data in accordance with a first partial desecuring stage of the two partial desecuring stages to produce partially desecured data. The first partial desecuring stage includes the DST client module 34 partially decoding the secure data to produce partially desecured data. As a specific example, the DST client module 34 of DST execution unit 1 obtains the encoding matrix (e.g., receive from a corresponding partially decrypted and decoded data vector request 536, retrieve from a local memory). Having obtained the encoding matrix, the DST client module 34 selects rows of the equivalence encoding matrix corresponding to the recovery participants to form a square matrix. Having formed the square matrix, the DST client module 34 inverts the square matrix to form an inverted square matrix. Having formed the inverted square matrix, the DST client module 34 matrix multiplies the inverted square matrix by the local encrypted data element slice 1 to produce a partially decoded encrypted data vector 1 as the partially desecured data.

The first partial desecuring stage further includes the DST processing module 34 partially decoding secured information regarding the key stream (e.g., the local key stream slice) to produce a partially desecured key stream. For instance, the DST client module 34 of the DST execution unit 1 matrix multiplies the inverted square matrix by the local key stream slice 1 to produce a partially decoded key stream vector 1 as the partially desecured key stream.

Having produced the partially desecured data and the partially desecured key stream, the DST client module 34 exclusive ORs the partially desecured data and the partially desecured key stream to produce the partially desecured data. For instance, the DST client module 34 of DST execution unit 1 exclusive ORs the partially decoded encrypted data vector 1 and the partially decoded key stream vector 1 to produce a partially decrypted and decoded data vector 1 as the partially desecured data. Having produced the partially desecured data, the DST client module 34 sends, via the network 24, a partially decrypted encoded data vector response 538 to the destination processing module (e.g., the inbound DST processing module 82) of the one or more processing modules. The partially decrypted encoded data vector response 538 includes the partially desecured data.

The inbound DST processing module 82 receives a decode threshold number of partially decrypted and decoded data vector responses 538 from the recovery participants. Having received the decode threshold number of partially decrypted and decoded data vector responses 538, the inbound DST processing module 82 further partially desecures the partially desecured data in accordance with a second desecuring stage of the two partial desecuring stages to recover the data as the recovered data 540, where the destination processing module (e.g., the inbound DST processing module 82) does not have access to the encryption key or to the key stream.

As a specific example, the inbound DST processing module 82 separates the partially desecured data into partially desecured data vectors. For example, the inbound DST processing module 82 obtains the partially decrypted and decoded data vector 1, a partially decrypted and decoded data vector 4, and a partially decrypted and decoded data vector 5 as the partially desecured data vectors. Having separated the partially desecured data, the inbound DST processing module 82 exclusive ORs the partially desecured data vectors to produce the recovered data 540. For example, the inbound DST processing module 82 exclusive ORs the partially decrypted and decoded data vectors 1, 4, and 5 to produce the recovered data 540.

Figures 45B, 45C:
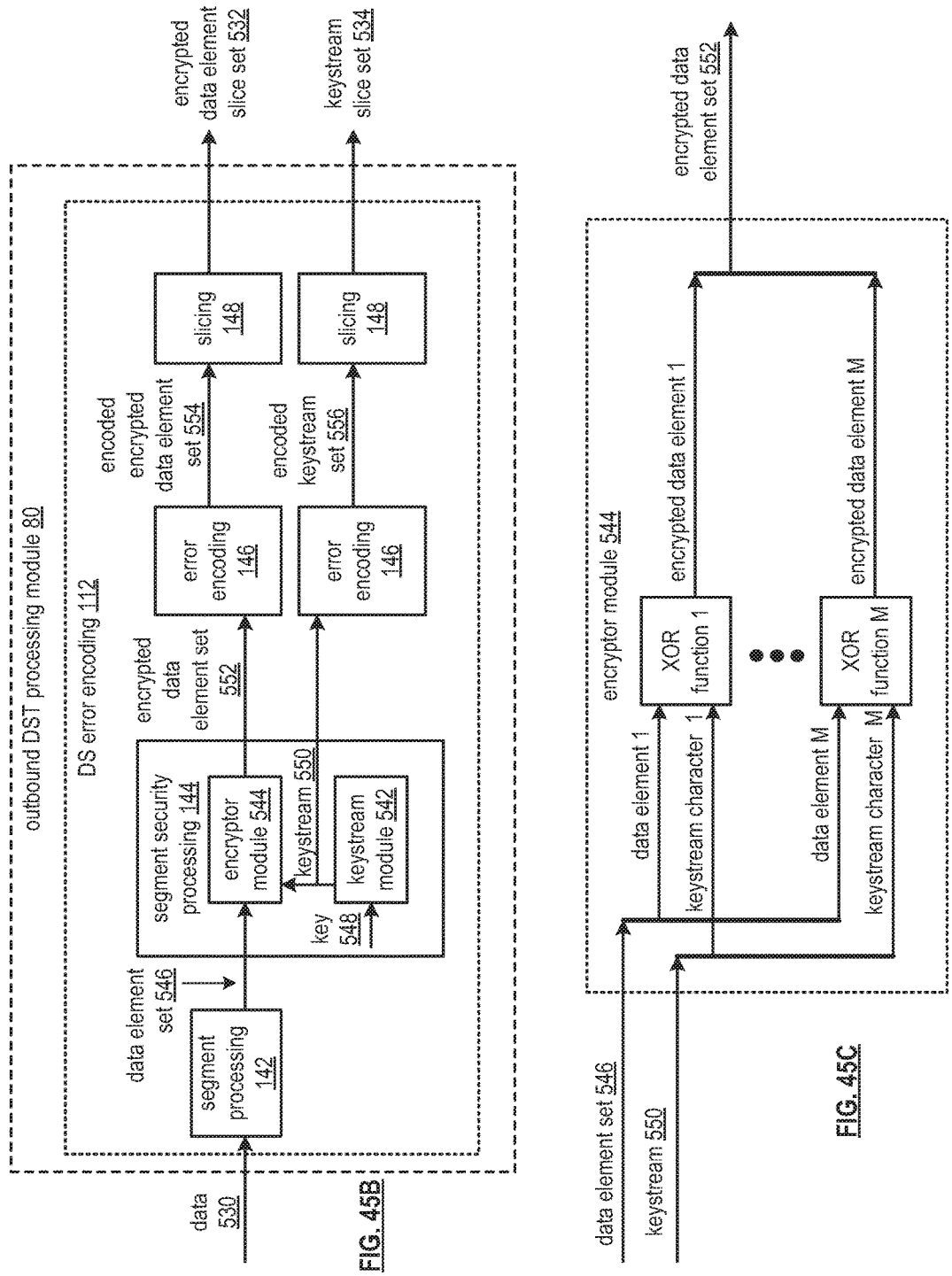
FIG. 45B is a schematic block diagram of another embodiment of an outbound DST processing in accordance with the present invention.
FIG. 45C is a schematic block diagram of an embodiment of an encryptor module in accordance with the present invention.

FIG. 45B is a schematic block diagram of another embodiment of an outbound distributed storage and task (DST) processing module 80 that includes the dispersed storage (DS) error encoding 112 of FIG. 4. The DS error encoding 112 includes the segment processing 142 of FIG. 6, the segment security processing 144 of FIG. 6, one or more error encoding 146 of FIG. 6, and one or more slicing 148 of FIG. 6. The segment security processing 144 includes a key stream module 542 and an encryptor module 544. The DS error encoding 112 functions to transform data 530 into the encrypted data element slice set 532 of FIG. 45A and to produce the key stream slice set 534 of FIG. 45A.

In an example of operation, the outbound DST processing module 80 receives the data 530, where the data may include one or more of a data object, a data partition, and a data segment. The segment processing 142 transforms the data 530 into a data element set 546. For example, the segment processing 142 divides the data 532 into a plurality of data segments in accordance with a data segmentation scheme and, for each data segment, outputs the data segment as the data element set 546. Each data element set 546 includes a set of characters of a corresponding data segment.

The key stream module 542 converts an encryption key 548 into a key stream 550 in accordance with an encryption algorithm. The key 548 may include a unilateral encryption key that is only available to the outbound DST processing module 80. For instance, the segment security processing module 144 generates the key 548 based on a random number, produces the key stream 550, destroys the key 548, and generates a new key 548 for a next key stream 550. Having generated the key stream 550, the encryptor module 544 encrypts the data element set 546 (e.g., the data) based on the key stream 550 and an encryption function to produce an encrypted data element set 552 as encrypted data. For instance, the encryption function includes an exclusive OR function.

A first error encoding 146 dispersed storage error encodes the encrypted data (e.g., the encrypted data element set 552) to produce an encoded encrypted data element set 554. A second error encoding 146 dispersed storage error encodes the key stream 550 to produce an encoded key stream set 556. A first slicing 148 slices the encoded encrypted data element set 554 to produce an encoded encrypted data element set 554 as a set of encoded and encrypted data slices. The first slicing 148 produces further sets of encoded encrypted data slices for further data segments of the data 530. A second slicing 148 slices the encoded key stream set 556 to produce an encoded key stream set 556 as a set of encoded key stream slices. The second slicing 148 produces further sets of encoded key stream slices corresponding to further key streams 550 associated with encrypting the further data segments of the data 530. Having produced the set of encoded key stream slices and the set of encoded encrypted data slices, the outbound DST processing module 80 outputs the set of encoded key stream slices and the set of encoded and encrypted data slices to storage units of a dispersed storage network (DSN) for storage.

FIG. 45C is a schematic block diagram of an embodiment of the encryptor module 544 of FIG. 45B that includes exclusive OR functions 1-M. The encryptor module 544 encrypts a data element set 546 using a key stream 550. The data element set 546 includes data elements 1-M and the key stream 550 includes key stream characters 1-M. Each exclusive OR function 1-M performs an exclusive OR function on a data element of the data element set 546 and a corresponding key stream character of the key stream 550 to produce a corresponding encrypted data element of the encrypted data element set 552 of FIG. 45B. For example, the exclusive OR function 1 performs the exclusive OR function on data element 1 and key stream character 1 to produce encrypted data element 1, the exclusive OR function 2 performs the exclusive OR function on data element 2 and key stream character 2 to produce encrypted data element 2, through the exclusive OR function M performs the exclusive OR function on data element M and key stream character M to produce encrypted data element M.

Figure 45D:
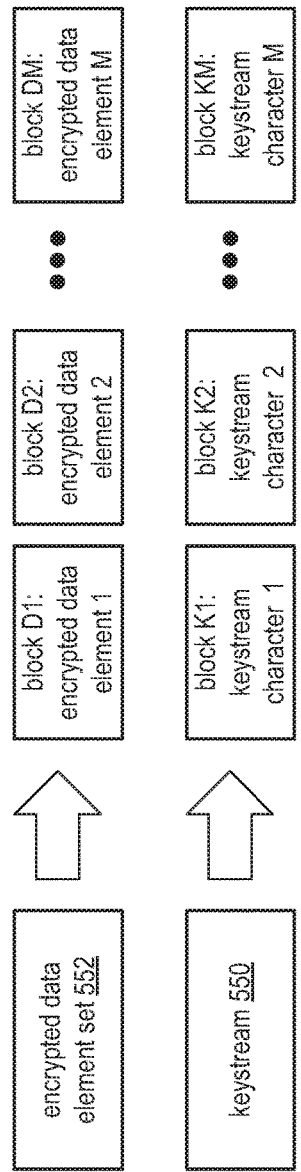
FIG. 45D is a diagram illustrating blocks of an encrypted data element set and blocks of a key stream in accordance with the present invention.

FIG. 45D is a diagram illustrating blocks of the encrypted data element set 552 of FIG. 45B and blocks of the key stream 550 of FIG. 45B. The encrypted data element set 552 includes a series of blocks D1-DM, where each block includes a corresponding encrypted data element 1-M. The series of blocks D1-DM provides a representation of the encrypted data element set 552. As an example of the representation, the encrypted data element set 552 is divided into M equal portions to form the blocks D1-DM when a fixed number of portions is required. As another example of the representation, the encrypted data element set 552 is divided into as many portions as required when a fixed data portion size is required. The key stream 550 includes a series of blocks K1-KM, where each block includes a corresponding key stream character 1-M. The series of blocks K1-KM provides a representation of the key stream 550, where a different key stream character is associated with each different encrypted data element.

Figure 45E:
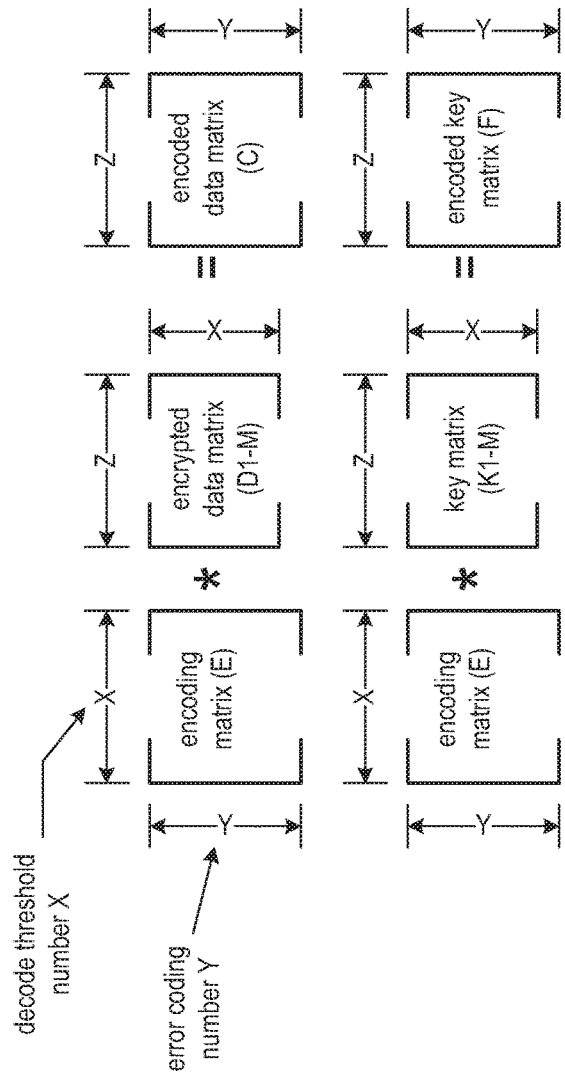
FIG. 45E is a diagram illustrating an example of encoding an encrypted data element set and encoding a key stream in accordance with the present invention.

FIG. 45E is a diagram illustrating an example of encoding the encrypted data element set 552 of FIG. 45D and encoding the key stream 550 of FIG. 45D. The encoding of the encrypted data element set 552 includes matrix multiplication of an encoding matrix (E) and an encrypted data matrix (D1-M) (e.g., generally a data matrix) to produce an encoded data matrix (C) in accordance with the linear coding scheme of FIG. 45A. The encoding of the key stream 550 includes matrix multiplication of the encoding matrix (E) and a key matrix (K1-M) to produce an encoded key matrix (F) in accordance with the linear coding scheme.

In an example of a Reed Solomon encoding function, the matrix multiplication is utilized to encode the encrypted data element set 552 to produce a set of encoded data blocks of the encoded data matrix. The Reed Solomon encoding function is associated with an error coding number Y (e.g., pillar width, number of slices per set) and a decode threshold number X. As a specific example, the encoding matrix includes the error coding number of Y rows and the decode threshold number of X columns. Accordingly, the encoding matrix includes Y rows of X coefficients. The set of data blocks of the encrypted data element set 552 is arranged into the encrypted data matrix (D1-M) having X rows of Z number of data words (e.g., X*Z=number of data blocks). The data matrix is matrix multiplied by the encoding matrix to produce the encoded data matrix, which includes Y rows of Z number of encoded values (e.g., encoded data blocks).

Figure 45F:
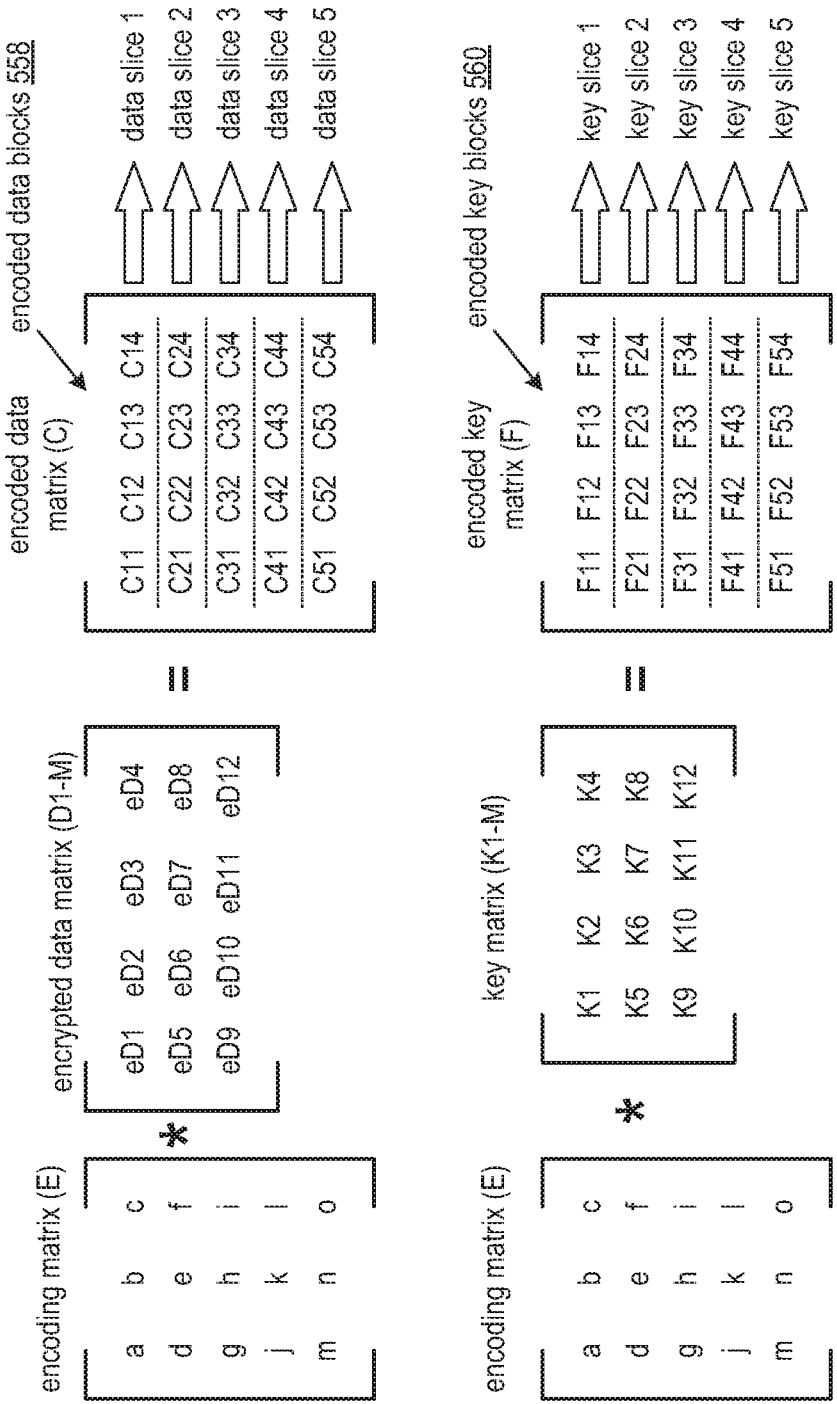
FIG. 45F is a diagram illustrating another example of encoding an encrypted data element set and encoding a key stream in accordance with the present invention.

FIG. 45F is a diagram illustrating another example of encoding the encrypted data element set 552 of FIG. 45D and encoding the key stream 550 of FIG. 45D. The encoding of the encrypted data element set 552 includes matrix multiplication of the encoding matrix (E) of FIG. 45E and the encrypted data matrix (D1-M) of FIG. 45E to produce encoded data blocks 558 of the encoded data matrix (C) of FIG. 45E in accordance with the linear coding scheme of FIG. 45A. The encoding of the key stream 550 includes matrix multiplication of the encoding matrix (E) and the key matrix (K1-M) of FIG. 45E to produce encoded key blocks 560 of the encoded key matrix (F) of FIG. 45E in accordance with the linear coding scheme.

In an example of operation of using a Reed Solomon encoding function, the encrypted data element set 552 is converted into encrypted data blocks (e.g., eD1-eD12) of the encrypted data matrix (D_1-M).

Next, the encoding matrix is matrix multiplied by the encrypted data matrix (D1-M) to produce the encoded matrix, where the encoded matrix includes the encoded data blocks 558. As a specific example, dispersed storage error encoding utilizes an error coding number of five and a decode threshold number of three. As such, the encoding matrix (E) includes five rows of three coefficients (e.g., a-o). The encrypted data element set 552 is divided into corrupted data blocks eD1-eD12 which are arranged into the encrypted matrix (D1-M) having 3 rows of 4 encrypted data blocks when the number of encrypted data blocks is 12.

A number of rows of the encrypted data matrix matches the number of columns of the encoding matrix (e.g., the decode threshold number). A number of columns of the encrypted data matrix increases as the number of encrypted data blocks of the encrypted data element set increases. The corrupted data matrix is matrix multiplied by the encoding matrix to produce the encoded matrix, which includes 5 rows of 4 encoded data blocks 558 (e.g., C11-C14, C21-C24, C31-C34, C41-C44, and C51-C54). The number of rows of the encoded matrix matches the number of rows of the encoding matrix (e.g., error coding number). As an instance of the matrix multiplication, C11=aeD1+beD5+ceD9; C12=aeD2+beD6+ceD10; C21=deD1+eeD5+feD9; C31=geD1+heD5+ieD9; C34=geD4+heD8+ieD12; and C54=meD4+neD8+oeD12.

One or more encoded data blocks 558 from each row of the encoded data matrix are selected to form a corresponding encoded data slice of a set of encoded data slices. Accordingly, an error coding number of encoded data slices are produced from the encoded data matrix. For example, coded values C11-C14 are selected to produce an encoded data slice 1, coded values C21-C24 are selected to produce an encoded data slice 2, coded values C31-C34 are selected to produce an encoded data slice 3, coded values C41-C44 are selected to produce an encoded data slice 4, and coded values C51-C54 are selected to produce an encoded data slice 5. The encrypted data matrix may be recovered to reproduce the encrypted data element set when any decode threshold number of corruption-free encoded data slices are available of the set of encoded data slices. Alternatively, the encrypted data element set may be reproduced when a decode threshold number of encoded data blocks 558 for each column of the encoded data matrix are available.

In a similar fashion, the encoding matrix is matrix multiplied by the key matrix (K1-M) to produce encoded key blocks F11-F14, F21-F24, F31-F34, F41-F44, and F51-F54 as the encoded key blocks 560 of the encoded key matrix (F) of in accordance with the linear coding scheme. One or more encoded key blocks 560 from each row of the encoded key matrix are selected to form a corresponding encoded key stream slice of a set of encoded key stream slices. Accordingly, an error coding number of encoded key stream slices are produced from the encoded key matrix. For example, coded values F11-F14 are selected to produce an encoded key stream slice 1, coded values F21-F24 are selected to produce an encoded key stream slice 2, coded values F31-F34 are selected to produce an encoded key stream slice 3, coded values F41-F44 are selected to produce an encoded key stream slice 4, and coded values F51-F54 are selected to produce an encoded key stream slice 5.

Figure 45G:
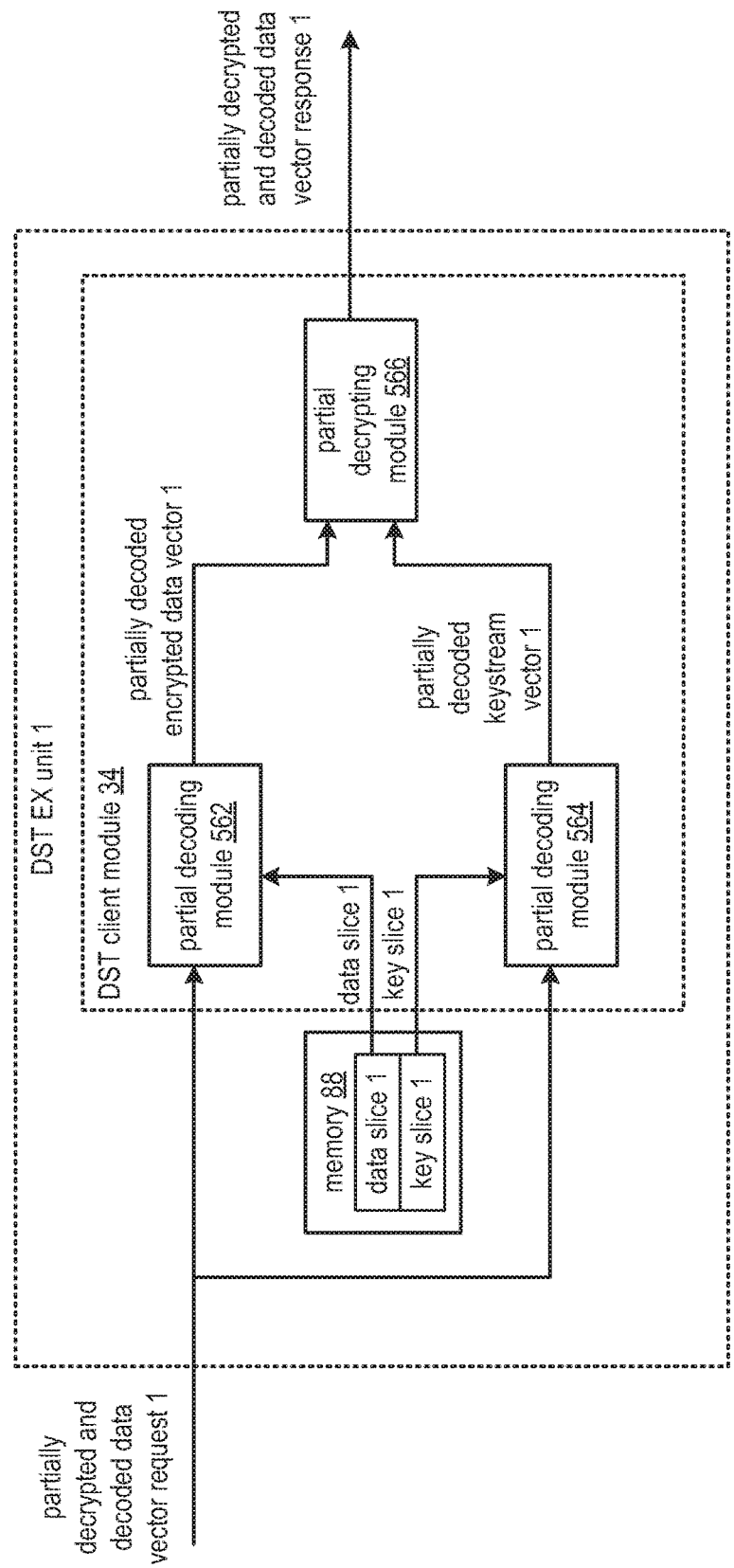
FIG. 45G is a schematic block diagram of another embodiment of a distributed storage and task execution (DST) unit in accordance with the present invention.

FIG. 45G is a schematic block diagram of another embodiment of the distributed storage and task execution (DST) units of FIG. 45A that includes the DST client module 34 of FIG. 45A and the memory 88 of FIG. 45A. The DST client module 34 includes a partial decoding module 562, the partial decoding module 564, and a partial decrypting module 566. The DST execution unit functions to receive a partially decrypted and decoded data vector request and to produce a corresponding partially decrypted and decoded data vector response.

In an example of operation, the DST client module 34 receives a retrieval request (e.g., a partially decrypted and decoded data vector request 1) regarding an encoded key stream slice of a set of encoded key stream slices and an encoded and encrypted data slice of a set of encoded and encrypted data slices. The request may include one or more of an encoding matrix, identifiers of recovery participants, an identifier of the encoded key stream slice, and an identifier of the encoded and encrypted data slice.

Having received the request, the partial decoding module 564 retrieves the encoded key stream slice from the memory 88 based on the identifier of the encoded key stream slice. For example, the partial decoding module 564 retrieves encoded key stream slice 1 from the memory 88. Having retrieved the encoded key stream slice, the partial decoding module 564 partially dispersed storage error decodes the encoded key stream slice to produce a partially decoded key stream vector. For example, the partial decoding module 564 partially dispersed storage error decodes the encoded key stream slice 1 to produce a partially decoded key stream vector 1. The partial decoding is discussed in greater detail with reference to FIGS. 45H-J.

The partial decoding module 562 retrieves the encoded and encrypted data slice from the memory 88 based on the identifier of the encoded and encrypted data slice. For example, the partial decoding module 562 retrieves encoded and encrypted data slice 1 from the memory 88. Having retrieved the encoded and encrypted data slice, the partial decoding module 562 partially dispersed storage error decodes the encoded key stream slice to produce a partially decoded and encrypted data vector. For example, the partial decoding module 562 partially dispersed storage error decodes the encoded and encrypted data slice 1 to produce a partially decoded and encrypted data vector 1.

The partial decrypting module 566 partially decrypts the partially decoded and encrypted data vector in accordance with an encryption function and based on the partially decoded key stream vector to produce a partially decrypted and decoded data vector. The DST execution unit issues, to the destination processing module of FIG. 45A, a partially decrypted than decoded data vector response that includes the partially decrypted and decoded data vector. For example, the partial decrypting module 566 partially decrypts the partially decoded and encrypted data vector 1 in accordance with an encryption function (e.g., an exclusive OR function on each element of each vector) and based on the partially decoded key stream vector 1 to produce a partially decrypted and decoded data vector 1. Having produced the partially decrypted than decoded data vector 1, the DST client module 34 sends, to the destination processing module, a partially decrypted than decoded data vector 1 response that includes the partially decrypted than decoded data vector 1.

Figure 45H:
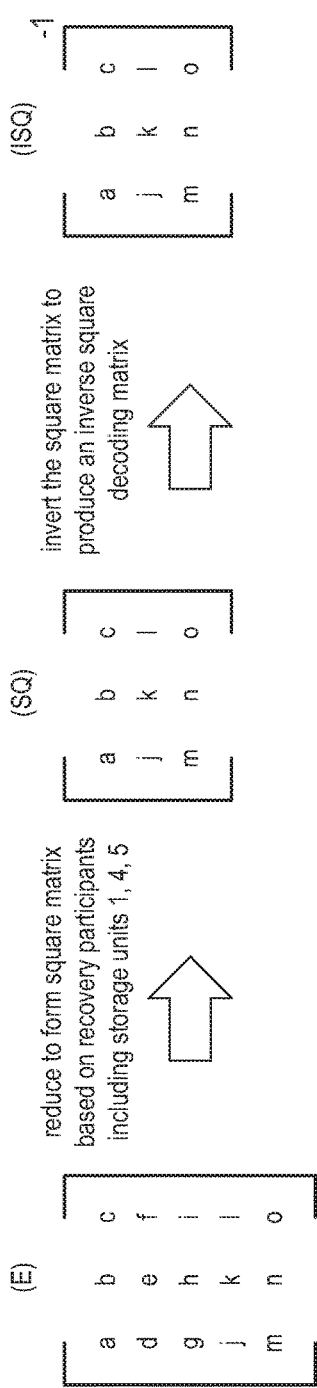
FIG. 45H is a diagram illustrating an example of generating an inverse square matrix in accordance with the present invention.

FIG. 45H is a diagram illustrating an example of generating an inverse square matrix. The partial decoding module 564 of FIG. 45G obtains a square matrix, where the square matrix is derived from the encoding matrix (E) of FIG. 45F. The obtaining includes one or more of receiving in a request, retrieving, and generating. As a specific example of obtaining the square matrix when generating, the partial decoding module 564 of FIG. 45G obtains the encoding matrix (E) of FIG. 45F by receiving the encoding matrix in the partially decrypted and decoded data vector request 1 of FIG. 45G.

Figure 45I:
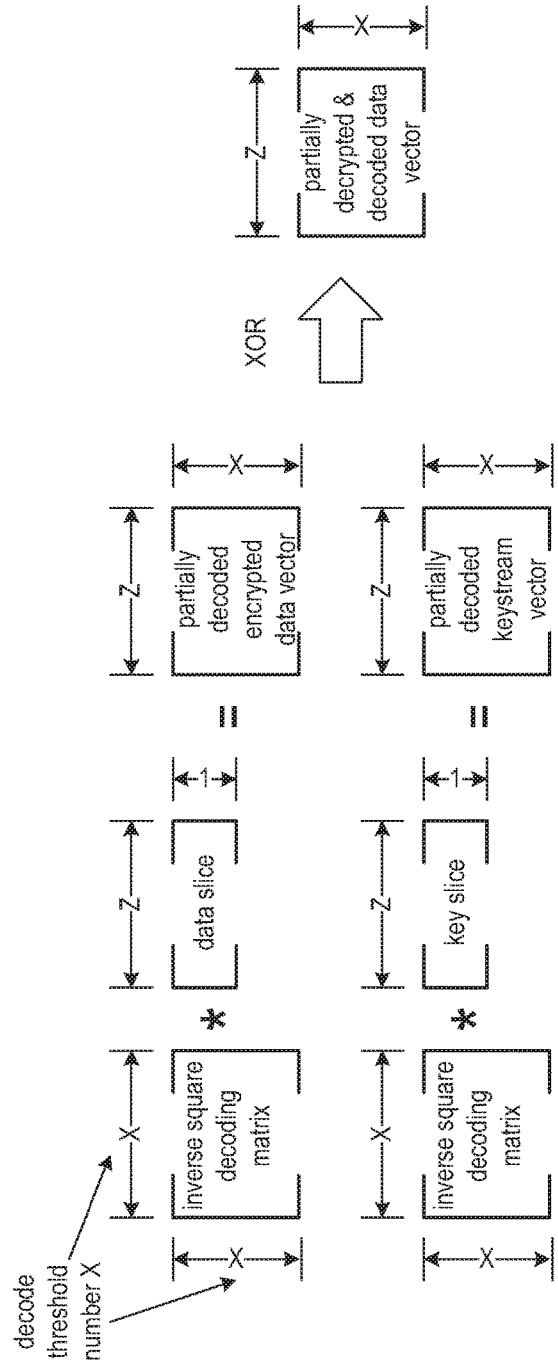
FIG. 45I is a diagram illustrating an example of producing a partially decrypted and decoded data vector in accordance with the present invention.

Having obtained the encoding matrix, the partial decoding module 564 reduces the encoding matrix to produce the square matrix based on identities of the recovery participants of the partially decrypted and decoded data vector request 1. For example, the partial decoding module 564 reduces the encoding matrix to include rows 1, 4, and 5 corresponding to recovery participants of DST execution units 1, 4, and 5. Having produced the square matrix, the partial decoding module 564 performs a matrix inversion function to invert the square matrix to produce the inverse square decoding matrix FIG. 45I is a diagram illustrating an example of producing a partially decrypted and decoded data vector. In an example of operation, the partial decoding module 562 of FIG. 45G generates the partially decoded and encrypted data vector of FIG. 45G based on the square matrix of FIG. 45H and the encoded and encrypted data slice retrieved from the memory 88 of FIG. 45G. For instance, the partial decoding module 562 matrix multiplies the inverse square decoding matrix of FIG. 45H (e.g., based on the square matrix) by the encoded and encrypted data slice 1 to produce the partially decoded and encrypted data vector 1 of FIG. 45G. The inverse square decoding matrix has a decode threshold number X of columns and a decode threshold number X of rows. The encoded and encrypted data slice 1 includes a Z number of data blocks. The partially decoded and encrypted data vector 1 includes Z columns and X rows.

The partial decoding module 564 generates the partially decoded key stream vector of FIG. 45G based on the square matrix and the encoded key stream slice retrieved from the memory 88 of FIG. 45G. For instance, the partial decoding module 564 matrix multiplies the inverse square decoding matrix by the encoded key stream slice 1 to produce the partially decoded key stream vector 1 of FIG. 45G.

The partial decrypting module 566 of FIG. 45G exclusive ORs the partially decoded and encrypted data vector with the partially decoded key stream vector to produce the partially decrypted and decoded data vector. For example, the partial decrypting module 566 exclusive ORs the partially decoded and encrypted data vector 1 with the partially decoded key stream vector 1 to produce the partially decrypted and decoded data vector 1. The operation of the partial decrypting module 566 is discussed in greater detail with reference to FIG. 45J.

Figure 45J:
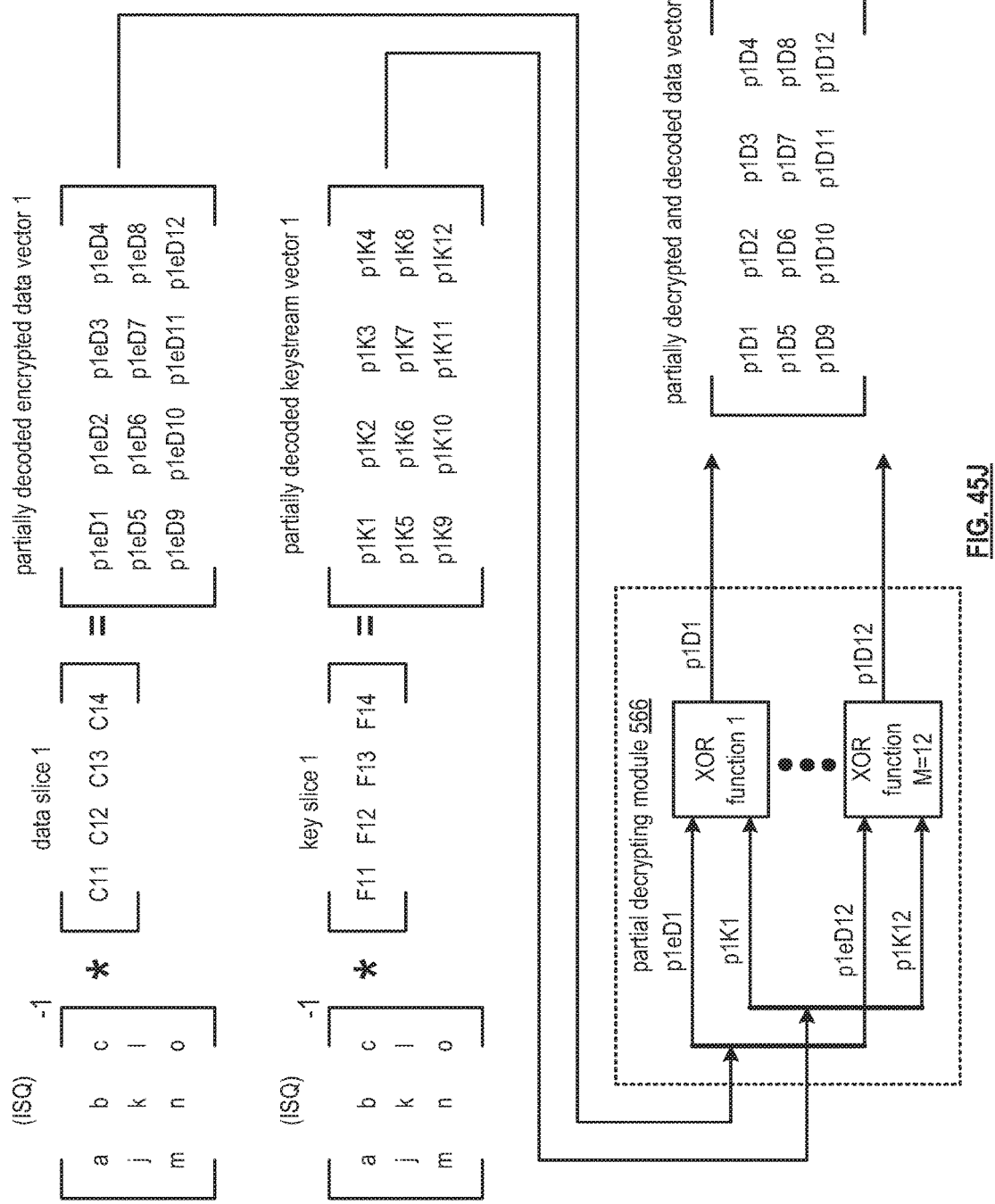
FIG. 45J is a schematic block diagram of an embodiment of a partial decrypting module in accordance with the present invention.

FIG. 45J is a schematic block diagram of an embodiment of the partial decrypting module 566 of FIG. 45G. The partial decrypting module 566 includes exclusive OR functions 1-M=12. The partial decoding module 562 of FIG. 45G matrix multiplies the inverse square matrix of FIG. 45H by the encoded and encrypted data slice 1 (e.g., blocks C11, C12, C13, C14) of FIG. 45G to produce the partially decoded and encrypted data vector 1 of FIG. 45G, where the partially decoded and encrypted data vector 1 includes blocks p1eD1 through p1eD12. The partial decoding module 564 of FIG. 45G matrix multiplies the inverse square matrix of FIG. 45H by the encoded key stream slice 1 (e.g., blocks F11, F12, F13, F14) of FIG. 45G to produce the partially decoded key stream vector 1 of FIG. 45G, where the partially decoded key stream vector 1 includes blocks p1K1 through p1K12.

The partial decrypting module 566 exclusive ORs the partially decoded and encrypted data vector with the partially decoded key stream vector to produce the partially decrypted and decoded data vector of FIG. 45G. For example, the partial decrypting module 566 exclusive ORs the partially decoded and encrypted data vector 1 of FIG. 45G with the partially decoded key stream vector 1 of FIG. 45G to produce the partially decrypted and decoded data vector 1 of FIG. 45G.

The partial decrypting module 566 partially decrypts the partially decoded and encrypted data vector 1 using the partially decoded key stream vector 1, where the partially decoded and encrypted data vector 1 includes blocks p1eD1 through p1eD12 and the partially decoded key stream vector 1 includes blocks p1K1 through p1K12. Each exclusive OR function 1-M performs an exclusive OR function on a block of the partially decoded and encrypted data vector 1 and a corresponding block of the partially decoded key stream vector 1 to produce a corresponding block of the partially decrypted and decoded data vector 1. For example, the exclusive OR function 1 performs the exclusive OR function on block p1eD1 and p1K1 to produce block p1D1, the exclusive OR function 2 performs the exclusive OR function on block p1eD2 and p1K2 to produce block p1D2, through the exclusive OR function M performs the exclusive OR function on block p1eD12 and p1K12 to produce block p1D12.

Figures 45K, 45L:
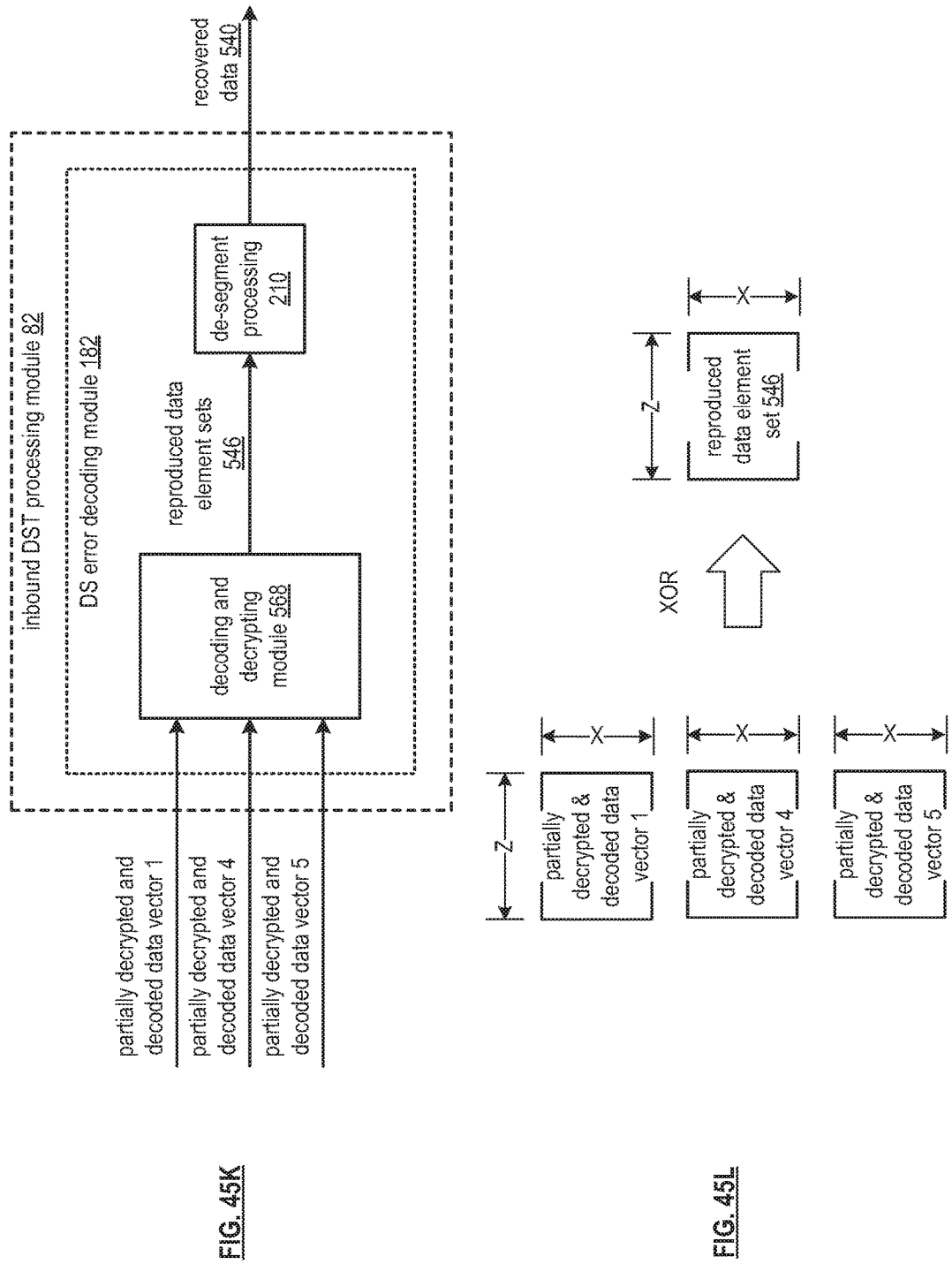
FIG. 45K is a schematic block diagram of another embodiment of an inbound distributed storage and task (DST) processing module in accordance with the present invention.
FIG. 45L is a diagram illustrating an example of producing a reproduced data element set in accordance with the present invention.

FIG. 45K is a schematic block diagram of another embodiment of the inbound distributed storage and task (DST) processing module 82 of FIG. 45A. The inbound DST processing module 82 includes the dispersed storage (DS) error decoding module 182 of FIG. 13. The DS error decoding module 182 includes a decoded and decrypting module 568 and the de-segment processing 210 of FIG. 16. The inbound DST processing module 82 functions to process a decode threshold number of partially decrypted than decoded data vectors to produce recovered data 540.

In an example of operation, the decoding and decrypting module 568 receives the decode threshold number of partially decrypted and decoded data vectors (e.g., partially decrypted and decoded data vectors 1, 4, and 5) in response to scent retrieval requests that includes the retrieval request of FIG. 45A. Having received the decode threshold number of partially decrypted and decoded data vectors, the decoding and decrypting module 568 reproduces, without access to the encryption key 548 of FIG. 45B and without access to the key stream 550 of FIG. 45B, data from the partially decrypted and decoded data vectors based on a function in accordance with the encryption function. As a specific example, the decoding and decrypting module 568 finds a sum of the decode threshold number of received partially decrypted and decoded data vectors in a field of integers associated with the linear coding scheme of FIG. 45A. For example, the decoding and decrypting module 568 performs an exclusive OR function on each corresponding block of the decode threshold number of partially decrypted and decoded data vectors to produce a corresponding element of a reproduced data element set 546. For instance, the decoding and decrypting module 568 performs the exclusive OR function on a third block of each of the decode threshold number of partial decrypted in decoded data vectors to produce a corresponding third block of the reproduced data element set 546.

The decoding and decrypting module 568 may repeat the performing of the exclusive OR function on further groups of a decode threshold number of partially decrypted in decoded data vectors of other data element sets to produce reproduced data element sets 546. When the reproduced data element sets 546 are produced, the de-segment processing 210 aggregates the reproduced data element sets 546 to produce the recovered data 540. For instance, the de-segment processing 210 converts each reproduced data element set 546 into a corresponding data segment and aggregates a plurality of resulting data segments into the recovered data 540.

FIG. 45L is a diagram illustrating an example of producing a reproduced data element set. As a specific example, the decoding and decrypting module 568 of FIG. 45K exclusive ORs the partially decrypted and decoded data vectors 1, 4, and 5 of FIG. 45K to reproduce the data (e.g., the reproduced data element set 546). Each partially decrypted and decoded data vector has Z columns and X rows matching the reproduced data element set 546. The decoding and decrypting module 568 performs the exclusive OR function on corresponding blocks of each of the partially decrypted and decoding data vectors to produce a corresponding block of the reproduced data element set 546. The performing of the exclusive OR by the decoding and decrypting module 568 is discussed in greater detail with reference to FIG. 45M.

Figure 45M:
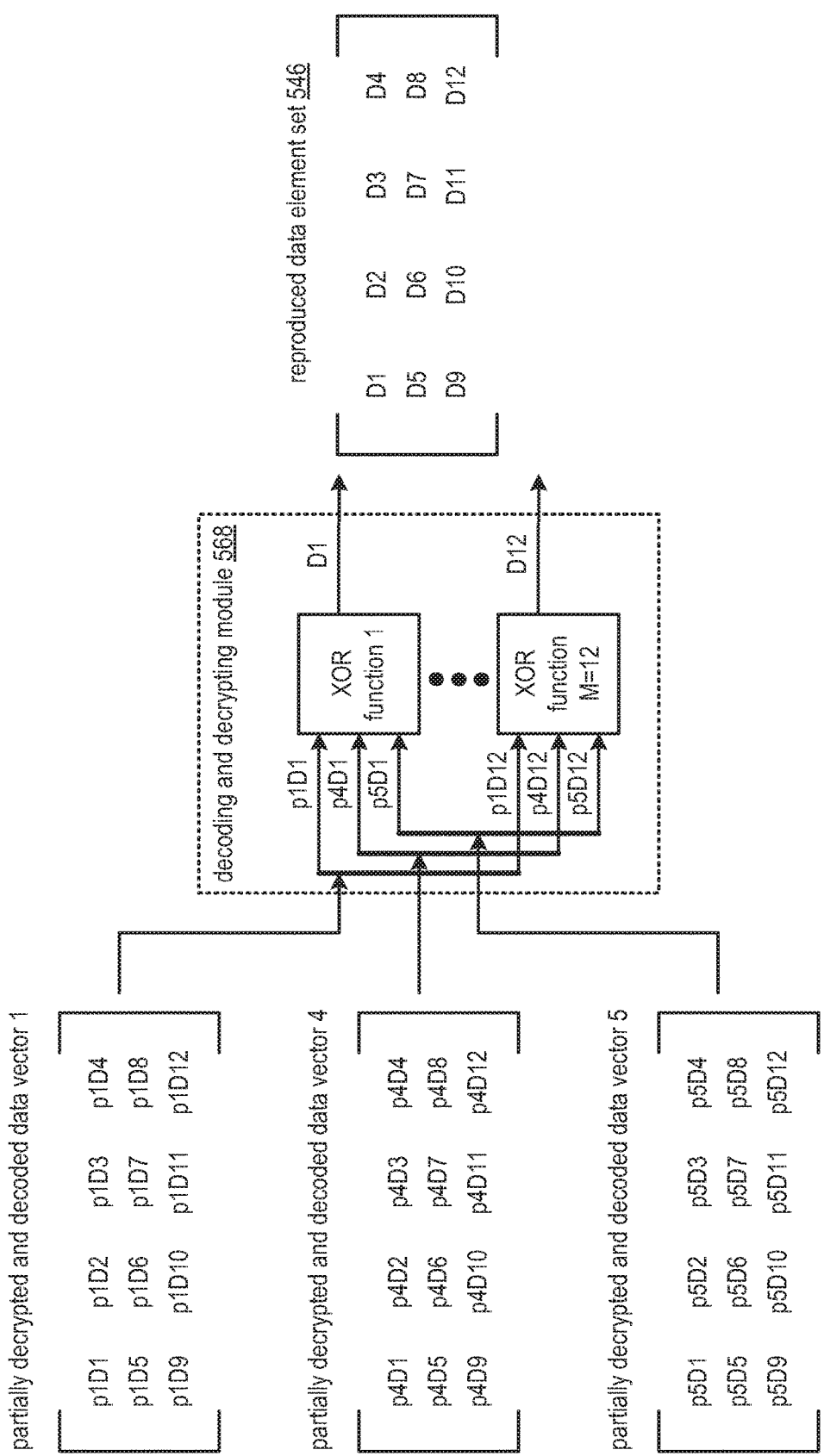
FIG. 45M is a schematic block diagram illustrating an embodiment of a decoding and decrypting module in accordance with the present invention.

FIG. 45M is a schematic block diagram illustrating an embodiment of the decoding and decrypting module 568 of FIG. 45K. The decoding and decrypting module 568 includes exclusive OR functions 1-M=12. The decoding and decrypting module 568 exclusive ORs the partially decrypted and decoded data vectors 1, 4, and 5 of FIG. 45K to produce the reproduced data element set 546 of FIG. 45K.

Each exclusive OR function 1-M performs an exclusive OR function on a corresponding block of each partially encrypted and decoded data vector 1, 4, 5 to produce a corresponding block of the reproduced data element set 546. For example, the exclusive OR function 1 performs the exclusive OR function on block p1D1, p4D1, and p5D1 to produce block D1, the exclusive OR function 2 performs the exclusive OR function on block p1D2, p4D2, and p5D2 to produce block D2, through the exclusive OR function M performs the exclusive OR function block p1D12, p4D12, and p5D12 to produce block D12.

Figure 45N:
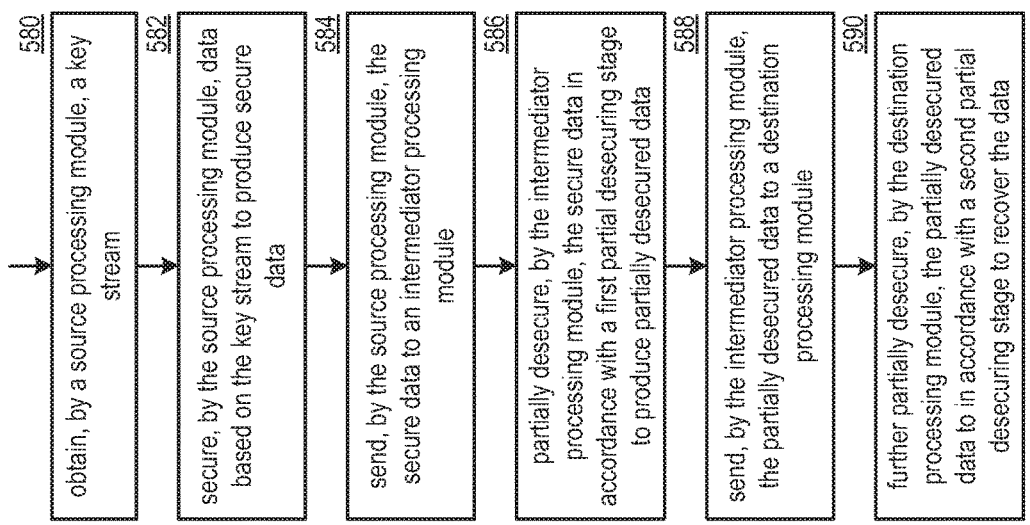
FIG. 45N is a flowchart illustrating an example of securing data in a dispersed storage network (DSN) in accordance with the present invention.

FIG. 45N is a flowchart illustrating an example of securing data in a dispersed storage network (DSN). The method begins at step 580 where a source processing module obtains a key stream, where the key stream is derived from a unilateral encryption key accessible only to the source processing module. For example, the source processing module generates the unilateral encryption key based on a random number and applies an encryption algorithm to the unilateral encryption key to produce the key stream.

The method continues at step 582 where the source processing module secures data based on the key stream and in accordance with at least one securing function to produce secure data. As a specific example, the source processing module exclusive ORs the data with the key stream to produce encrypted data and dispersed storage error encodes the encrypted data to produce a set of encoded data slices as the secure data.

The method continues at step 584 where the source processing module sends the secure data to an intermediator processing module (e.g., a set of processing modules associated with a set of storage units). As a specific example, the source processing module dispersed storage error encodes the key stream to produce a set of encoded key stream slices as secured information regarding the key stream, generates a set of write slice requests that includes the set of encoded key stream slices and the set of encoded data slices, and sends the set of write slice requests to the set of storage units.

The method continues at step 586 where the intermediator processing module partially desecures the secure data in accordance with a first partial desecuring stage of two partial desecuring stages associated with the securing the secure data to produce partially desecured data. As a specific example, the intermediator processing module partially decodes the secure data to produce partially desecured data. For instance, for each of a decode threshold number of storage units, the intermediator processing module matrix multiplies an inverted square matrix (e.g., derived from a reduced matrix of an encoding matrix) by a corresponding encoded data slice of the set of encoded data slices to produce a partially decoded encrypted data vector. The intermediator processing module partially decodes the secured information regarding the key stream to produce a partially desecured key stream. For instance, for each of the decode threshold number of storage units, the intermediator processing module matrix multiplies the inverted square matrix by a corresponding encoded key stream slice of the set of key stream slices to produce a partially decoded key stream vector. The intermediator processing module exclusive ORs the partially desecured data and the partially desecured key stream to produce the partially desecured data. For instance, for each of the decode threshold number of storage units, the intermediator processing module exclusive ORs the partially decoded encrypted data vector with the partially decoded key stream vector to produce a partially decrypted and decoded data vector.

The method continues at step 588 where the intermediator processing module sends the partially desecured data to a destination processing module. As a specific example, for each of the decode threshold number of storage units, the intermediator processing module sends a corresponding partially decrypted and decoded data vector to the destination processing module.

The method continues at step 590 where the destination processing module further partially desecures the partially desecured data in accordance with a second desecuring stage of the two partial desecuring stages to recover the data, where the destination processing module does not have access to the unilateral encryption key or to the key stream. As a specific example, the destination processing module separates the partially desecured data into partially desecured data vectors. For instance, the destination processing module receives a decode threshold number of partially decrypted and decoded data vectors as the partially be secure data vectors. Having received the partially be secure data vectors, the processing module exclusive ORs the partially desecured data vectors to produce the recovered data. For instance, the destination processing module exclusive ORs corresponding blocks of each of the decode threshold number of partially decrypted and decoded data vectors to produce a corresponding blocks of a reproduced data element set as the recovered data.

Figure 45O:
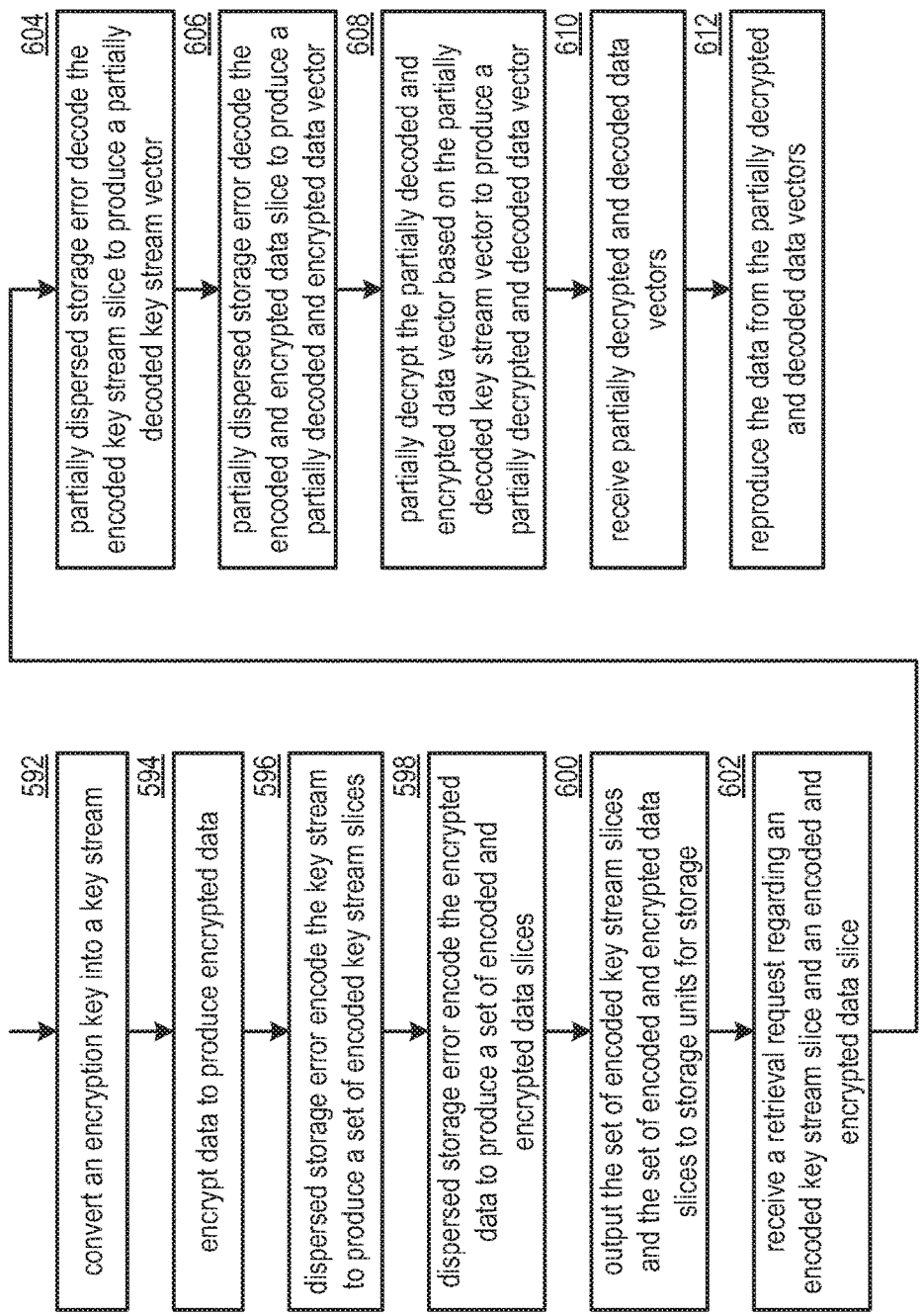
FIG. 45O is a flowchart illustrating another example of securing data in a dispersed storage network (DSN) in accordance with the present invention.

FIG. 45O is a flowchart illustrating another example of securing data in a dispersed storage network (DSN). The method begins at step 592 where a first computing unit of the DSN converts an encryption key into a key stream. For example, the first computing unit transforms the encryption key using an encryption algorithm to produce the key stream. The method continues at step 594 where the first computing unit encrypts data based on the key stream and an encryption function to produce encrypted data. The encryption function includes an exclusive OR function. For example, for each block of the data when arranged into a data matrix, the first computing unit performs the exclusive OR function on the block of the data and a corresponding block of the key stream to produce a block of the encrypted data, where all blocks of the encrypted data form an encrypted data matrix.

The method continues at step 596 where the first computing unit dispersed storage error encodes the key stream to produce a set of encoded key stream slices. For example, the first computing unit matrix multiplies an encoding matrix by a key stream matrix that includes the key stream to produce an encoded key matrix that includes the set of encoded key stream slices. The encoding matrix includes an equivalence matrix associated with a linear coding scheme.

The method continues at step 598 where the first computing unit dispersed storage error encodes the encrypted data to produce a set of encoded and encrypted data slices. For example, the first computing unit matrix multiplies the encoding matrix by the encrypted data matrix to produce an encoded data matrix that includes the set of encoded and encrypted data slices The method continues at step 600 where the first computing unit outputs the set of encoded key stream slices and the set of encoded and encrypted data slices to storage units of the DSN for storage. For example, the first computing unit generates a set of write slice requests that includes the set of encoded key stream slices and the set of encoded and encrypted data slices, and sends the set of write slice requests to the set of storage units.

The method continues at step 602 where one of the storage units (e.g., of a decode threshold number of storage units of the set of storage units) receives a retrieval request regarding an encoded key stream slice of the set of encoded key stream slices and an encoded and encrypted data slice of the set of encoded and encrypted data slices. The retrieval request may include one or more of identities of the encoded key stream slice and of the encoded and encrypted data slice, identities of other storage units of the decode threshold number of storage units, the encoding matrix, a reduced square matrix of the encoding matrix based on the identities of the other storage units, and an inverse square matrix.

The method continues at step 604 where the storage unit partially dispersed storage error decodes the encoded key stream slice to produce a partially decoded key stream vector. As a specific example, the storage unit obtains the square matrix, where the square matrix is derived from the encoding matrix of the dispersed storage error encoding. Having obtained the square matrix, the storage unit generates the partially decoded key stream vector based on the square matrix and the encoded key stream slice. As a specific example, the storage unit matrix multiplies the inverse square matrix by the encoded key stream slice to produce the partially decoded key stream vector.

The method continues at step 606 where the storage unit partially dispersed storage error decodes the encoded and encrypted data slice to produce a partially decoded and encrypted data vector. As a specific example, the storage unit generates the partially decoded and encrypted data vector based on the square matrix and the encoded and encrypted data slice. For instance, the storage unit matrix multiplies the inverse square matrix by the encoded and encrypted data slice to produce the partially decoded and encrypted data vector.

The method continues at step 608 where the storage unit partially decrypts the partially decoded and encrypted data vector in accordance with the encryption function and based on the partially decoded key stream vector to produce a partially decrypted and decoded data vector. As a specific example, the storage unit exclusive ORs the partially decoded and encrypted data vector with the partially decoded key stream vector to produce the partially decrypted and decoded data vector. For instance, for each block of the partially decrypted and decoded data vector, the storage unit exclusive ORs the block of the partially decrypted and decoded data vector with a corresponding block of the partially decoded key stream vector to produce a corresponding block of the partially decrypted and decoded data vector. The storage unit sends the partially decrypted and decoded data vector to a second computing unit of the DSN (e.g., that issued the retrieval request).

The method continues at step 610 where the second computing unit receives partially decrypted and decoded data vectors (e.g., a decode threshold number) in response to sent retrieval requests that includes the retrieval request. The method continues at step 612 where the second computing unit reproduces, without access to the encryption key and without access to the key stream, the data from the partially decrypted and decoded data vectors based on a function in accordance with the encryption function. As a specific example, for each block of the partially decrypted and decoded data vectors, the second computing unit exclusive ORs associated blocks of the partially decrypted encoded data vectors to produce a corresponding block of a reproduced data element set that includes the data.

FIG. 46A is a schematic block diagram of another embodiment of a dispersed storage network (DSN) system that includes a plurality of rebuilding modules 388 of FIG. 41A and the storage unit set 386 of FIG. 41A. The storage unit set 386 includes a set of storage units 354 of FIG. 41A and are utilized to store one or more sets of shares and/or slices, where a data segment is encoded to produce the one or more sets of shares (e.g., or slices). Henceforth, share and slice may be used interchangeably.

The plurality of rebuilding modules 388 are operable to share rebuilding responsibilities of scanning the storage unit set 386 to detect storage errors associated with the one or more sets of slices and facilitating abatement of detected storage errors by rebuilding one or more slices associated with the detected storage errors. From time to time, the responsibilities may overlap from storage unit the storage unit. For example, two or more of the rebuilding modules 388 may scan for the storage errors and produce a rebuilt slice that is associated with the detected storage errors for slices associated with a common dispersed storage network (DSN) address range. Each slice is associated with a DSN address (e.g., a slice name), where slices of a set of slices share a common component of a set of DSN addresses associated with the set of shares. For example, a set of shares are associated with a set of slice names, where each slice name of the set of slice names includes a common source name.

To facilitate execution of the rebuilding responsibilities, each rebuilding module 388 may issue and/or receive rebuilding requests 620 with the set of storage units and another one or more rebuilding modules 388. The rebuilding requests 620 includes one or more of a list slice request, a list digest of a slice list request, a read slice request, a generate partially encoded slice request, a zero information gain rebuilding request, and a slice rebuilding request. Each rebuilding module 388 may receive rebuilding responses 622 associated with the rebuilding responsibilities. The rebuilding responses 622 includes one or more of a list slice response, a list digest of a slice list response, a read slice response a generate partially encoded slice response, a zero information gain rebuilding response, and a slice rebuilding response.

A rebuilding module 388 identifies one or more DSN address ranges associated with rebuilding operations performed by one or more of the rebuilding modules 388. The identifying includes at least one of receiving a rebuilding DSN address range message, and extracting a DSN address from a received rebuilding request, interpreting a rebuilding schedule, and receiving an error message. The rebuilding module 388 compares the one or more DSN address ranges to a current DSN address range associated with rebuilding operations performed by the rebuilding module 388 (e.g., to check for DSN address range rebuilding activities overlap). When the comparison is unfavorable (e.g., DSN address range rebuilding activity overlap greater than a high overlap threshold), the rebuilding module 388 selects another DSN address range to substitute for a DSN address range associated with the unfavorable comparison. For example, the rebuilding module 388 eliminates at least one DSN address range associated with the rebuilding operations performed by the rebuilding module 388. When the comparison is favorable (e.g., DSN address range rebuilding activity overlap is less than a low overlap threshold), the rebuilding module 388 selects an additional DSN address range for additional rebuilding operations. The selecting includes identifying the additional DSN address range such that the additional DSN address range has minimal overlap with other DSN address ranges of other rebuilding modules. The selecting may further include the rebuilding module queuing rebuilding tasks associated with the additional DSN address range.

The rebuilding module 388 updates the current DSN address range associated with rebuilding operations performed by the rebuilding module 388 to include the additional DSN address range. The rebuilding module 388 indicates the current DSN address range with at least some of the one or more other rebuilding modules 388. The indicating includes at least one of performing rebuilding operations and issuing an updated DSN address range message that includes the current DSN address range.

FIG. 46B is a flowchart illustrating an example of managing rebuilding performance. The method begins at step 624 where a processing module (e.g., of a rebuilding module) identifies one or more dispersed storage network (DSN) address ranges associated with rebuilding operations performed by one or more other rebuilding modules. The method continues at step 626 where the processing module determines whether the one or more DSN address ranges compares favorably with a DSN address range associated with rebuilding operations performed by the rebuilding module. The method branches to step 630 when the comparison is unfavorable. The method continues to step 628 when the comparison is favorable. The method continues at step 628 where the processing module selects an additional DSN address range for additional rebuilding operations when the comparison is favorable. The selecting includes identifying an open DSN address range (e.g., no rebuilding modules are responsible for the open DSN address range) as the additional DSN address range and queuing additional rebuilding tasks for the additional DSN address range. The method branches to step 632.

The method continues at step 630 where the processing module selects another DSN address range to substitute for the DSN address range associated with the rebuilding operations performed by the rebuilding module when the comparison is unfavorable. The selecting includes one or more of adding a DSN address range offset to a currently active DSN address range within an overall allowable rebuilding DSN address range, selecting the other DSN address range when the other DSN address range is associated with a memory device that is not associated with the currently active DSN address range, and restricting issuing rebuilding requests in favor of issuing scanning requests when selection of the other DSN address range is not practical.

The method continues at step 632 where the processing module updates the DSN address range associated with rebuilding operations performed by the rebuilding module. For example, the processing module modifies the DSN address range in accordance with the DSN address range and the other DSN address ranges and/or additional DSN address ranges. The method continues at step 634 where the processing module indicates the DSN address range associated with rebuilding operations performed by the rebuilding module. The indicating includes performing rebuilding operations and issuing a rebuilding DSN address range message to one or more other rebuilding modules.

Figure 47A:
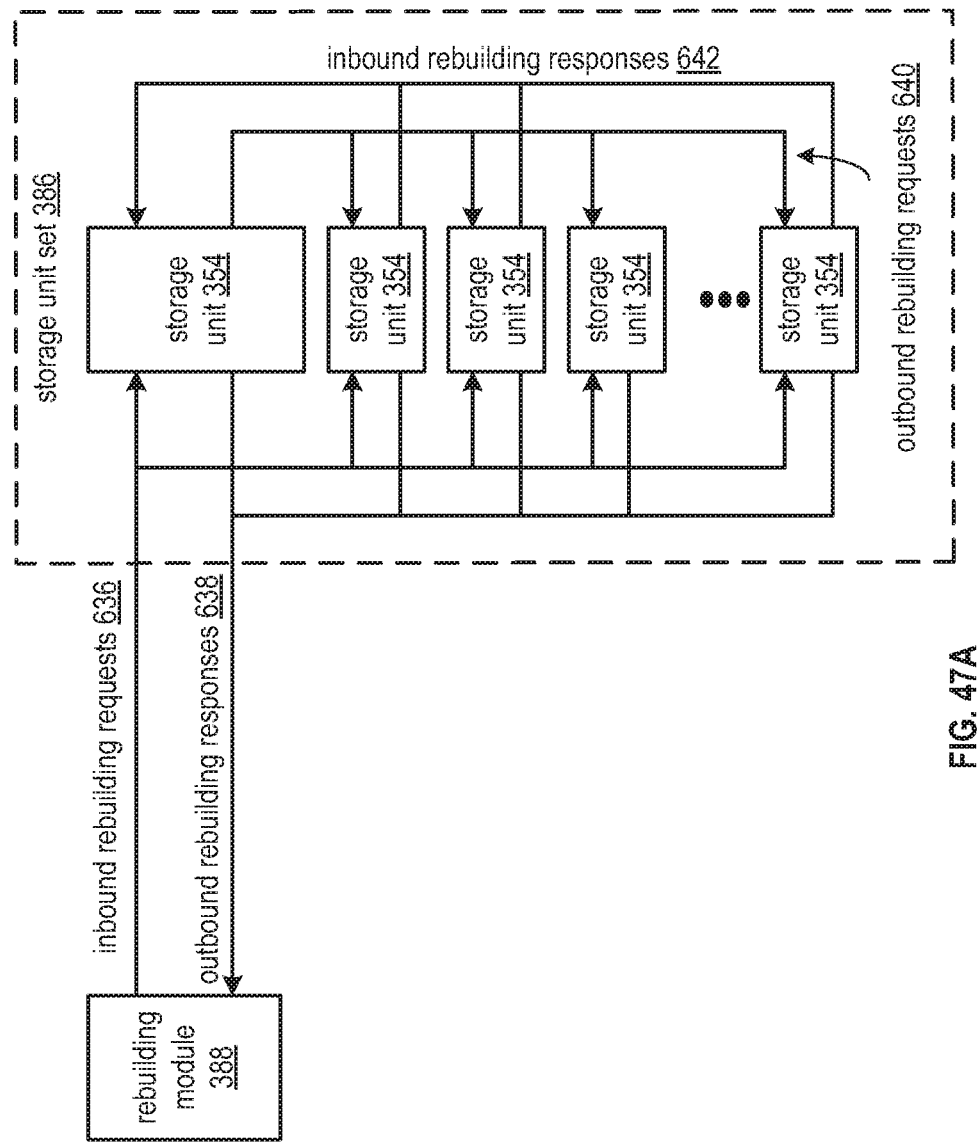
FIG. 47A is a schematic block diagram of another embodiment of a dispersed storage network (DSN) system in accordance with the present invention.

FIG. 47A is a schematic block diagram of another embodiment of a dispersed storage network (DSN) system that includes at least one rebuilding module 388 of FIG. 41A and the storage unit set 386 of FIG. 41A. The storage unit set 386 includes a set of storage units 354 of FIG. 41A, where one or more storage units 354 of the storage unit set includes capability to rebuild slices associated with storage errors. As such, any of the rebuilding module 388 and each storage unit 354 of the set of storage units may perform rebuilding operations.

The rebuilding module may issue inbound rebuilding requests 636 to one or more storage units 354 perform the rebuilding operations. The inbound rebuilding requests 636 includes at least one of a write rebuild slice request, a list slice request, a list digest of a slice list request, a read slice request, a generate partially encoded slice request, a zero information gain rebuild request, and a slice rebuild request. Each storage unit 354 may issue outbound rebuilding responses 638 to the rebuilding module 388 in response to receiving and processing the inbound rebuilding requests 636. The outbound rebuilding responses 638 includes at least one of a list slice response, a list digest of a slice list response, a read slice response, a generate partially encoded slice response, a zero information gain rebuild response, a slice rebuild response, and a write rebuild slice response.

A storage unit 354 performing a rebuilding operation may issue outbound rebuilding requests 640 to one or more other storage units 354 of the set of storage units. The outbound rebuilding requests 640 includes at least one of a list slice request, a list digest of a slice list request, a read slice request, a generate partially encoded slice request, a zero information gain rebuild request, and a slice rebuild request. A storage unit responding to a rebuilding operation initiated by another storage unit may issue an inbound rebuilding response 642. The inbound rebuilding response 642 includes at least one of a list slice response, a list digest of a slice list response, a read slice response, a generate partially encoded slice response, a zero information gain rebuild response, and a slice rebuild response.

Each storage unit 354 may determine what level of rebuilding operations the storage unit 354 will perform. A first level of rebuilding operations includes executing no rebuilding operations by the storage unit and relying exclusively on the rebuilding module to perform the rebuilding operations. A second level of rebuilding operations includes relying partially on the rebuilding module and partially on the storage unit. A third level of rebuilding operations includes relying exclusively on the storage unit for rebuilding operations. The determining includes the storage unit 354 assessing loading levels and determining at what rate to perform rebuilding operations on slice is associated with the storage unit in addition to storing slices within the storage unit that have been received from the rebuilding module. A system performance bottleneck may occur if a sum of a current rate of internal rebuilding multiplied by a decode threshold plus a rate of receiving rebuilt slices for storage is greater than a link speed of the storage unit to other entities. In one embodiment, the storage unit 354 sets its rate of internal rebuilding to be less than dividing a difference of the link speed minus the rate to receiving the rebuilt slices divided by the decode threshold.

In an example of operation, the storage unit 354 determines performance parameters and a current rate of internal rebuilding (e.g., slices per second) by one or more of initiating a query, accessing a historical record, receiving an error message, performing a test, calculating an estimate, extrapolating a last set of performance parameters, receiving a message, and interpreting a schedule. The performance parameters include one or more of communication link speed, the decode threshold number, and the rate of receiving rebuilt slices (e.g., slices per second). The storage unit 354 updates the rate of internal rebuilding based on the performance parameters. For example, the storage unit updates the rate of internal to be less than dividing a difference of the link speed minus the rate to receiving the rebuilt slices divided by the decode threshold. The storage unit 354 implements the updated rate of internal rebuilding by performing rebuilding operations in accordance with the updated rate of internal rebuilding.

When internally rebuilding, the storage unit 354 detects a storage error associated with the storage unit, obtains a decode threshold number of associated slices from other storage units, reproduces a slice to be rebuilt using the decode threshold number of associated slices, and stores the rebuilt slice in a memory of the storage unit. The storage unit 354 may receive a rebuilt slice from the rebuilding module, compare the rebuilt slice to recently internally rebuilt slices, and store the received rebuilt slice when the receipt rebuilt slice does not compare favorably (e.g., that included) to the recent internally rebuilt slices. Alternatively, the storage unit stores all received rebuilt slices.

Figure 47B:
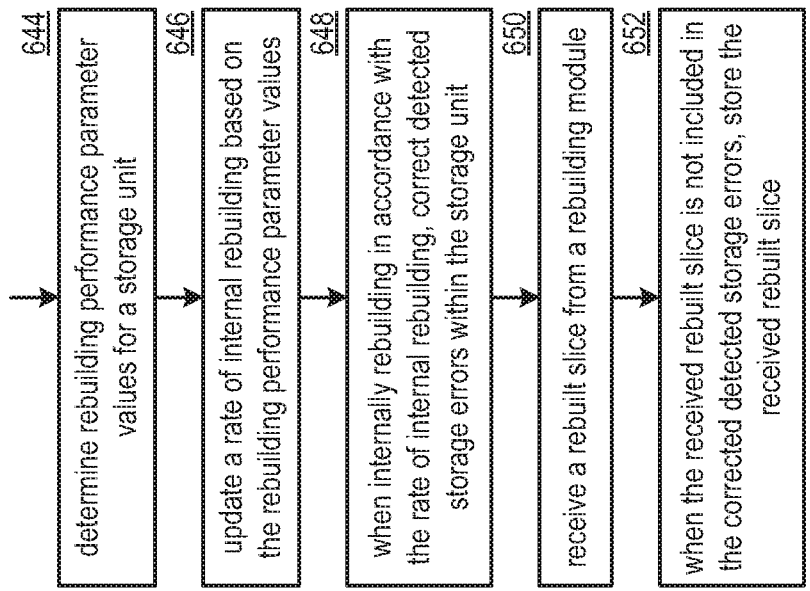
FIG. 47B is a flowchart illustrating another example of managing rebuilding performance in accordance with the present invention.

FIG. 47B is a flowchart illustrating another example of managing rebuilding performance. The method begins at step 644 where a processing module (e.g., of a storage unit) determines rebuilding performance parameter values for the storage unit. The method continues at step 646 where the processing module updates a rate of internal rebuilding based on the rebuilding performance parameter values. The updating may include accounting for routine input/output traffic for reads and writes of slices. In addition, the updating may incorporate estimating an expected number of errors per unit of time.

When internally rebuilding in accordance with the rate of internal rebuilding, the method continues at step 648 where the processing module corrects detected storage errors within the storage unit. The correcting includes detecting a storage error associated with the storage unit, obtaining a decode threshold number of associated slices from other storage units of a set of storage units that includes the storage unit, reproducing a slice to be rebuilt using the decode threshold number of associated slices, and storing the rebuilt slice in a memory of the storage unit.

The method continues at step 650 where the processing module receives a rebuilt slice from a rebuilding module. When the received rebuilt slice is not included in the corrected detected storage errors (e.g., previously corrected), the method continues at step 652 where the processing module stores the received rebuilt slice. Alternatively, or in addition to, the processing module discards the received rebuilt slice when the received rebuilt slice is included in the corrected detected storage errors. As a further alternative, the processing module stores each received rebuilt slice.

Figure 48A:
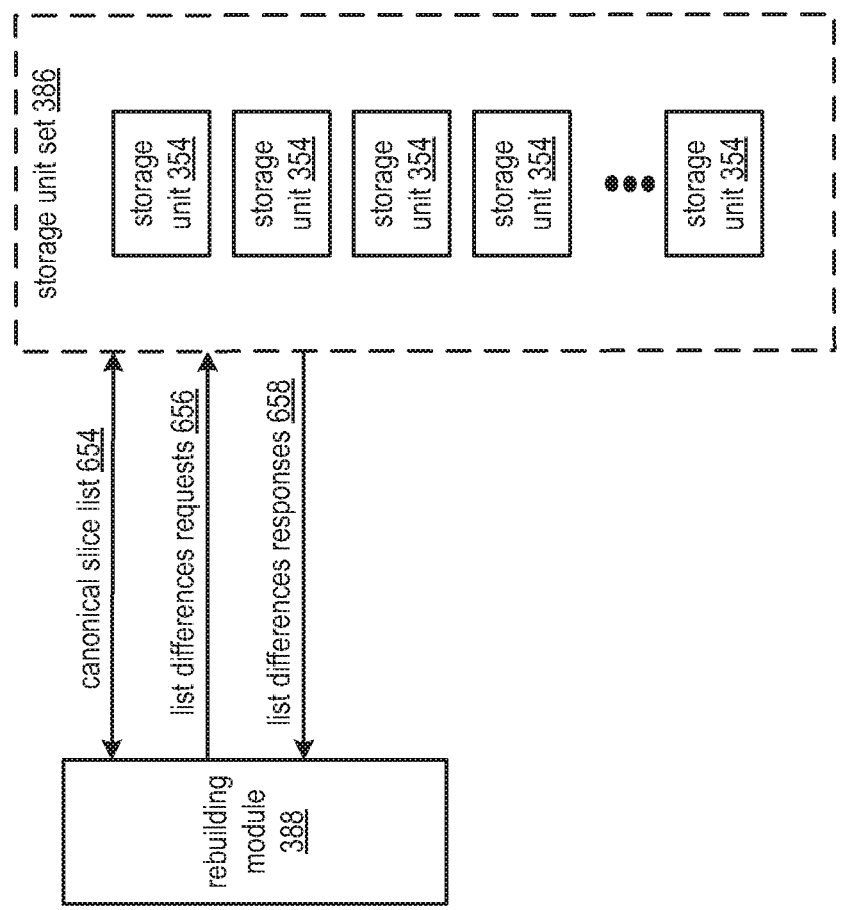
FIG. 48A is a schematic block diagram of another embodiment of a dispersed storage network (DSN) system in accordance with the present invention.

FIG. 48A is a schematic block diagram of another embodiment of a dispersed storage network (DSN) system that includes one or more rebuilding modules 388 of FIG. 41A and the storage unit set 386 of FIG. 41A. The storage unit set 386 includes a set of storage units 354, where one or more storage units of the storage unit set may include another rebuilding module capable to rebuild slices associated with storage errors. As such, the system includes one or more rebuilding modules 388. The one or more rebuilding modules 388 periodically coordinate some current set of storage slice names and revisions to create a canonical slice list for some point in time, where the list of slice names is associated with a DSN address range for the storage unit set 386. From time to time, the canonical slice list is updated and distributed amongst the rebuilding modules 388 (e.g., amongst the rebuilding module and the set of storage units).

In an example of rebuilding operations to detect storage errors, a rebuilding module 388 updates the canonical slice list by obtaining a previous canonical slice list 654, issuing a set of list slice requests to the set of storage units, receiving list slice responses, comparing the list slice responses, and updating the canonical list 654 based on the comparison. For example, the comparison is utilized to produce a majority vote of slice names and associated revision numbers to update the canonical list. The rebuilding module sends the canonical slice list 654 to each storage unit 354 of the storage unit set.

The rebuilding module 388 issues one or more list differences requests 656 to at least one storage unit 354 of the set of storage units. The issuing includes generating each list differences request 656 and sending the list differences request 656. The generating includes selecting a DSN address range based on at least one of a schedule, receiving an error message, receiving a request, and a predetermination. The generating further includes selecting the at least one storage unit of the set of storage units based on at least one of a schedule, receiving an error message, receiving a request, and a predetermination. The list differences request 656 includes the DSN address range and may include the canonical slice list (e.g., when the one or more storage units do not have an updated version of the canonical slice list).

Each storage unit 354 of the at least one storage unit compares the canonical slice list to a current slice list associated with the storage unit to identify differences. The storage unit 354 generates one or more list differences responses 658 based on the comparison to identify any of additional slices and revisions held by the storage unit and missing slices and revisions associated with the storage unit. The storage unit 354 sends each associated list differences response 658 to the rebuilding module 388. The rebuilding module 388 identifies potential storage errors of the storage unit based on the list differences response 658. For example, the rebuilding module 388 identifies storage errors associated with missing slices and revisions associated with the storage unit 354.

Figure 48B:
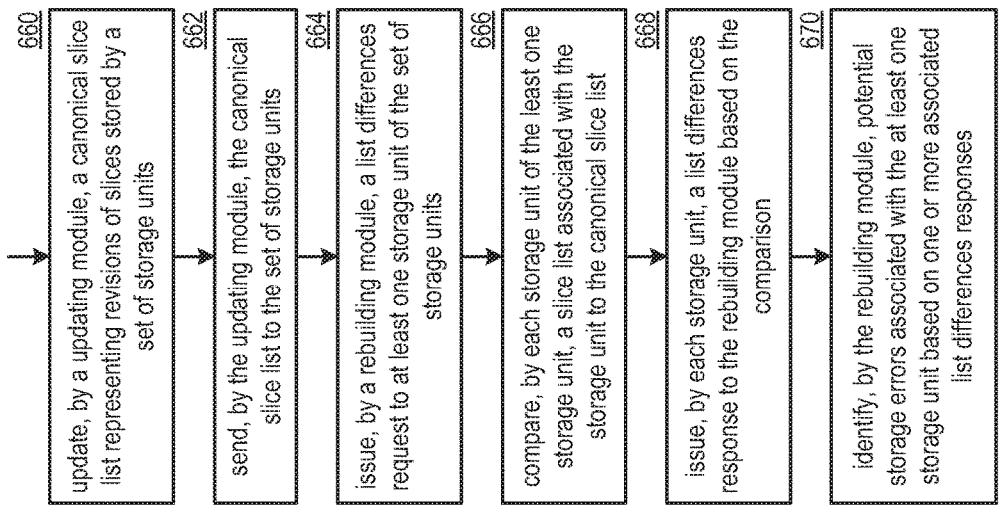
FIG. 48B is a flowchart illustrating an example of detecting storage errors in accordance with the present invention.

FIG. 48B is a flowchart illustrating an example of detecting storage errors. The method begins at step 660 where an updating module (e.g., a rebuilding module) updates a canonical slice list representing revisions of slices stored by a set of storage units. The method continues at step 662 where the updating module sends the canonical slice list of the set of storage units. The method continues at step 664 where the rebuilding module issues a list differences request to at least one storage unit of the set of storage units. The method continues at step 666 where each storage unit receiving a corresponding list differences request compares a slice list associated with the storage unit to the canonical slice list to identify any of missing revisions of slices and extra revisions of slices associated with the storage unit. The method continues at step 668 where each storage unit issues a list differences response to the rebuilding module based on the comparison. The method continues at step 670 where the rebuilding module identifies potential storage errors associated with the at least one storage unit based on one or more associated list differences responses.

Figure 49A:
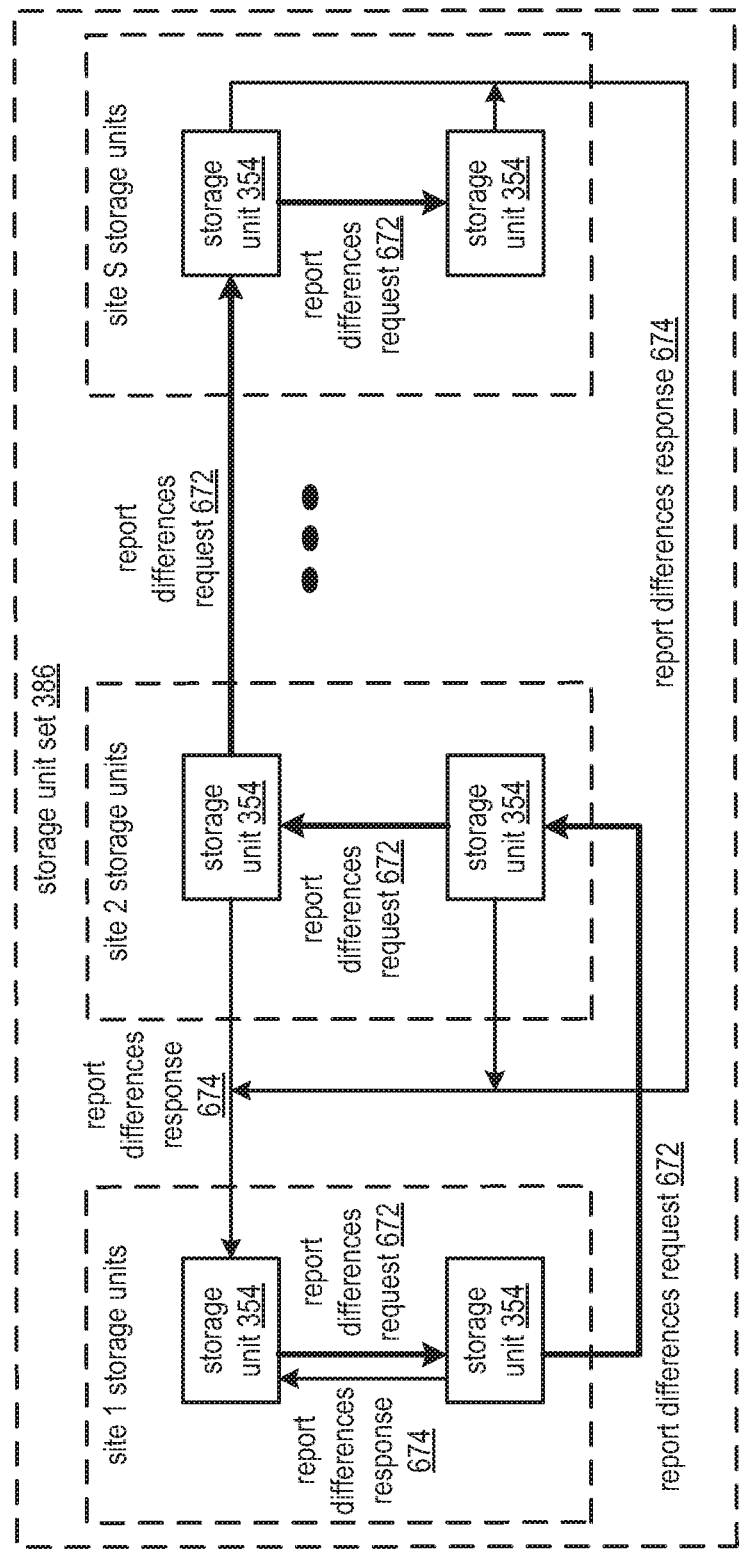
FIG. 49A is a schematic block diagram of another embodiment of a dispersed storage network (DSN) system in accordance with the present invention.

FIG. 49A is a schematic block diagram of another embodiment of a dispersed storage network (DSN) system that includes the storage unit set 386 of FIG. 41A. The storage unit set 386 includes S number of sites, where each of the sites includes one or more storage units 354 of FIG. 41A and where the S number of sites includes a set of storage units. One or more data objects are encoded using a dispersed storage error coding function to produce one or more pluralities of sets of encoded data slices, where each set of encoded data slices is stored in the set of storage units. Each set of encoded data slices is associated with a set of slice names. Each storage unit 354 of the set of storage units stores an encoded data slice of the set of encoded data slices and stores and associated slice name for the encoded data slice of the set of slice names. One or more encoded data slices may be associated with a slice name, where each of the one or more slices associated with the slice name are associated with a unique revision number.

The system functions to detect storage errors associated with encoded data slices stored at one or more storage units 354 of the set of storage units in accordance with a ring topology approach. An initiating storage unit 354 of the set of storage units at a first site of the S number of sites generates a slice list that includes a list of slice names and one or more revision numbers for each slice name within a DSN address range associated with the storage unit set 354. The generating includes issuing list slice requests to the set of storage units, receiving list slice responses from the set of storage units, and compiling list slice responses to form the slice list. The generating may further include comparing the list slice responses and utilizing a majority vote scheme to compile the slice list when at least some of the list slice responses compare unfavorably (e.g., extra or missing slices) to a majority of other list slice responses for the DSN address range.

The initiating storage unit 354 determines to update the slice list based on one or more of interpreting an update schedule, receiving an error message, receiving an update request, and receiving a rebuilding request. The updating includes obtaining the slice list, issuing a set of list slice requests to the set of storage units, receiving list slice responses, comparing list slice responses, and updating the slice list based on the comparing to produce the slice list that has been updated. The initiating storage unit 354 issues a report differences request 672 to another storage unit of the set of storage units in accordance with storage unit topology information. For example, the initiating storage unit generates and sends the report differences request 672 to another storage unit at a common site shared with the initiating storage unit.

The report differences request 672 includes one or more of the slice list, identity of the initiating storage unit, and the storage unit topology information, where the storage unit topology information includes information with regards to architecture of the S number of sites, which storage units of the set of storage units are implemented at each of the S number of sites, and an indicator to utilize the ring topology approach.

Having received the report differences request 672, the other storage unit compares a slice list to a local slice list associated with the other storage unit to identify differences. The other storage unit issues a report differences response 674 based on the comparison to the initiating storage unit (e.g., directly to the initiating storage unit), where the report differences response includes one or more of additional slice names and revisions that are present in the other storage unit but are not included in the slice list and missing slice names and revisions that are not present in the storage unit but are included in the slice list. The other storage unit forwards the report differences request 672 to a remaining storage unit of the set of storage units in accordance with the storage unit topology information when the remaining storage unit exists (e.g., when all of the storage units of the set of storage units have not yet received the report differences request). For example, the other storage unit forwards the report differences request 672 to a third storage unit of the first site when the third storage unit is implemented at the first site with the initiating storage unit and the other storage unit. As another example, the other storage unit forwards the report differences request 672 to a first storage unit of a second site when all storage units implemented at the first site with the initiating storage unit have received the report differences request 672. As such, a ring structured request differences request topology is established where each storage unit forwards, in accordance with the storage unit topology information, the report differences request 672 to a different storage unit until all of the storage units have received the report differences request 672.

For each storage unit of the remaining storage units, the remaining storage unit compares the slice list to a corresponding local slice list associated with the remaining storage unit and issues a corresponding report differences response 674 based on the comparison to the initiating storage unit. The initiating storage unit identifies potential storage errors of the set of storage units based on the list differences responses 674. For example, the initiating storage unit identifies a potential storage error when a list differences response 674 indicates that a sixth storage unit is missing an encoded data slice of a third revision.

Figure 49B:
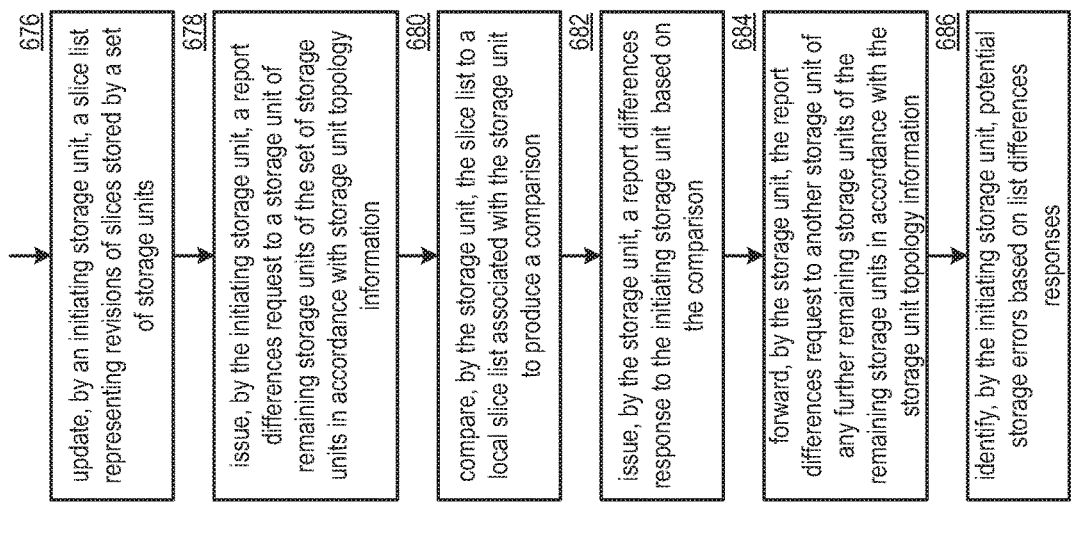
FIG. 49B is a flowchart illustrating another example of detecting storage errors in accordance with the present invention.

FIG. 49B is a flowchart illustrating another example of detecting storage errors. The method begins at step 676 where an initiating storage unit updates a slice list representing revisions of slices stored by a set of storage units. The method continues at step 678 where the initiating storage unit issues a report differences request to a storage unit of remaining storage units of the set of storage units in accordance with storage unit topology information, where the report differences request includes the slice list. For example, the initiating storage unit generates and sends the report differences request to another storage unit at a common site with the initiating storage unit.

The method continues at step 680 where the storage unit compares a slice list to a local list associated with the storage unit to produce a comparison. The method continues at step 682 where the storage unit issues a report differences response to the initiating storage unit based on the comparison (e.g., to include identity of any additional revisions of slices and/or any missing revisions of slices).

The method continues at step 684 where the storage unit forwards the report differences request to another storage unit of any further remaining storage units of the remaining storage units in accordance with the storage unit topology information. The method continues at step 686 where the initiating storage unit identifies potential storage errors based on received list differences responses.

Figure 50A:
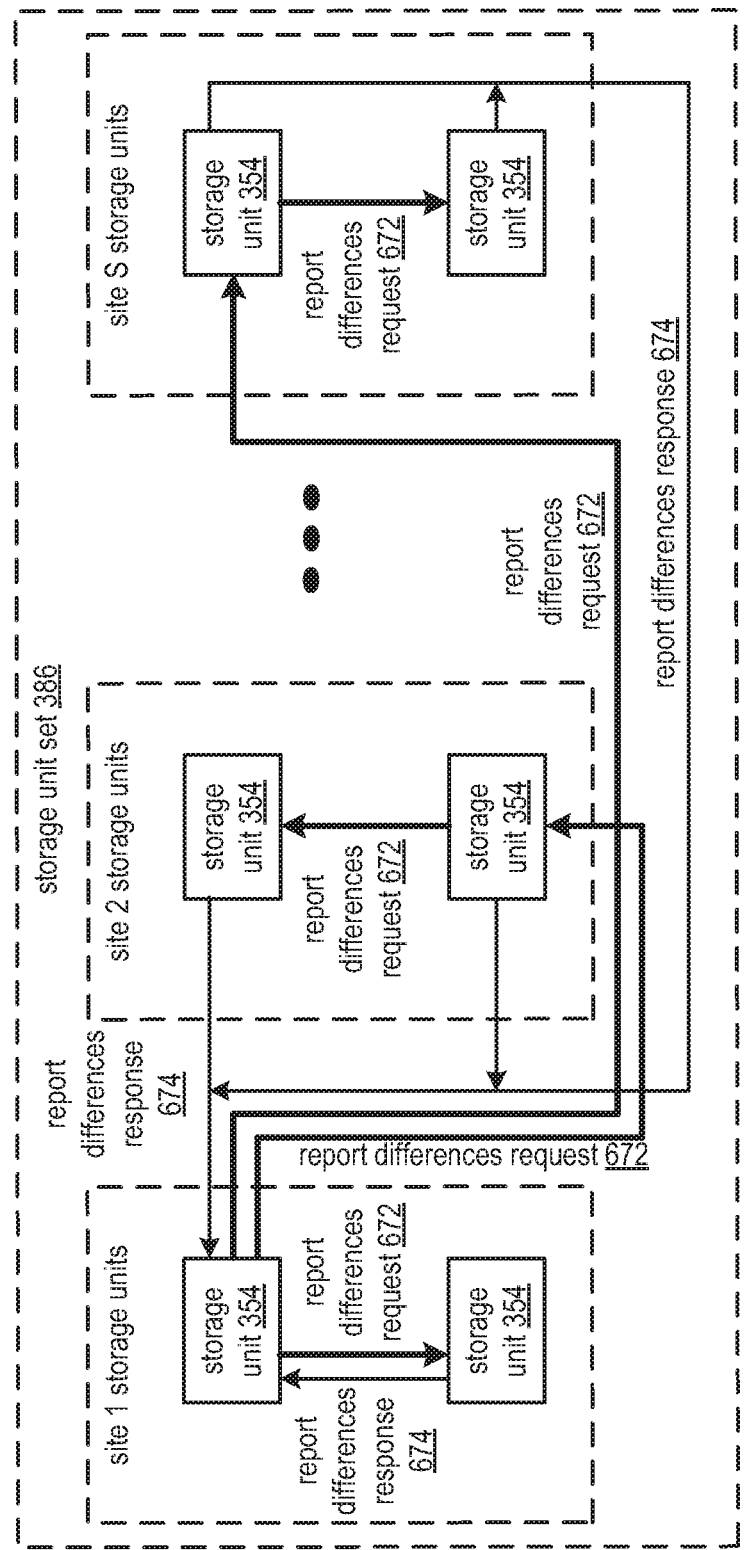
FIG. 50A is a schematic block diagram of another embodiment of a dispersed storage network (DSN) system in accordance with the present invention.

FIG. 50A is a schematic block diagram of another embodiment of a dispersed storage network (DSN) system that includes the storage unit set 386 of FIG. 41A. The storage unit set 386 includes S number of sites, where each of the sites includes one or more storage units 354 of FIG. 41A and where the S number of sites includes a set of storage units. One or more data objects are encoded using a dispersed storage error coding function to produce one or more pluralities of sets of encoded data slices, where each set of encoded data slices is stored in the set of storage units. Each set of encoded data slices is associated with a set of slice names. Each storage unit of the set of storage units stores an encoded data slice of the set of encoded data slices and stores and associated slice name for the encoded data slice of the set of slice names. One or more encoded data slices may be associated with a slice name, where each of the one or more slices associated with the slice name are associated with a unique revision number.

The system functions to detect storage errors associated with encoded data slices stored at one or more storage units of the set of storage units in accordance with the star topology approach. In an example of operation, an initiating storage unit 354 of the set of storage units at a first site of the S number of sites generates a slice list that includes a list of slice names and one or more revision numbers for each slice name within a DSN address range associated with the storage unit set. The generating includes issuing list slice requests to the set of storage units, receiving list slice responses from the set of storage units, and compiling list slice responses to form the slice list. The generating may further include comparing the list slice responses and utilizing a majority vote scheme to compile the slice list when at least some of the list slice responses compare unfavorably (e.g., extra or missing slices) to a majority of other list slice responses for the DSN address range.

The initiating storage unit determines to update the slice list based on one or more of interpreting an update schedule, receiving an error message, receiving an update request, and receiving a rebuilding request. The updating includes obtaining the slice list, issuing a set of list slice requests to the set of storage units, receiving list slice responses, comparing list slice responses, and updating the slice list based on the comparing to produce the slice list that has been updated.

For each other site of the S number of sites, the initiating storage unit issues a report differences request 672 to a first storage unit at the site in accordance with storage unit topology information. For example, the initiating storage unit generates and sends the report differences requests 672 to S-1 number of first storage units at S-1 other sites. The report differences request 672 includes one or more of the slice list, identity of the initiating storage unit, and the storage unit topology information, where the storage unit topology information includes information with regards to architecture of the S number of sites, which storage units of the set of storage units are implemented at each of the S number of sites, and an indicator to utilize the star topology approach.

Each first storage unit at the S-1 other sites compares the slice list to a local slice list associated with the first storage unit to identify differences. Each first storage unit issues a report differences response 674 based on the comparison to the initiating storage unit (e.g., directly to the initiating storage unit), where the report differences response includes one or more of additional slice names and revisions that are present in the first storage unit but are not included in the slice list and missing slice names and revisions that are not present in the first storage unit but are included in the slice list.

Each first storage unit and the initiating storage unit, forwards the report differences request 672 to all remaining storage units, if any, implemented at a common site with the first storage unit and the initiating storage unit in accordance with the storage unit topology information (e.g., when all of the storage units of the set of storage units have not yet received the report differences request). For example, a first storage unit implemented at a third site forwards the report differences request 672 to a second storage unit of the third site when the second storage unit is implemented at the third site. As another example, the initiating storage unit forwards the report differences request 672 to a second storage unit of the first site. As such, a star structured request differences request topology is established.

For each remaining storage unit, the remaining storage unit compares the slice list to a corresponding local slice list associated with the remaining storage unit and issues a report differences response 674 based on the comparison to the initiating storage unit. The initiating storage unit identifies potential storage errors of the set of storage units based on the list differences responses 674.

Figure 50B:
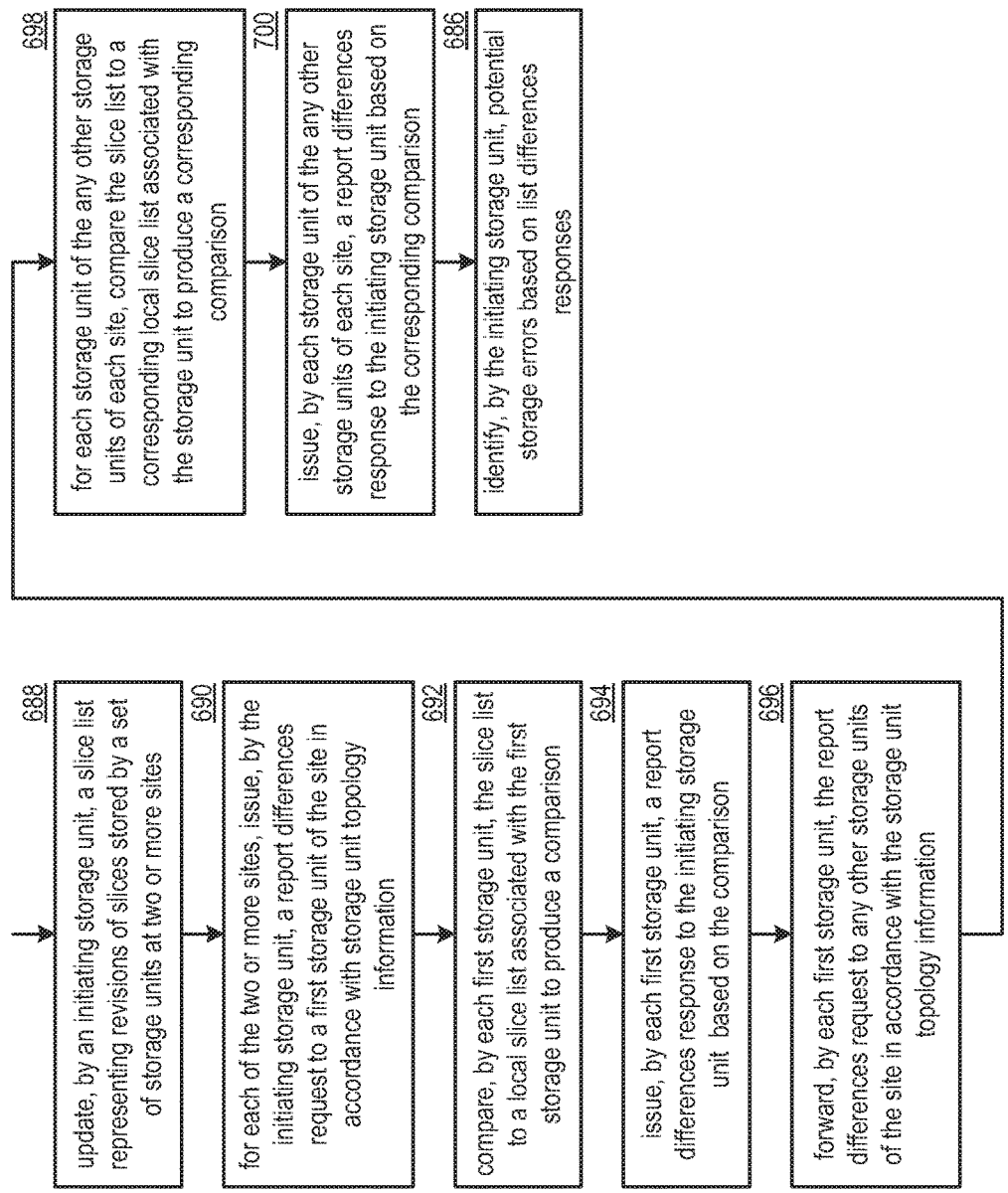
FIG. 50B is a flowchart illustrating another example of detecting storage errors in accordance with the present invention.

FIG. 50B is a flowchart illustrating another example of detecting storage errors, which include similar steps to FIG. 49B. The method begins at step 688 where an initiating storage unit updates a slice list representing revisions of slices stored by a set of storage units at two or more sites that includes the initiating storage unit. For each of the two or more sites, the method continues at step 690 where the initiating storage unit issues a report differences request to a first storage unit of the site in accordance with storage unit topology information. The issuing may include sending the report differences request to other storage units at a common site where the initiating storage unit is implemented. The method continues at step 692 where each first storage unit compares the slice list to a local slice list associated with the first storage unit to produce a comparison. The method continues at step 694 where each first storage unit issues a report differences response to the initiating storage unit based on the comparison.

The method continues at step 696 where each first storage unit forwards the report differences request to any other storage units of the site in accordance with the storage unit topology information. For each storage unit of the any other storage units of each site, the method continues at step 698 where the storage unit compares the slice list to a corresponding local slice list associated with the storage unit to produce a corresponding comparison. The method continues at step 700 where each storage unit of the any other storage units of each site issues a report differences response to the initiating storage unit based on the corresponding comparison. The method continues with step 686 of FIG. 49B where the initiating storage unit identifies potential storage errors based on received list differences responses.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a storage unit of a dispersed storage network (DSN), the method comprises:
   receiving, from a requesting computing device of the DSN, a retrieval request regarding an encoded key stream slice of a set of encoded key stream slices and an encoded and encrypted data slice of a set of encoded and encrypted data slices, wherein a plurality of data elements of a data element set of a data object is encrypted using a plurality of keystream characters of a key stream and an encryption function to produce a plurality of encrypted data elements, wherein the plurality of encrypted data elements are arranged to produce an encrypted data element set, wherein the encrypted data element set is dispersed storage error encoded in accordance with dispersed data storage parameters to produce the set of encoded and encrypted data slices, wherein the set of encoded and encrypted data slices are stored in a set of storage units of the DSN, wherein the key stream is dispersed storage error encoded in accordance with the dispersed data storage parameters to produce the set of encoded key stream slices, wherein the set of encoded key stream slices are stored in the set of storage units, wherein the set of storage units includes the storage unit, and wherein the dispersed data storage parameters include a decode threshold number;
   partially dispersed storage error decoding the encoded key stream slice to produce a partially decoded key stream vector that includes a plurality of partially decoded key stream vector blocks;
   partially dispersed storage error decoding the encoded and encrypted data slice to produce a partially decoded and encrypted data vector that includes a plurality of partially decoded and encrypted data vector blocks;
   partially decrypting the partially decoded and encrypted data vector based on a function in accordance with the encryption function and based on the partially decoded key stream vector to produce a partially decrypted and decoded data vector, wherein the function includes an exclusive OR that is performed on corresponding blocks of the plurality of partially decoded key stream vector blocks and the plurality of partially decoded and encrypted data vector blocks; and
   sending the partially decrypted and decoded data vector to the requesting computing device, wherein the requesting computing device is without access to the key stream, and wherein the decode threshold number of partially decrypted and decoded data vectors are required to reconstruct the data element set.

2. The method of claim 1 further comprises:
   converting an encryption key into the key stream.

3. The method of claim 1, wherein the partially dispersed storage error decoding the encoded and encrypted data slice to produce the partially decoded and encrypted data vector comprises:
   obtaining a square matrix, wherein the square matrix is derived from an encoding matrix of the dispersed storage error encoding; and
   generating the partially decoded and encrypted data vector based on the square matrix and the encoded and encrypted data slice.

4. A storage unit of a dispersed storage network (DSN), the storage unit comprises:
   a network interface;
   memory; and
   a processing module operably coupled to the network interface and the memory, wherein the processing module is operable to:
   receive, via the network interface and from a requesting computing device of the DSN, a retrieval request regarding an encoded key stream slice of a set of encoded key stream slices and an encoded and encrypted data slice of a set of encoded and encrypted data slices, wherein a plurality of data elements of a data element set of a data object is encrypted using a plurality of keystream characters of a key stream and an encryption function to produce a plurality of encrypted data elements, wherein the plurality of encrypted data elements are arranged to produce an encrypted data element set, wherein the encrypted data element set is dispersed storage error encoded in accordance with dispersed data storage parameters to produce the set of encoded and encrypted data slices, wherein the set of encoded and encrypted data slices are stored in a set of storage units of the DSN, wherein the key stream is dispersed storage error encoded in accordance with the dispersed data storage parameters to produce the set of encoded key stream slices, wherein the set of encoded key stream slices are stored in the set of storage units, wherein the set of storage units includes the storage unit, and wherein the dispersed data storage parameters include a decode threshold number;

partially dispersed storage error decode the encoded key stream slice to produce a partially decoded key stream vector that includes a plurality of partially decoded key stream vector blocks;

partially dispersed storage error decode the encoded and encrypted data slice to produce a partially decoded and encrypted data vector that includes a plurality of partially decoded and encrypted data vector blocks;

partially decrypt the partially decoded and encrypted data vector based on a function in accordance with the encryption function and based on the partially decoded key stream vector to produce a partially decrypted and decoded data vector, wherein the function includes an exclusive OR that is performed on corresponding blocks of the plurality of partially decoded key stream vector blocks and the plurality of partially decoded and encrypted data vector blocks; and send the partially decrypted and decoded data vector to the requesting computing device, wherein the requesting computing device is without access to the key stream, and wherein the decode threshold number of partially decrypted and decoded data vectors are required to reconstruct the data element set.

5. The storage unit of claim 4, wherein the processing module is further operable to:

receive, via the network interface, the encoded key stream slice, wherein an encryption key is converted into the key stream.

6. The storage unit of claim 4, wherein the processing module is further operable to partially dispersed storage error decode the encoded and encrypted data slice to produce the partially decoded and encrypted data vector by:

obtaining a square matrix, wherein the square matrix is derived from an encoding matrix of the dispersed storage error encoding; and generating the partially decoded and encrypted data vector based on the square matrix and the encoded and encrypted data slice.

7. A computer readable memory comprises:

a first memory element that stores operational instructions that, when executed by a first storage unit of a dispersed storage network (DSN), causes the first storage unit to:

receive, from a requesting computing device of the DSN, a first retrieval request regarding a first encoded key stream slice of a set of encoded key stream slices and a first encoded and encrypted data slice of a set of encoded and encrypted data slices, wherein a plurality of data elements of a data element set of a data object is encrypted using a plurality of keystream characters of a key stream and an encryption function to produce a plurality of encrypted data elements, wherein the plurality of encrypted data elements are arranged to produce an encrypted data element set, wherein the encrypted data element set is dispersed storage error encoded in accordance with dispersed data storage parameters to produce the set of encoded and encrypted data slices, wherein the set of encoded and encrypted data slices are stored in a set of storage units of the DSN, wherein the key stream is dispersed storage error encoded in accordance with the dispersed data storage parameters to produce the set of encoded key stream slices, wherein the set of encoded key stream slices are stored in the set of storage units, wherein the set of storage units includes the storage unit, and wherein the dispersed data storage parameters include a decode threshold number;

partially dispersed storage error decode the first encoded key stream slice to produce a first partially decoded key stream vector that includes a plurality of partially decoded key stream vector blocks;

partially dispersed storage error decode the first encoded and encrypted data slice to produce a first partially decoded and encrypted data vector that includes a plurality of partially decoded and encrypted data vector blocks;

partially decrypt the first partially decoded and encrypted data vector based on a function in accordance with the encryption function and based on the partially decoded key stream vector to produce a partially decrypted and decoded data vector, wherein the function includes an exclusive OR that is performed on corresponding blocks of the plurality of partially decoded key stream vector blocks and the plurality of partially decoded and encrypted data vector blocks; and send the partially decrypted and decoded data vector to the requesting computing device, wherein the requesting computing device is without access to the key stream, and wherein the decode threshold number of partially decrypted and decoded data vectors are required to reconstruct the data element set; and a second memory element that stores operational instructions that, when executed by a second storage unit of the DSN, causes the second storage unit to:

receive, from the requesting computing device of the DSN, a second retrieval request regarding a second encoded key stream slice of the set of encoded key stream slices and a second encoded and encrypted data slice of the set of encoded and encrypted data slices;

partially dispersed storage error decode the second encoded key stream slice to produce a second partially decoded key stream vector that includes a second plurality of partially decoded key stream vector blocks;

partially dispersed storage error decode the second encoded and encrypted data slice to produce a second partially decoded and encrypted data vector that includes a second plurality of partially decoded and encrypted data vector blocks;

partially decrypt the second partially decoded and encrypted data vector based on the function in accordance with the encryption function and based on the second partially decoded key stream vector to produce a second partially decrypted and decoded data vector, wherein the function includes the exclusive OR that is performed on corresponding blocks of the second plurality of partially decoded key stream vector blocks and the second plurality of partially decoded and encrypted data vector blocks; and send the second partially decrypted and decoded data vector to the requesting computing device, wherein the requesting computing device is without access to the key stream.

8. The computer readable memory of claim 7, wherein an encryption key is converted into the key stream.

9. The computer readable memory of claim 7, wherein the first memory element further stores operational instructions that, when executed by the first storage unit, causes the first storage unit to partially dispersed storage error decode the first encoded and encrypted data slice by:

obtaining a square matrix, wherein the square matrix is derived from an encoding matrix of the dispersed storage error encoding; and generating the first partially decoded and encrypted data vector based on the square matrix and the first encoded and encrypted data slice.

10. The computer readable memory of claim 7, wherein the second memory element further stores operational instructions that, when executed by the second storage unit, causes the second storage unit to partially dispersed storage error decode the second encoded and encrypted data slice by:

obtaining a square matrix, wherein the square matrix is derived from an encoding matrix of the dispersed storage error encoding; and generating the second partially decoded and encrypted data vector based on the square matrix and the second encoded and encrypted data slice.

* * * * *